United States Patent
Archer et al.

(10) Patent No.: US 12,176,572 B2
(45) Date of Patent: Dec. 24, 2024

(54) IN SITU FORMATION OF SOLID-STATE POLYMER ELECTROLYTES FOR BATTERIES

(71) Applicant: CORNELL UNIVERSITY, Ithaca, NY (US)

(72) Inventors: Lynden A. Archer, Ithaca, NY (US); Qing Zhao, Tianjin (CN); Kasim Khan, Ithaca, NY (US); Xiaotun Liu, Ithaca, NY (US)

(73) Assignee: Cornell University, Ithaca, NY (US)

( * ) Notice: Subject to any disclaimer, the term of this patent is extended or adjusted under 35 U.S.C. 154(b) by 691 days.

(21) Appl. No.: 17/420,595

(22) PCT Filed: Jan. 6, 2020

(86) PCT No.: PCT/US2020/012424
§ 371 (c)(1),
(2) Date: Jul. 2, 2021

(87) PCT Pub. No.: WO2020/142783
PCT Pub. Date: Jul. 9, 2020

(65) Prior Publication Data
US 2022/0085455 A1     Mar. 17, 2022

Related U.S. Application Data

(60) Provisional application No. 62/930,426, filed on Nov. 4, 2019, provisional application No. 62/788,599, filed on Jan. 4, 2019.

(51) Int. Cl.
*H01M 50/414*     (2021.01)
*H01G 9/00*     (2006.01)
(Continued)

(52) U.S. Cl.
CPC ........ *H01M 50/414* (2021.01); *H01G 9/0036* (2013.01); *H01G 11/56* (2013.01);
(Continued)

(58) Field of Classification Search
None
See application file for complete search history.

(56) References Cited

U.S. PATENT DOCUMENTS 5,294,502 A * 3/1994 Shackle ................ H01M 6/164
                                          252/62.2
2010/0239914 A1     9/2010 Mikhaylik et al.
(Continued)

FOREIGN PATENT DOCUMENTS

JP        06290794 A   * 10/1994
JP     2015018759 A   *  1/2015
(Continued)

OTHER PUBLICATIONS

Fiedler et al.; "XPS and SIMS Analysis of Solid Electrolyte Interphases on Lithium Formed by Ether-Based Electrolytes"; 2017 J. Electrochem. Soc. 164, pp. A3742 -A3749 (Year: 2017).*
(Continued)

*Primary Examiner* — Gregg Cantelmo
(74) *Attorney, Agent, or Firm* — Hodgson Russ LLP; Paul Joseph Roman, Jr.

(57) ABSTRACT

Provided are compositions including one or more cyclic ether(s), one or more salt(s), which may be one or more lithium salt(s), one or more sodium salt(s), or a combination thereof, and, optionally, one or more ring-opening polymerization initiator(s). The compositions may be used to form solid-state electrolytes. Also provided are methods for forming solid-state electrolytes using the compositions and devices comprising one or more composition(s) or one or more solid-state electrolyte(s) using the compositions.

15 Claims, 70 Drawing Sheets

(51) Int. Cl.
  *H01G 11/56* (2013.01)
  *H01M 10/052* (2010.01)
  *H01M 10/0525* (2010.01)
  *H01M 10/0565* (2010.01)
  *H01M 10/0569* (2010.01)
  *H01M 50/403* (2021.01)
  *H01M 50/409* (2021.01)
  *H01M 50/489* (2021.01)
  *H01M 50/497* (2021.01)

(52) U.S. Cl.
  CPC ..... *H01M 10/052* (2013.01); *H01M 10/0525* (2013.01); *H01M 10/0565* (2013.01); *H01M 10/0569* (2013.01); *H01M 50/403* (2021.01); *H01M 50/409* (2021.01); *H01M 50/489* (2021.01); *H01M 50/497* (2021.01); *H01M 2300/0082* (2013.01)

(56) References Cited

U.S. PATENT DOCUMENTS

2014/0097801 A1   4/2014   Nakayama
2015/0044517 A1   2/2015   Mikhaylik et al.

FOREIGN PATENT DOCUMENTS

WO      2014/153534 A1      9/2014
WO      WO-2018214971 A1 *  11/2018  ............. C08G 65/04

OTHER PUBLICATIONS

Machine Translation of JP 06290794A (Year: 1994).*
Machine Translation of JP 2015018759A (Year: 2015).*
Ma et al.; "Stable Artificial Solid Electrolyte Interphases for Lithium Batteries": Chem. Mater. 2017, 29, pp. 4181-4189 (Year: 2017).*
Machine Translation of WO-2018214971-A1 (Year: 2018).*

* cited by examiner

IN SITU FORMATION OF SOLID-STATE POLYMER ELECTROLYTES FOR BATTERIES

CROSS REFERENCE TO RELATED APPLICATIONS

This application is a U.S. national stage entry of International Application PCT/US2020/012424 filed Jan. 6, 2020, which claims priority to U.S. Provisional Application No. 62/788,599, filed on Jan. 4, 2019, and to U.S. Provisional Application No. 62/930,426, filed on Nov. 4, 2019, the disclosures of each of which are incorporated herein by reference in their entirety.

STATEMENT REGARDING FEDERALLY SPONSORED RESEARCH

This invention was made with government support under DE-AR0000750 and DE-SC0016082 awarded by the Department of Energy. The government has certain rights in the invention.

FIELD OF THE DISCLOSURE

The disclosure generally relates to solid-state polymer electrolytes. More particularly the disclosure generally relates to in-situ formation of solid-state polymer electrolytes.

BACKGROUND OF THE DISCLOSURE

Solid-state electrolytes (SSEs) are emerging as important solutions to meet the ever-growing energy storage demands for practical and long-lasting electrochemical energy storage in applications ranging from portable electronics to renewable energy sources. SSEs are considered promising for next generation rechargeable batteries, e.g., those based on Li and Na anodes, because of their inherent safety features and potential to prevent three-dimensional dendritic deposition of the metals.

Two types of SSEs have been studied, SSEs based on ion-conducting inorganic solids and SSEs based on ion-conducting organic polymers, so-called solid polymer electrolytes. Among these options, solid polymer electrolytes are considered attractive from a range of perspectives such as their mechanical toughness, lower cost, light-weight characteristics, and compatibility with large-scale roll-to-roll manufacturing processes. In general, it may be desirable for a successful solid polymer electrolyte to enable high bulk ionic conductivity and low interfacial transport of Li ions, e.g., at both the anode and cathode of a battery temperature. It may also be desirable that a solid polymer electrolyte remain mechanically stable and chemically inert during normally battery cycling. In addition, it may also be desirable for a solid polymer electrolyte to prevent thermal runaway of an electrochemical cell, e.g., under conditions of battery abuse.

Various solid polymer electrolyte strategies have been reported in the literature, including preparation of cross-linked solid polymer electrolytes and composite solid polymer electrolytes to improve the mechanical strength, elevate ionic conductivity, increase high voltage stability, and lower the interfacial resistance of the materials.

Challenges for solid polymer electrolytes remain, including, for example, the large thermodynamic driving force for macromolecular stacking and crystallization, which generally yields low ambient-temperature bulk ionic conductivity; high interface resistance; and the difficulty in infiltrating the highly viscous molten polymers into the nano-sized pores of intercalating cathodes, especially when high-loading materials are utilized for enhanced energy density.

As an example, solid polymer electrolyte based on polyethylene oxide (PEO) have been most widely studied. PEO is chemically inert in contact with a Li metal electrode. The affinity of PEO chains for the active $Li^+$ is ironically the source of one of its major shortcomings as a solid polymer electrolyte: it couples the ion mobility to the motions of polymer chain segments. As a consequence, both the bulk ionic conductivity and interface resistance of solid polymer electrolytes based on PEO are highly sensitive to temperature distance from any thermal transitions (e.g., melting or glass transition), strength of polymer associations with solid substrates, and polymer molecular weight. The result is that it is difficult to simultaneously create PEO-based solid polymer electrolytes that offer an appropriate balance of mechanical properties, ionic conductivity, and interfacial resistance required for proper operation in a device, such as, for example, a battery.

A simple LiTFSI/PEO solid polymer electrolyte exhibits a room temperature ionic conductivity of $10^{-6}$ S/cm, nearly three orders of magnitude lower than required for application in a functional battery. Meanwhile, the interfacial resistances at either planar anodes (eg. Li foil) or porous cathodes (e.g. a conventional intercalating cathode such as NMC or LCO) are much higher than that in common liquid electrolytes due to the high modulus of solid polymer electrolytes.

Polymer electrolytes require high-concentration Li salts composed of large anions, such as lithium bis(trifluoromethanesulfonyl)imide (LiTFSI) or lithium bis(fluorosulfonyl) imide (LiFSI), to achieve sufficient amounts of dissociated ion pairs for efficient ion transport at room temperature. Unfortunately, these salts are known for their propensity for severe current collector corrosion through both chemical and electrochemical reactions during battery cycling, which creates a risk of orphaned active materials and abrupt capacity drop.

Based on at least the foregoing, there exists and ongoing and unmet need for improved SSEs.

SUMMARY OF THE DISCLOSURE

The present disclosure provides compositions and methods for forming solid-state polymer electrolytes (SPEs) using the compositions. The present disclosure also provides electrochemical cells comprising a SPE, which may be formed using a composition or method of the present disclosure. In various examples, the present disclosure describes formation of SPEs in-situ by polymerization of a liquid precursor introduced in an electrochemical cell using conventional approaches. SPEs may be formed using a ring-open polymerization of a liquid ether based electrolyte.

In an aspect, the present disclosure provides compositions. In various examples, the compositions comprise one or more cyclic ether(s), one or more salt(s), and, optionally, one or more initiator(s). In various examples, the compositions are used to form SPEs. The SPEs can be used in batteries, which may be rechargeable/secondary batteries, such as, for example, Li-ion batteries, Li metal batteries, sodium-ion batteries, sodium metal batteries, and the like. Non-limiting examples of compositions are provided herein. In various examples, a composition comprises: one or more cyclic ether(s) (e.g., a ring-ether solvent); a salt (e.g., a lithium salt, a sodium salt, or a combination thereof); and optionally, an initiator (e.g., a cationic polymerization initiator, such as, for example, a ring opening polymerization initiator). The compositions can be used to in-situ form a solid electrolyte in a device. A composition may further comprise a mixture of a cyclic ether and one or more solvents.

In an aspect, the present disclosure provides methods of forming SPEs. The methods may use a composition of the present disclosure. Non-limiting examples of methods are provided herein. SPEs may be prepared using a ring-opening polymerization of liquid ether-based electrolytes. The ring-opening polymerization of preparing SPEs may be a cationic polymerization.

In an aspect, the present disclosure provides devices. The devices comprise one or more SPEs of the present disclosure and/or one or more SPEs formed by a method of the present disclosure. A device may be a battery (e.g., primary battery, a rechargeable/secondary battery, such as, for example, a lithium-ion conducting or sodium-ion conducting rechargeable/secondary battery). The SPEs may be used as both electrolytes and binders in the batteries. A device may be a supercapacitor. Non-limiting examples of devices are provided herein.

BRIEF DESCRIPTION OF THE FIGURES

For a fuller understanding of the nature and objects of the disclosure, reference should be made to the following detailed description taken in conjunction with the accompanying figures.

M AlF$_3$-Poly-DOL electrolyte. The error bars reflect the standard errors deduced from replicate experiments using four cells.

Figure 39:
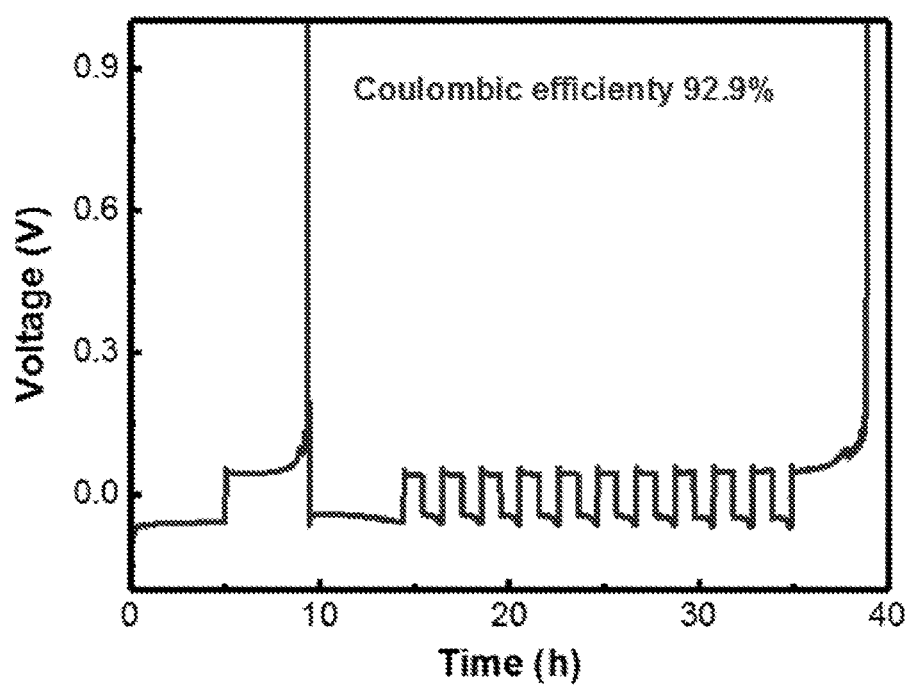

FIG. 39 shows the voltage versus time of Li∥Cu batteries for measuring the Coulombic efficiency of Li metal anodes in AlF$_3$-Poly-DOL electrolytes.

Figure 40:
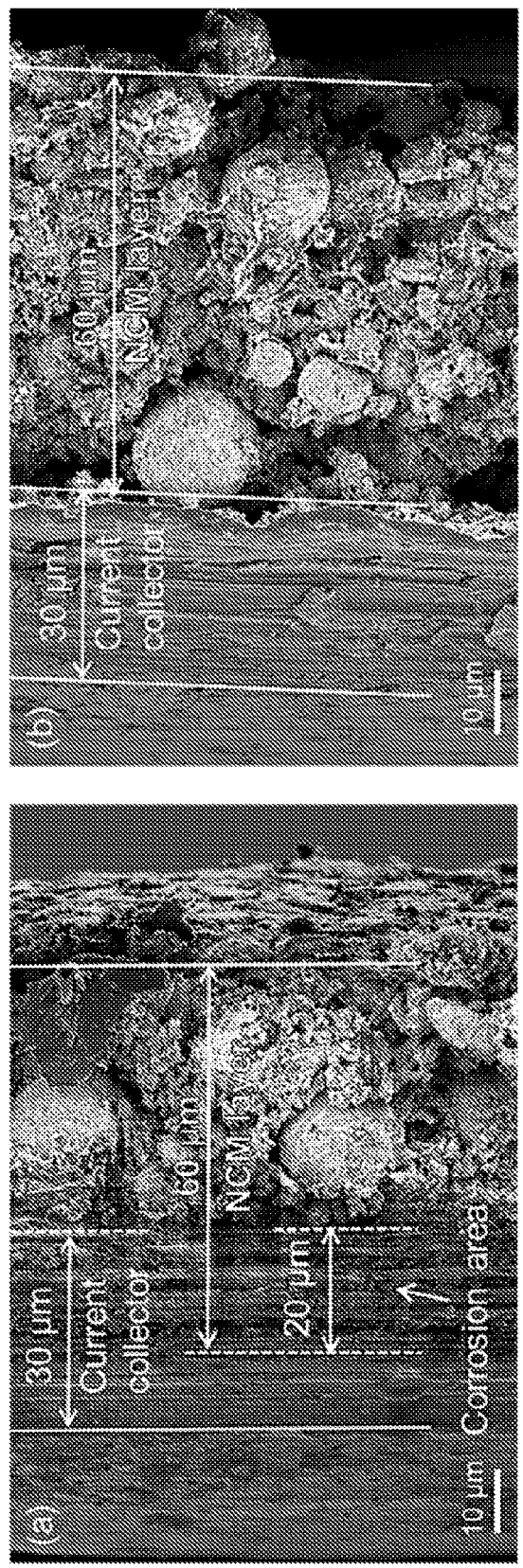

FIG. 40 shows an enlarged cross section view of NCM cathode after cycling in (a) routine Poly-DOL electrolytes, and (b) AlF$_3$-Poly-DOL electrolytes.

Figure 41:
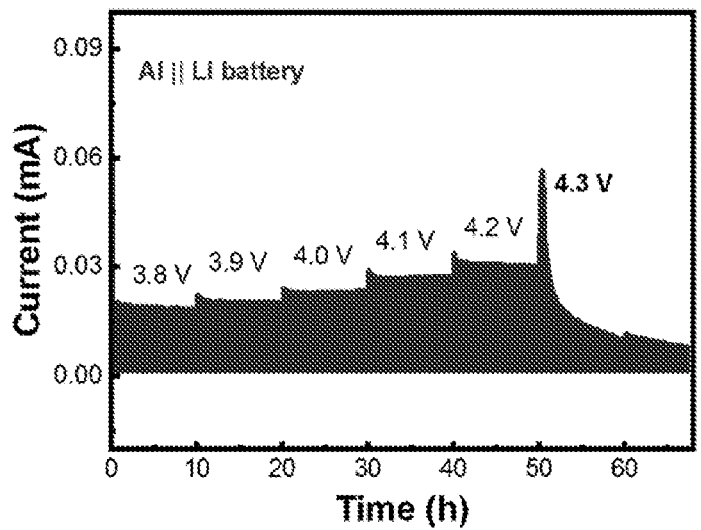

FIG. 41 shows electrochemical floating analysis of the Al∥Li batteries with Al foil as working electrodes.

Figure 42:
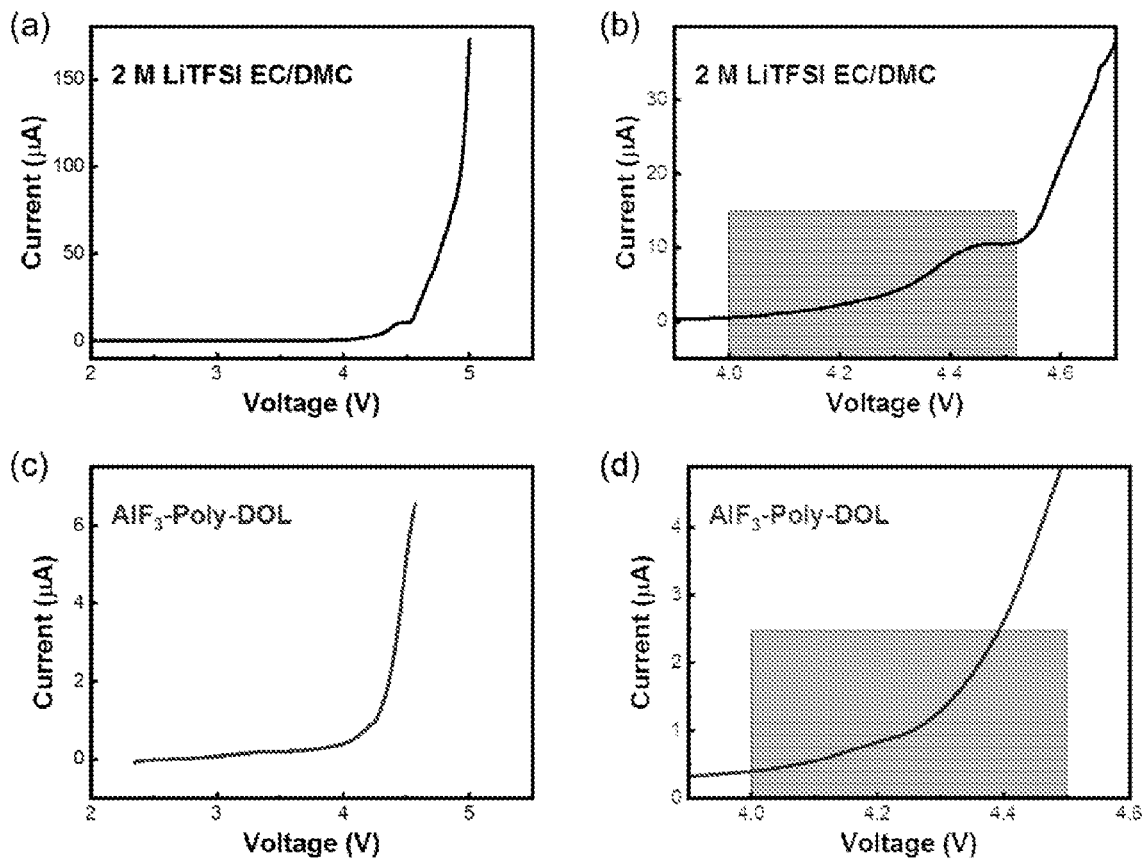

FIG. 42 shows linear sweep voltammetry (LSV) curve of Al∥Li cells in (a, b) EC/DMC electrolyte and (c, d) AlF$_3$-Poly-DOL electrolyte to identify the potential of Al current collector corrosion. The shaded areas show the possible peaks for related Al electrode reactions. The scan rate is 0.02 mV/s.

Figure 43:
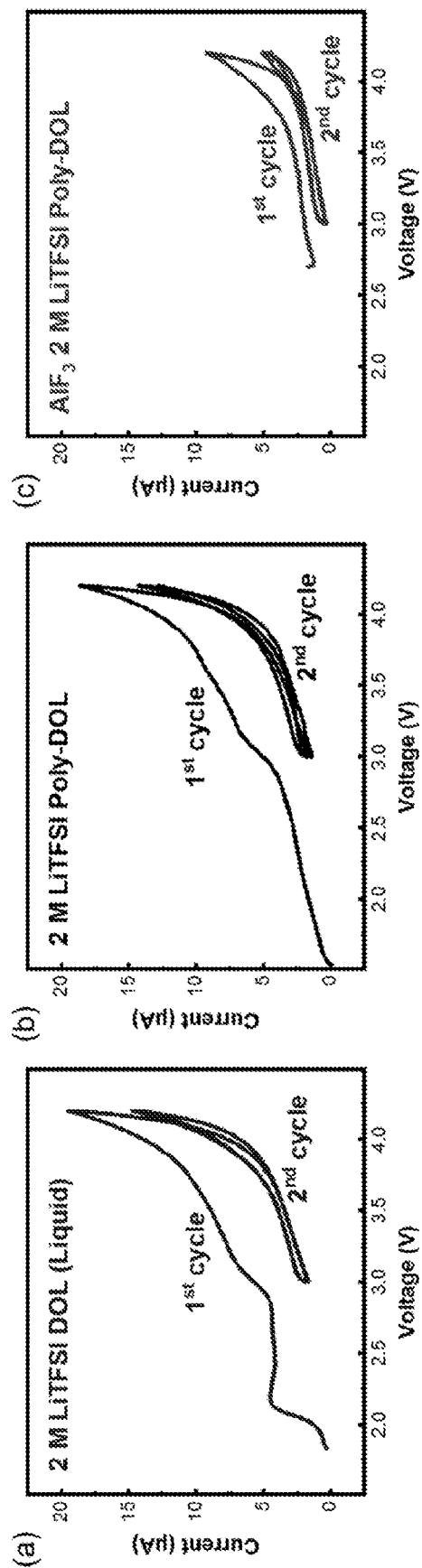

FIG. 43 shows current voltage (CV) curves of Al∥Li cells with (a) liquid DOL electrolyte, (b) Poly-DOL electrolyte and (c) AlF$_3$-Poly-DOL electrolyte. The concentrations of LiTFSI salt are all 2 M. The scan rate is 1.0 mV/s.

Figure 44:
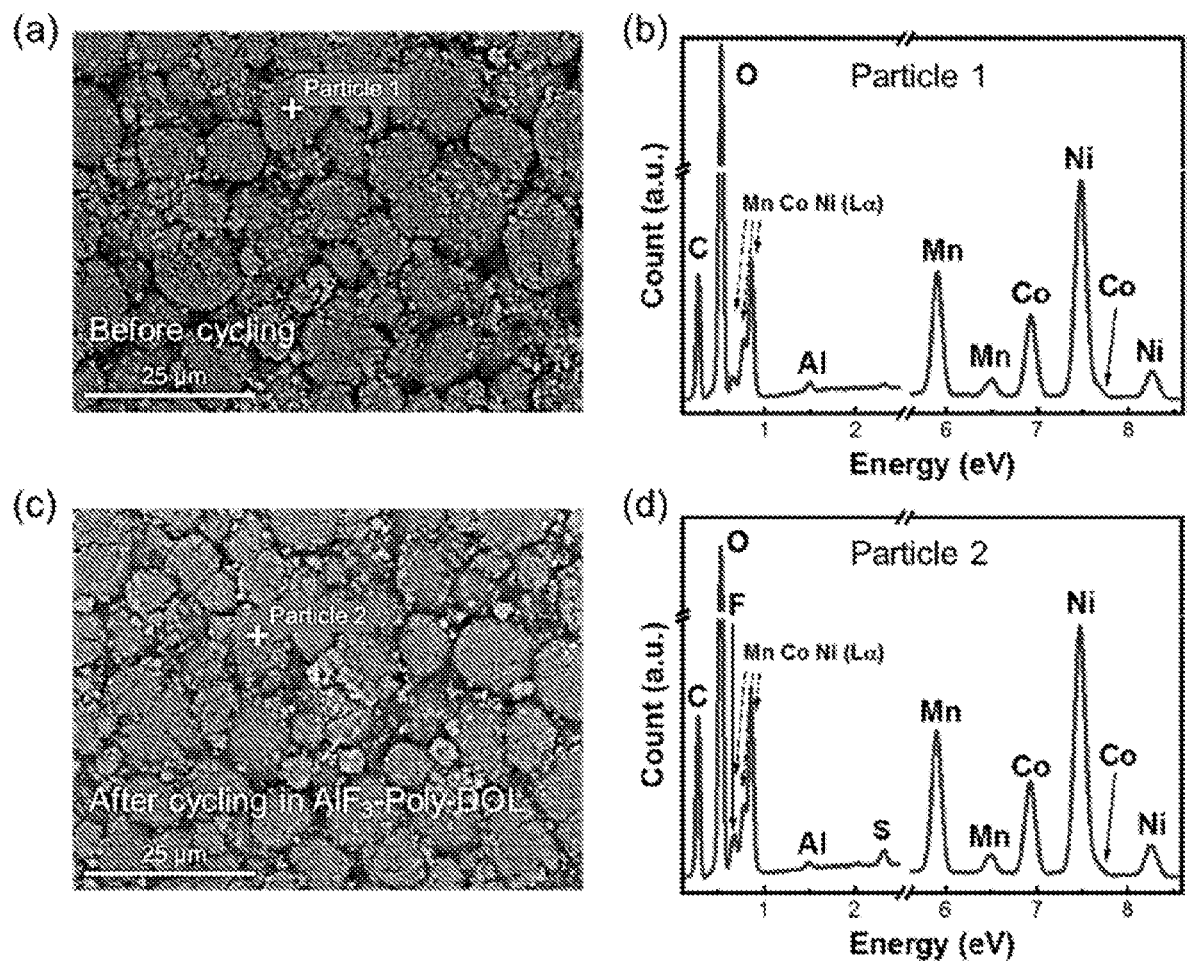

FIG. 44 shows SEM images and corresponding EDS results of NCM cathode (a, b) before cycling and (c, d) after cycling in AlF$_3$-Poly-DOL electrolytes.

Figure 45:
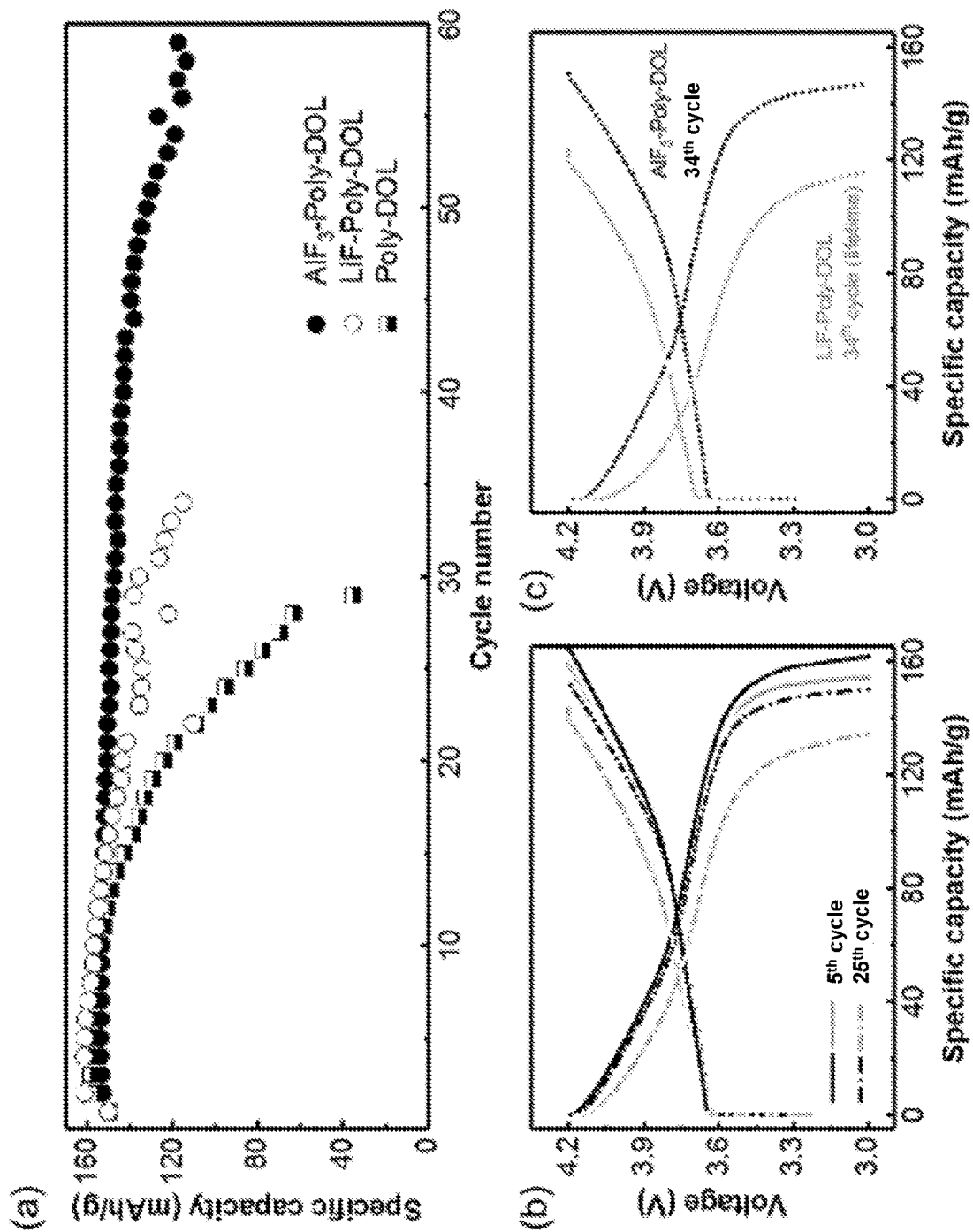

FIG. 45 shows galvanostatic cycling performances of solid-state NCM∥Li metal batteries with (a) LiF-Poly-DOL (white circles), AlF$_3$-Poly-DOL (black circles) and routine polymerized DOL (squares) electrolytes at 0.1 C. (b, c) Corresponding discharge/charge profiles of NCM batteries with LiF-Poly-DOL (white circles) and AlF$_3$-Poly-DOL (black circles) electrolyte.

Figure 46:
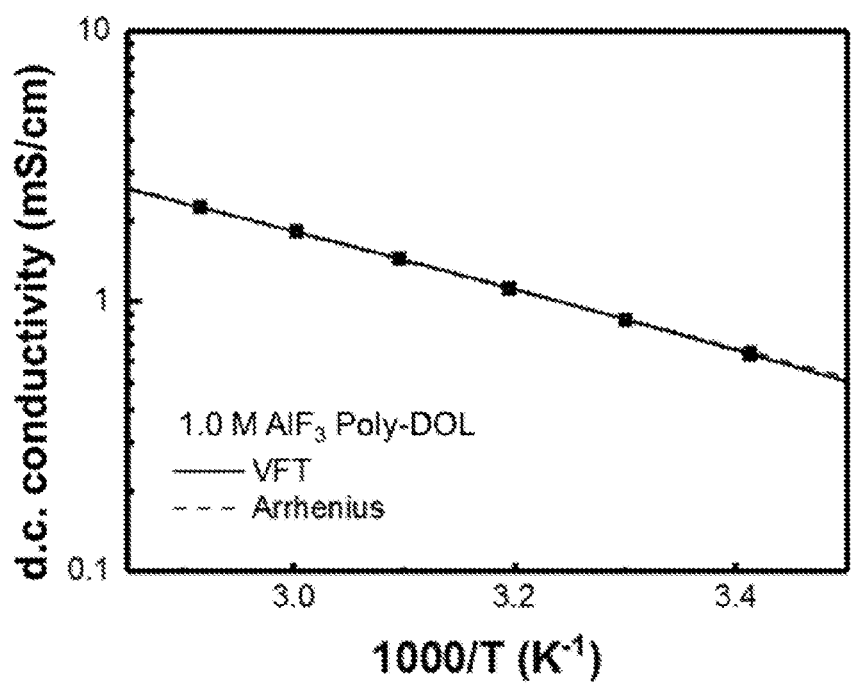

FIG. 46 shows conductivity of the AlF$_3$-Poly-DOL electrolytes versus temperature (1.0 M AlF$_3$). The solid and dashed lines through the data are fitted using the Vogel-Fulcher-Tammann (VFT) and Arrhenius transport models, respectively.

Figure 47:
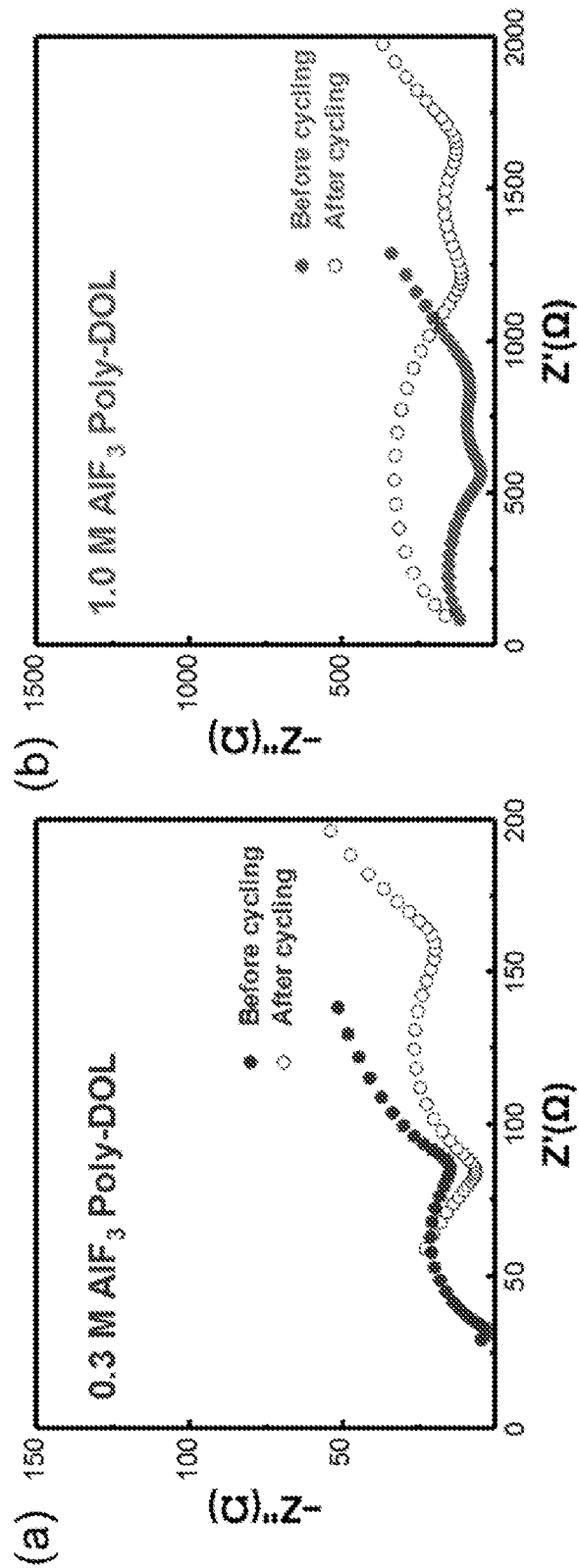

FIG. 47 shows EIS plot of NCM∥Li metal batteries before and after cycling in (a) 0.3 M and (b) 1.0 M AlF$_3$ Poly-DOL electrolytes.

Figure 48:
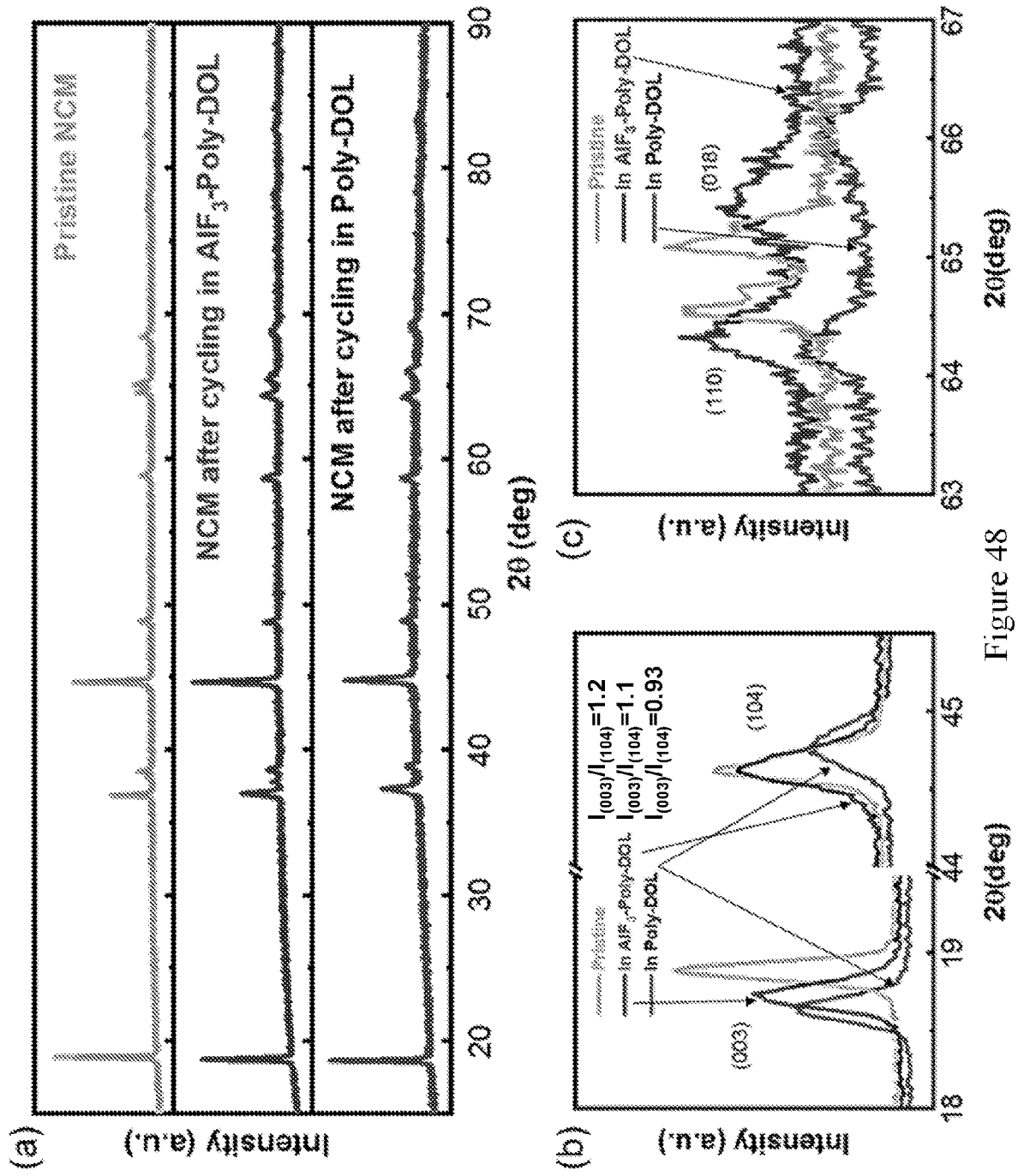

FIG. 48 shows (a, b, c) XRD pattern of NCM cathodes before and after cycling in Poly-DOL and AlF$_3$-Poly-DOL, explaining the fading mechanism of NCM batteries.

Figure 49:
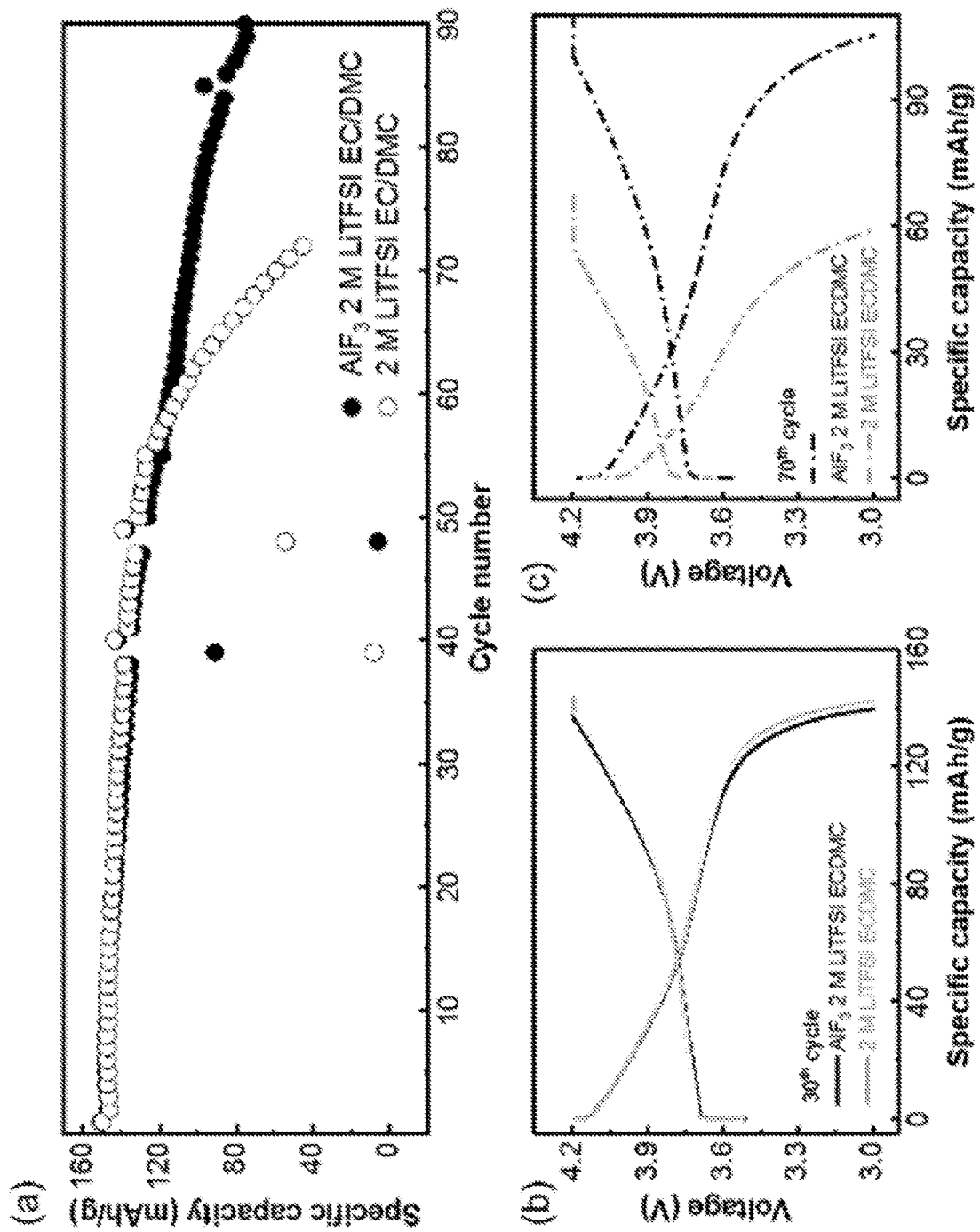

FIG. 49 shows electrochemical performances of NCM∥Li metal batteries in carbonate electrolytes. (a) Cycling performances of batteries utilizing routine EC/DMC electrolytes (white circles) and AlF$_3$ EC/DMC electrolytes (black circles). (b, c) Corresponding discharge/charge profiles of NCM batteries at (b) 30$^{th}$ cycle and (c) 70$^{th}$ cycle.

Figure 50:
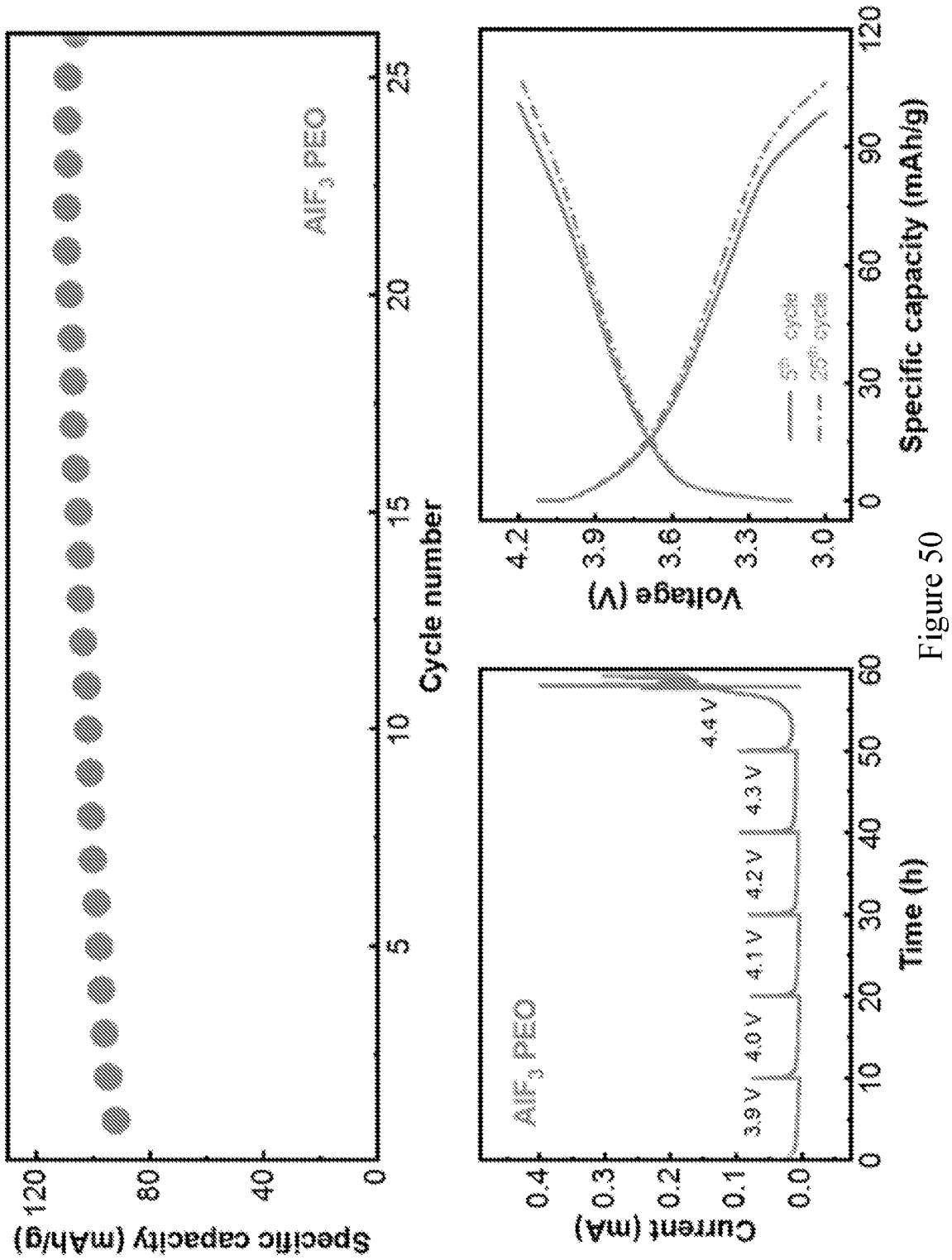

FIG. 50 shows electrochemical performances of AlF$_3$ PEO electrolytes. (a) Galvanostatic cycling performances of all-solid-state NCM∥Li metal batteries at 60° C., 0.1 C. (b) Electrochemical floating analysis using NCM cathodes. (c) Corresponding discharge/charge profiles of NCM batteries with AlF$_3$ PEO electrolytes.

Figure 51:
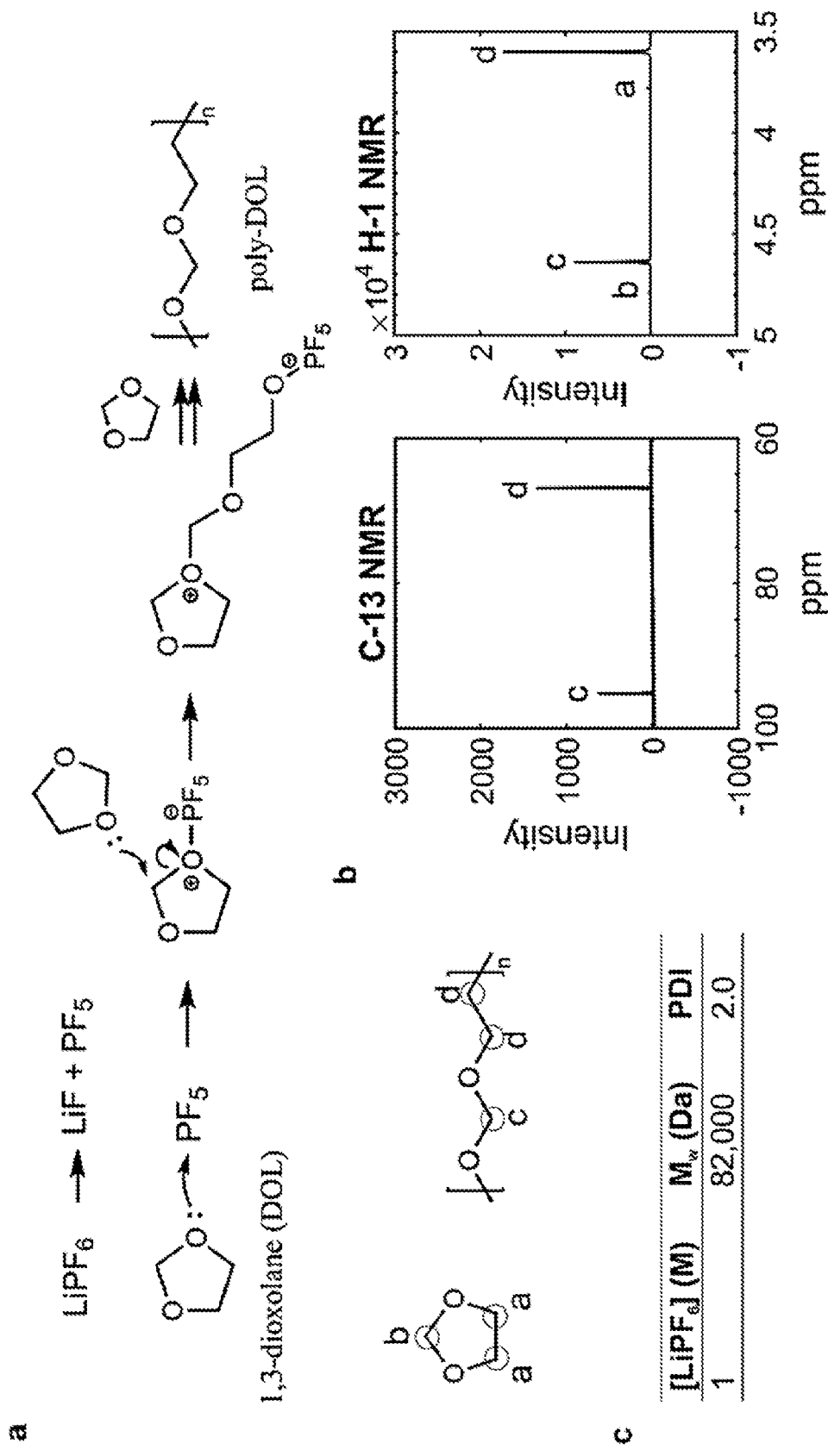

FIG. 51 shows a reaction scheme by which LiPF$_6$ salt initiates ring-opening polymerization of DOL. The figure also reports typical chemical and physical characteristics of the polymers formed by this process. (a) Reaction mechanism by which PF$_5$ initiates ring-opening polymerization of DOL. (b) NMR spectra of poly-DOL with 1 M LiPF$_6$ as the initiator. Note: the relative peak areas indicate that virtually all DOL polymerized. (c) M$_w$ and PDI values for poly-DOL with 1 M LiPF$_6$ as the initiator, obtained via GPC.

Figure 52:
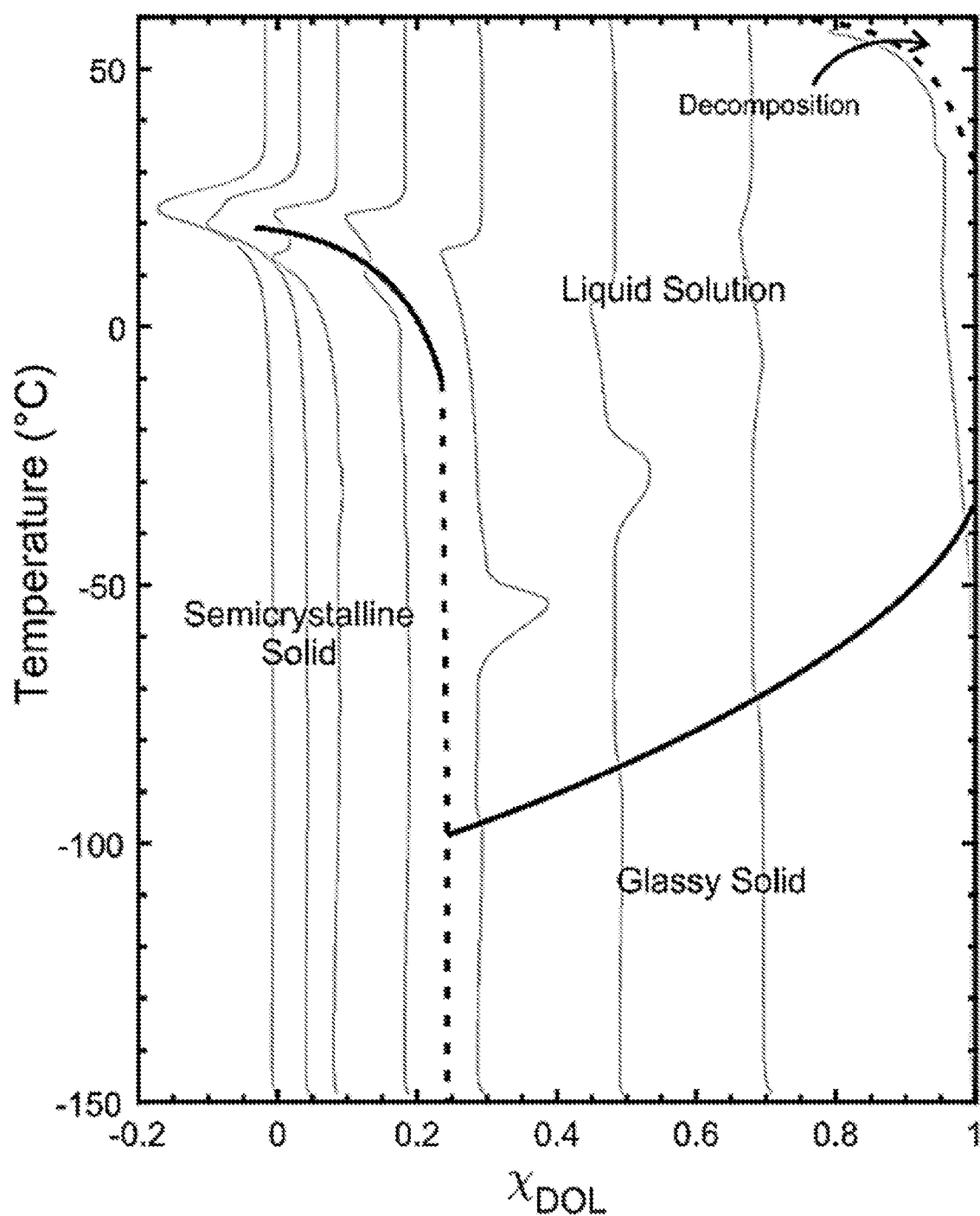

FIG. 52 shows a phase diagram for the EC/DOL/1 M LiPF$_6$ system. The light curves are melting thermograms obtained using differential scanning calorimetry (exotherms pointing right). X$_{DOL}$ is the molar fraction of DOL in the electrolyte. A critical transition is apparent at X$_{DOL}$≈0.3.

Figure 53:
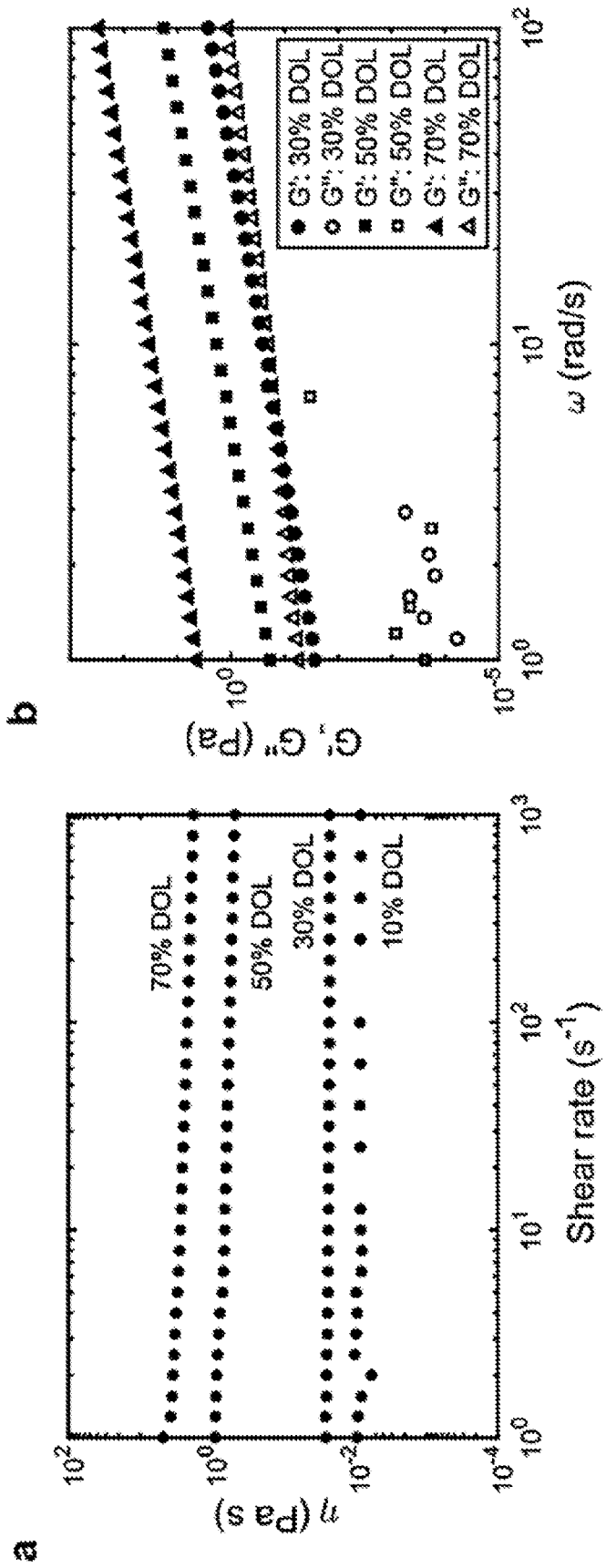
Figure 53:
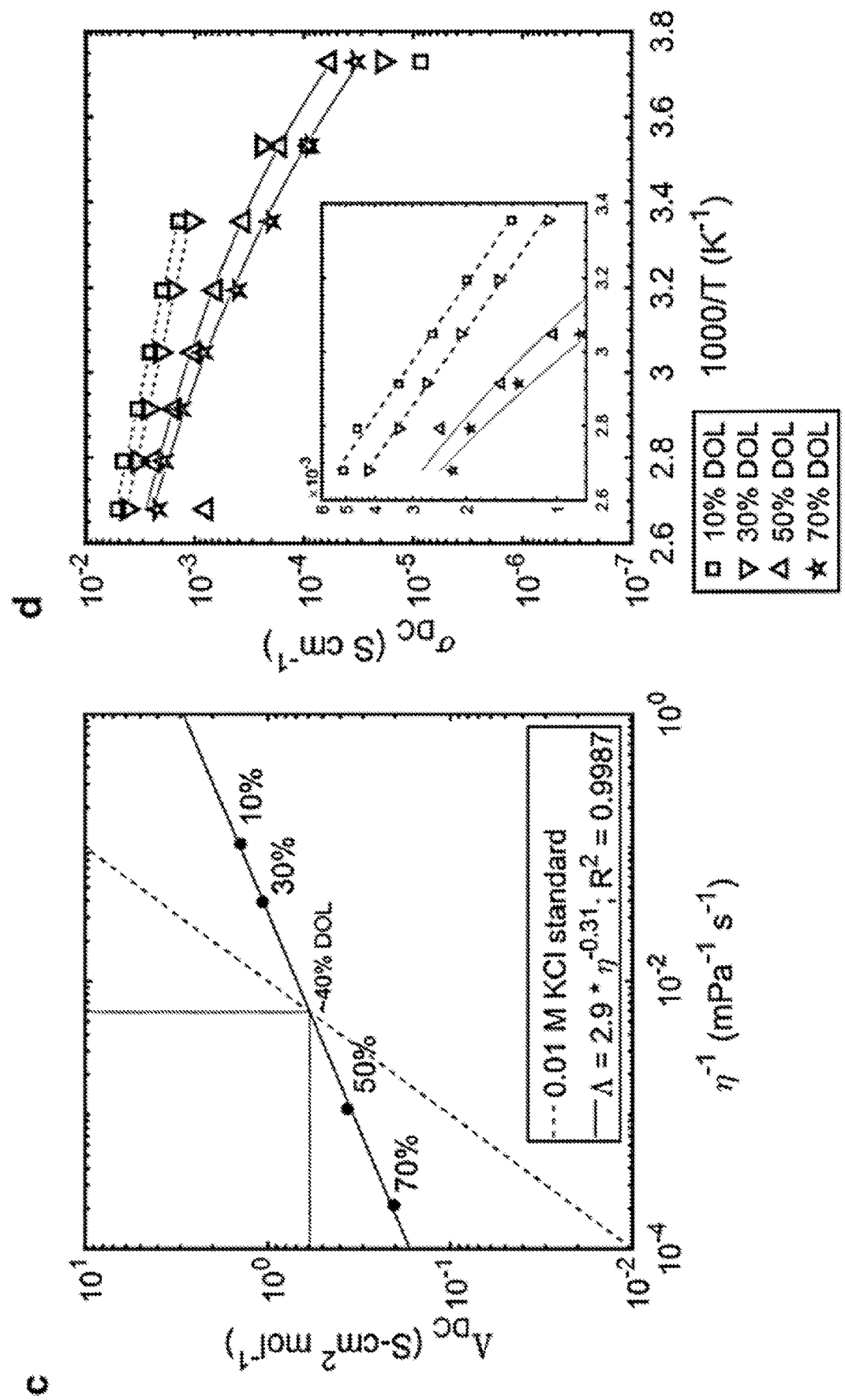

FIG. 53 summarizes the transport properties of the EC/DOL/1 M LiPF$_6$ electrolyte and how they vary with DOL concentration. Low DOL regime shown is ≤30% DOL, and high DOL regime shown is >30% DOL. (a) Viscosity (η) vs. shear rate ($\dot{\gamma}$) data for a selected range of DOL fractions. Note the critical transition in viscosity from 30% to 50% DOL. (b) Dynamic storage (G') and loss (G") moduli for a selected range of DOL fractions across a range of frequencies at constant strain (γ=10%). The value of G' for % DOL=30, 50 is below the sensitivity of the instrument, hence the sparse data. (c) Walden plot (molar DC ionic conductivity vs. reciprocal zero-shear viscosity) of various EC/DOL/1 M LiPF$_6$ electrolytes at room temperature. Note the transition from the low DOL to high DOL regime at ~40% DOL. (d) DC ionic conductivity vs. temperature for EC/DOL/1 M LiPF$_6$ electrolytes in symmetric Li—Li cells, obtained via electrochemical impedance spectroscopy (EIS). Dashed lines are Arrhenius fits, while solid lines are Vogel-Fulcher-Tammann (VFT) fits.

Figure 54:
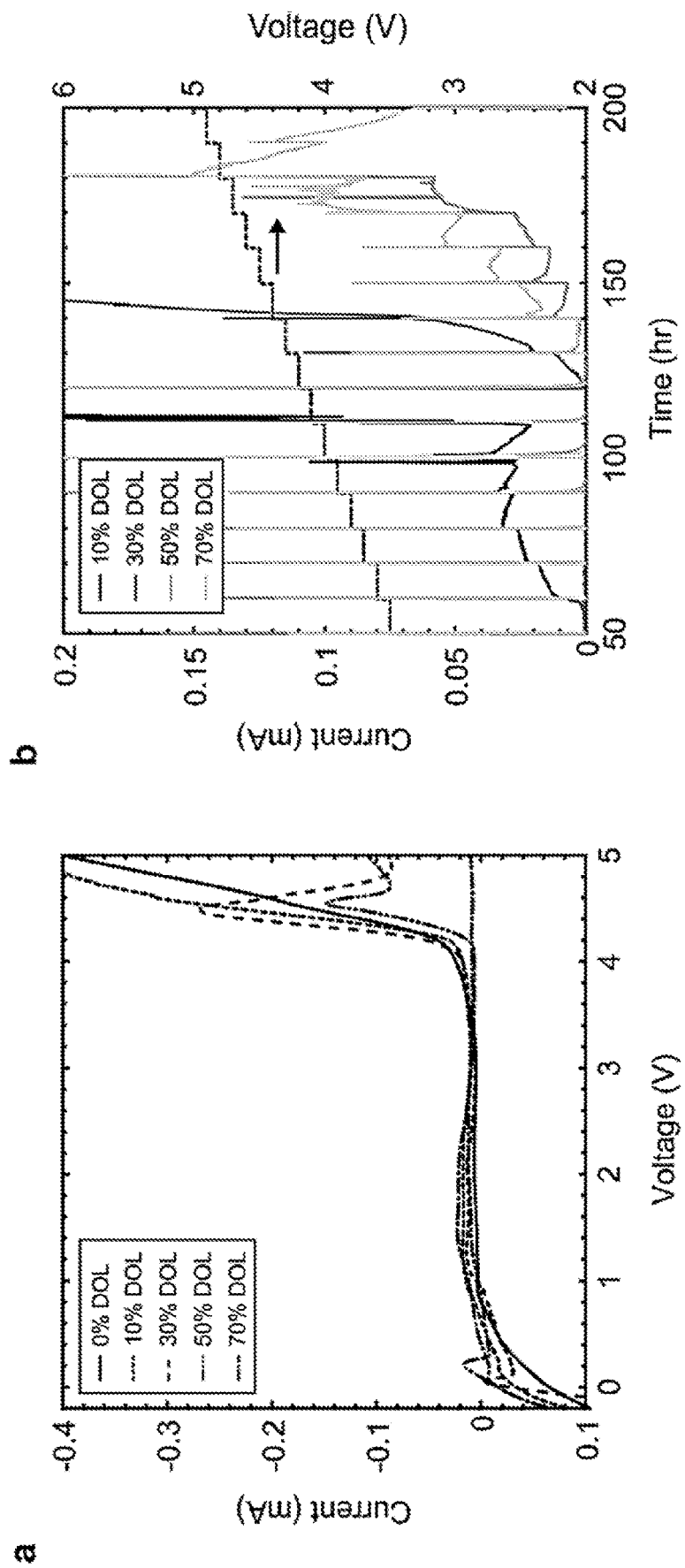

FIG. 54 shows electrochemical stability of EC/DOL/1 M LiPF$_6$ electrolytes. Blue indicates the low DOL regime (<30% DOL) and orange indicates the high DOL regime (>30% DOL). (a) Electrochemical stability window of EC/DOL/1 M LiPF$_6$ electrolytes in Li-stainless steel cells. Scan rate=1 mV/s. (b) Electrochemical floating test of EC/DOL/1 M LiPF$_6$ electrolyte in Li-stainless steel cells. Curves are shown up to the point of failure (when current exceeds 0.2 mA).

Figure 55:
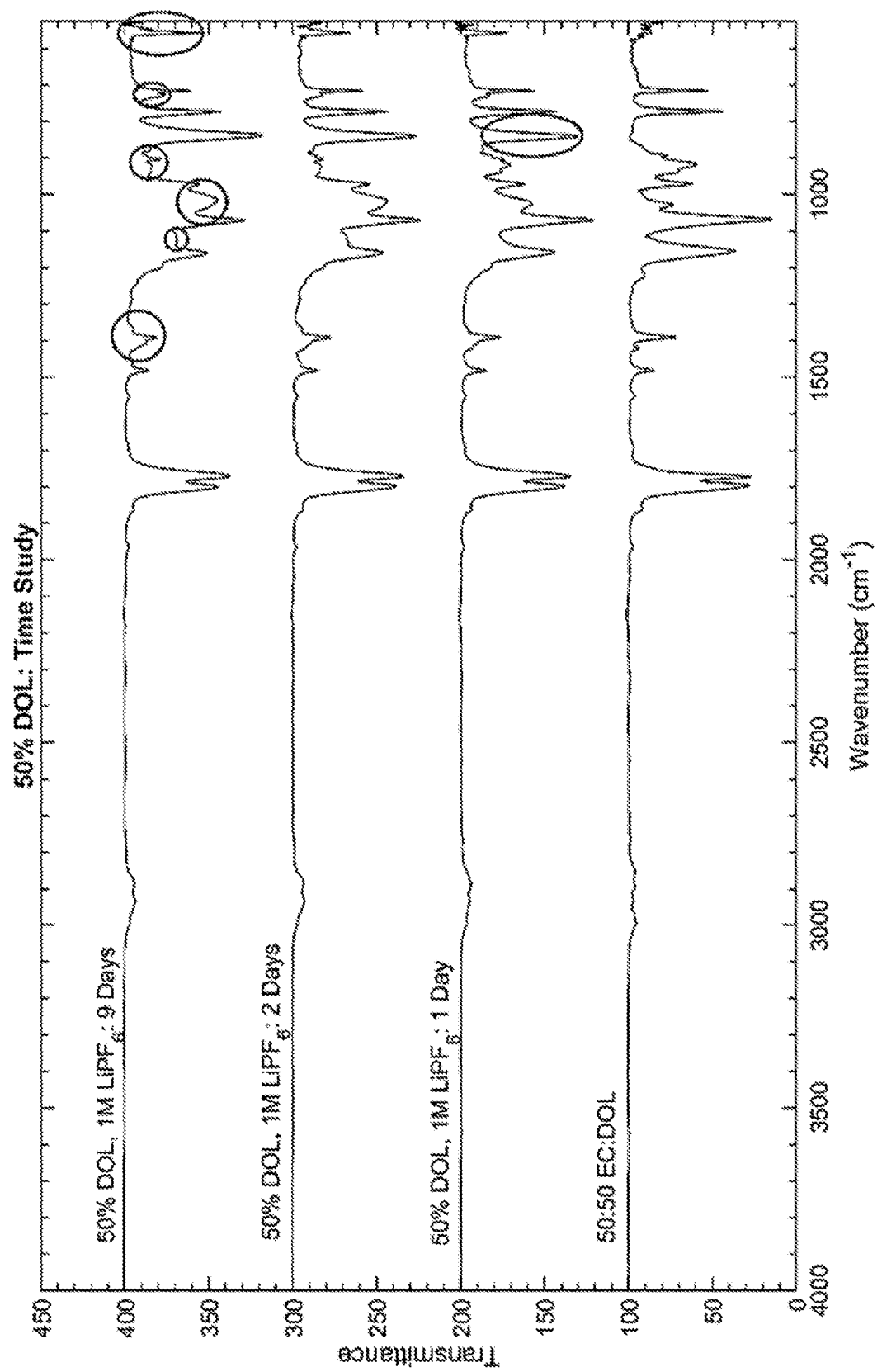

FIG. 55 shows a time-dependent FTIR analysis for a 50% DOL-50% EC-1 M LiPF$_6$ electrolyte.

Figure 56:
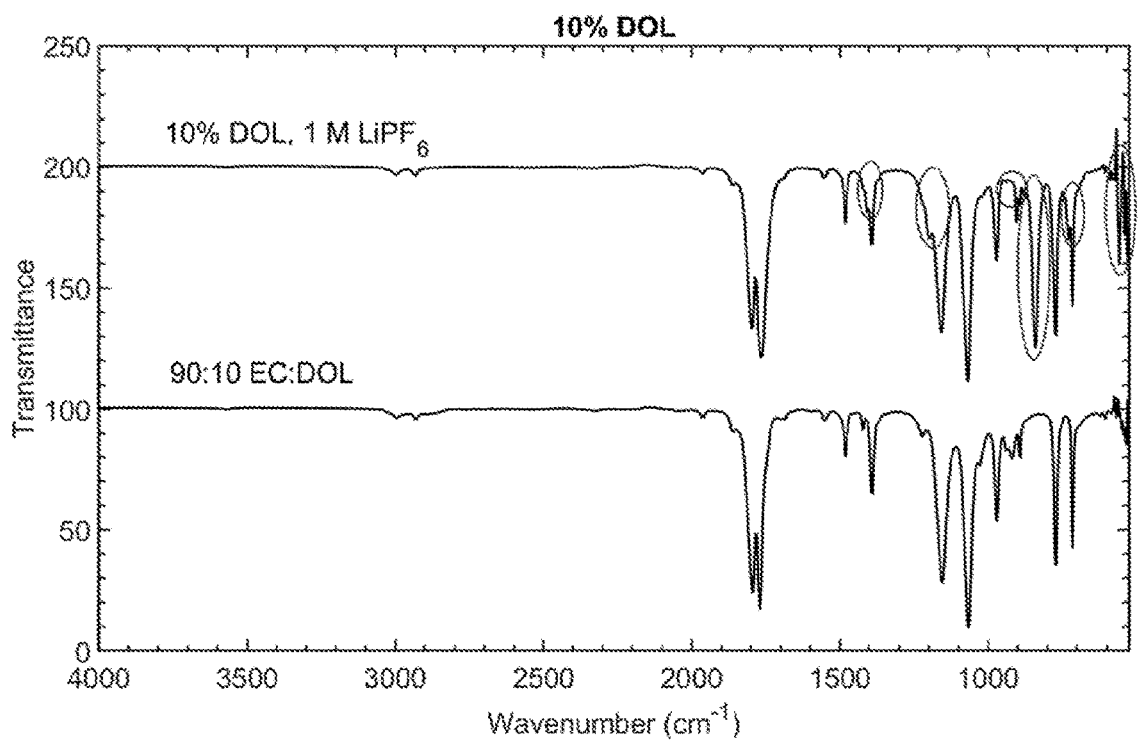

FIG. 56 shows FTIR of 10% DOL, 90% EC, 1 M LiPF$_6$.

Figure 57:
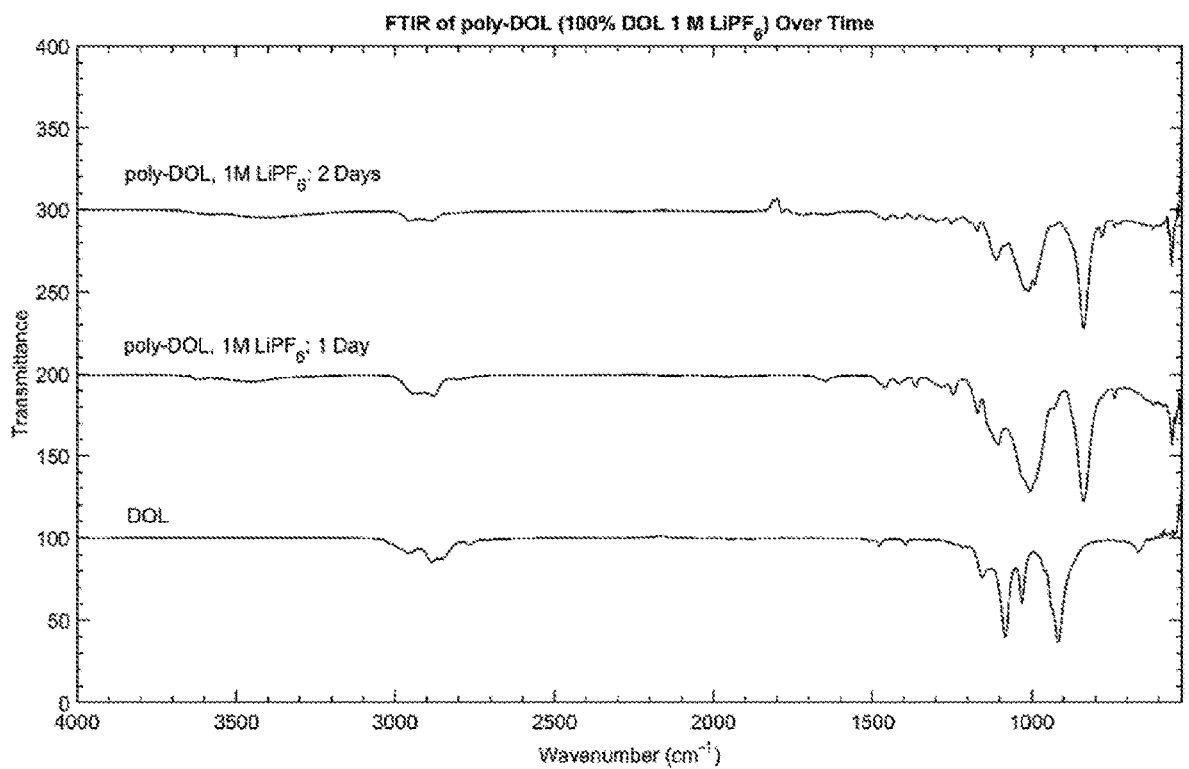

FIG. 57 shows FTIR of DOL, 1 M LiPF$_6$ over time.

Figure 58:
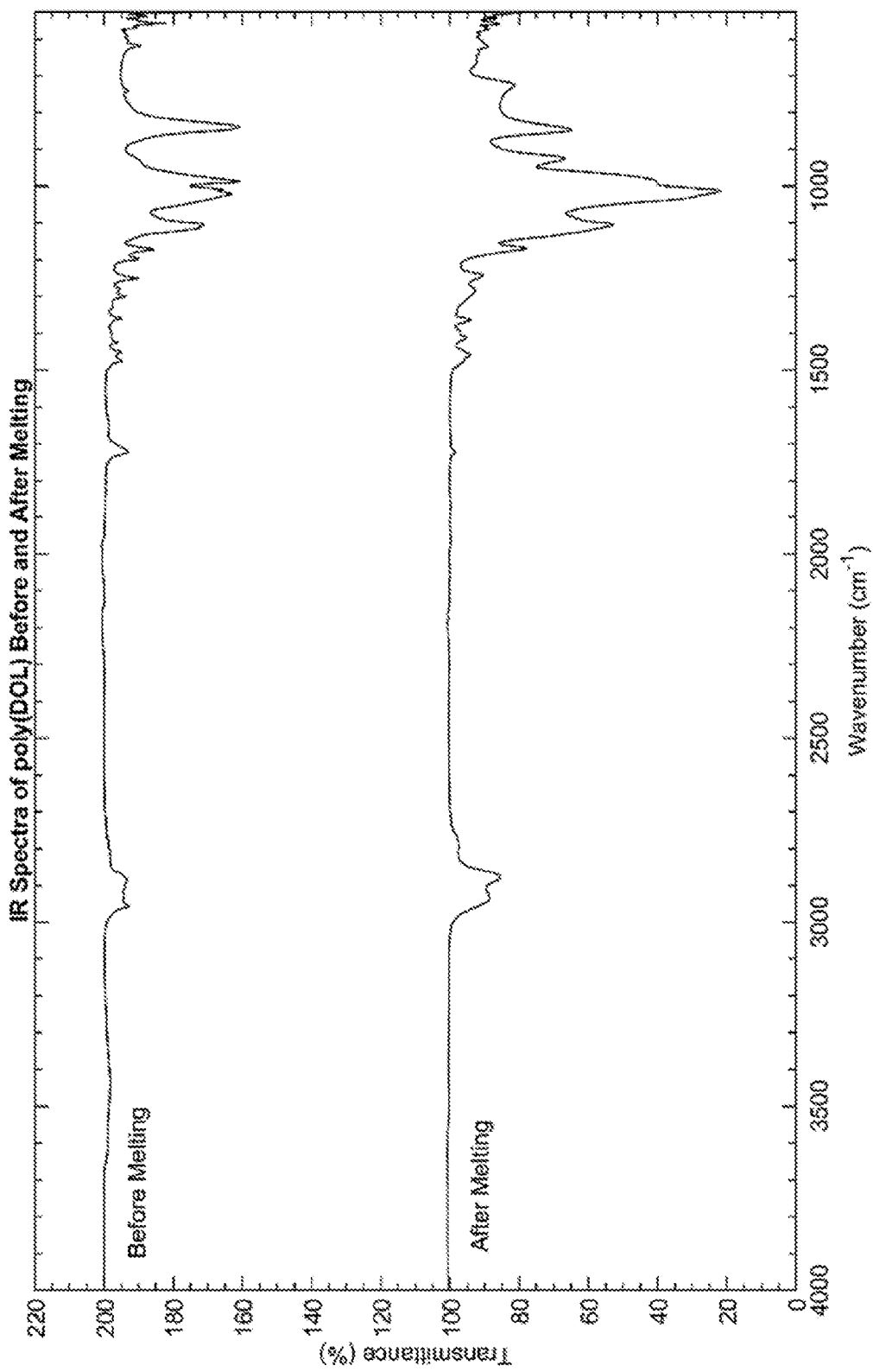

FIG. 58 shows FTIR of poly-DOL degradation (before/after heating to 100° C.).

Figure 59:
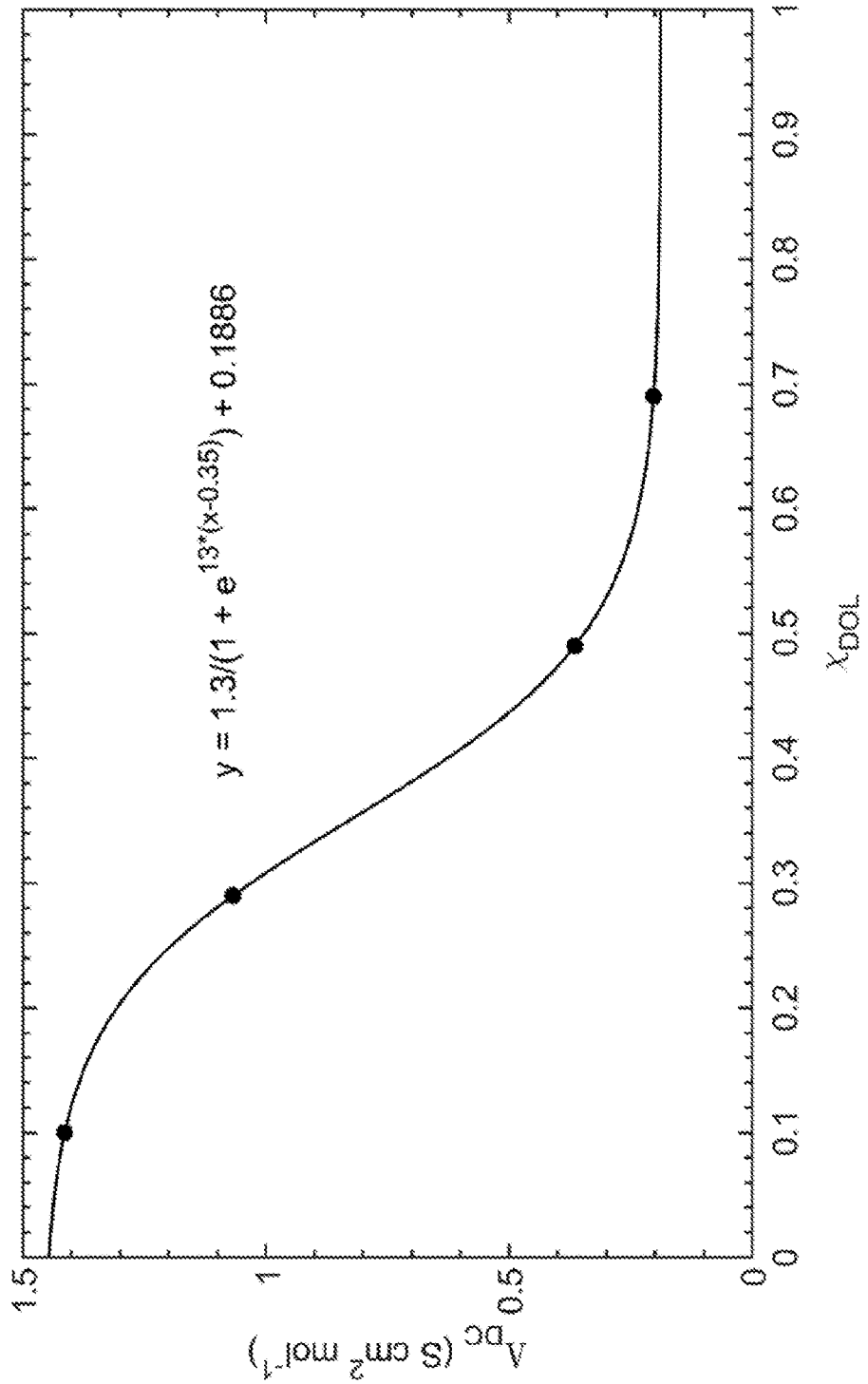

FIG. 59 shows room temperature (25° C.) DC ionic conductivity vs. DOL fraction with a crude logistic fit. Viscosity vs. DOL fraction yields a similar plot.

Figure 60:
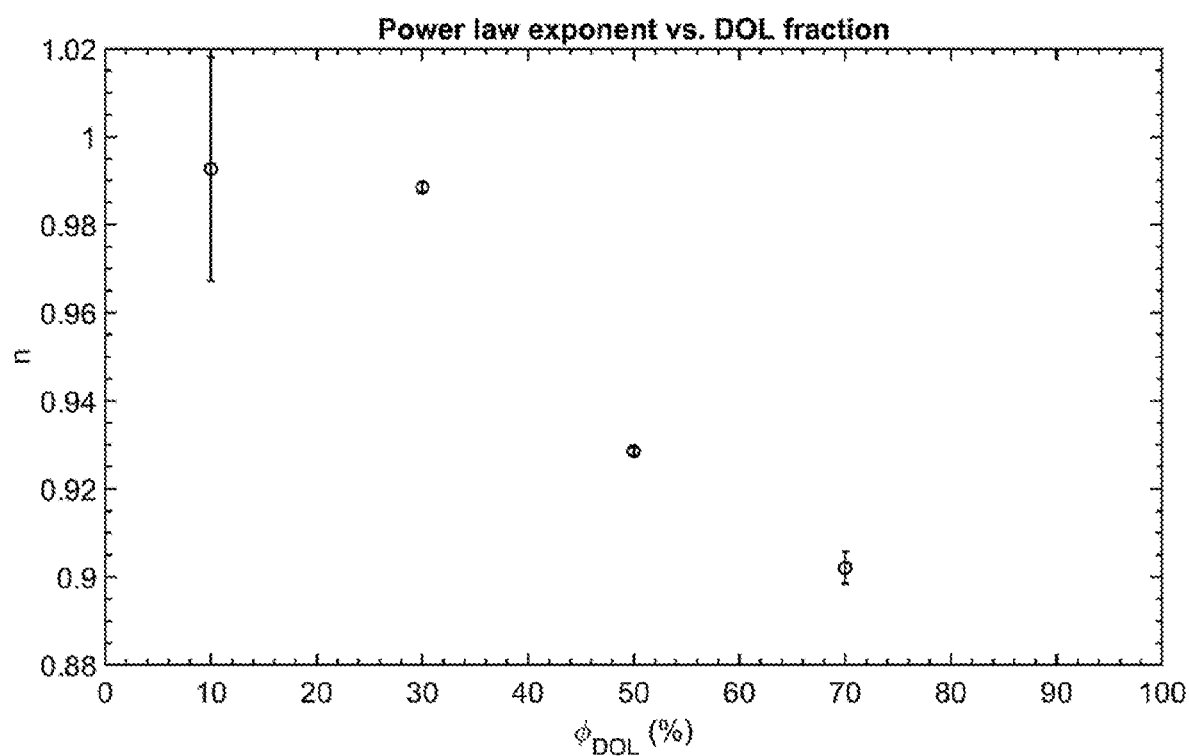

FIG. 60 shows power law exponent n vs. DOL fraction (showing 95% confidence bounds), indicating the increasing dependence of viscosity on shear rate as DOL fraction increases. Power Law Fit: $\eta = K(\dot{\gamma})^{n-1}$.

Figure 61:
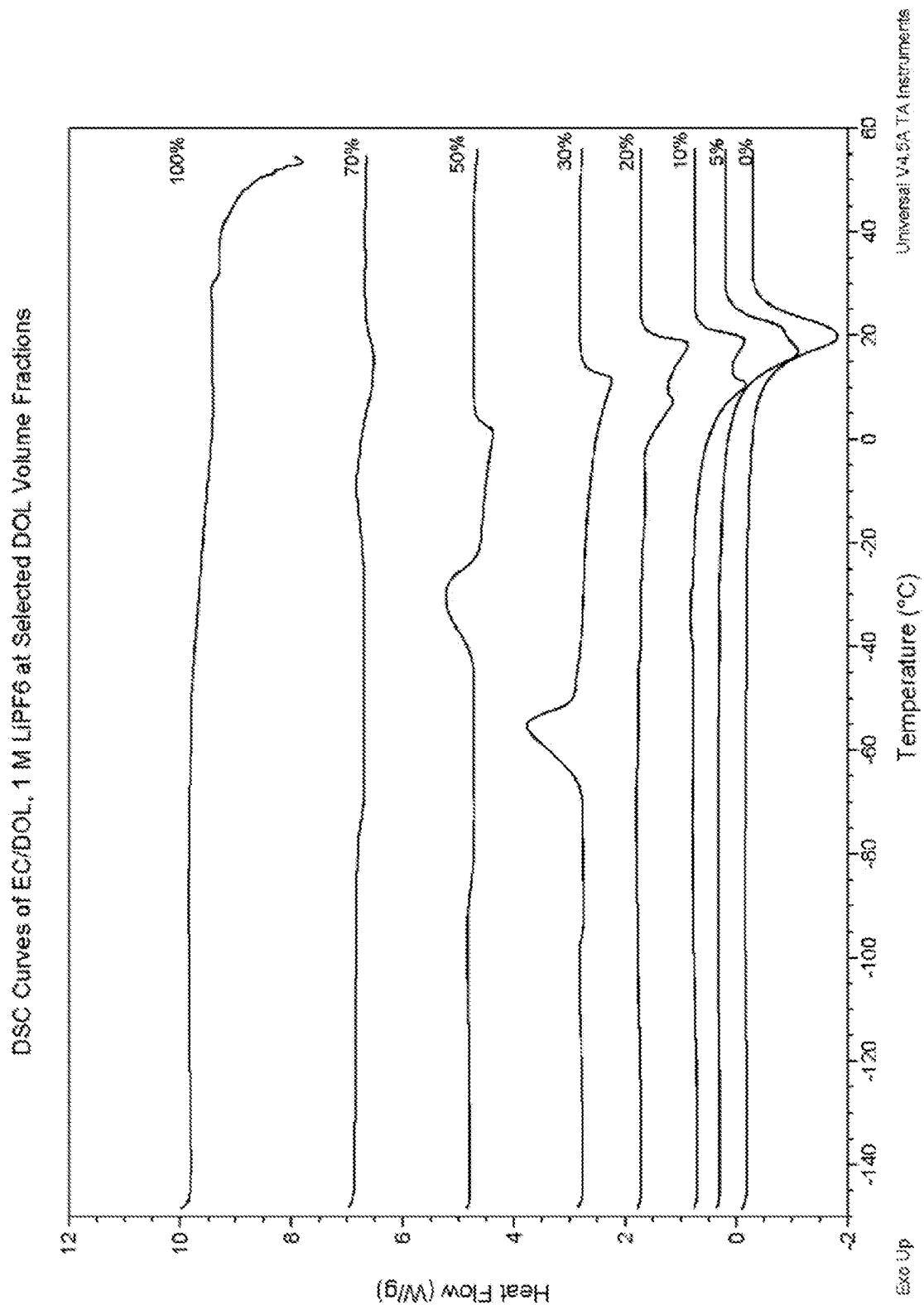

FIG. 61 shows phase diagram DSC traces. Scan rate=10° C./min.

Figure 62:
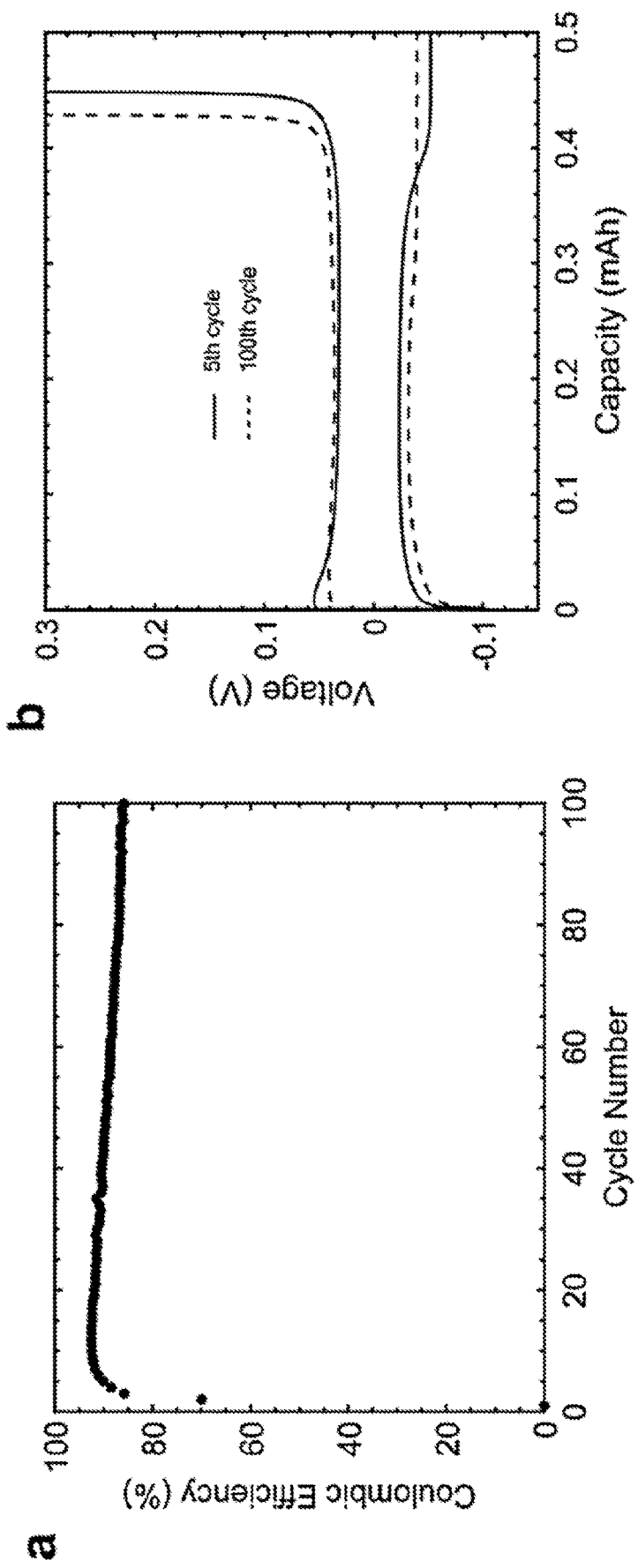

FIG. 62 shows (a, b) lithium plating-stripping performance of EC/DOL/1 M LiPF$_6$ electrolytes measured in Li∥stainless steel asymmetric cell at a rate of 1 mA/cm$^2$.

Figure 63:
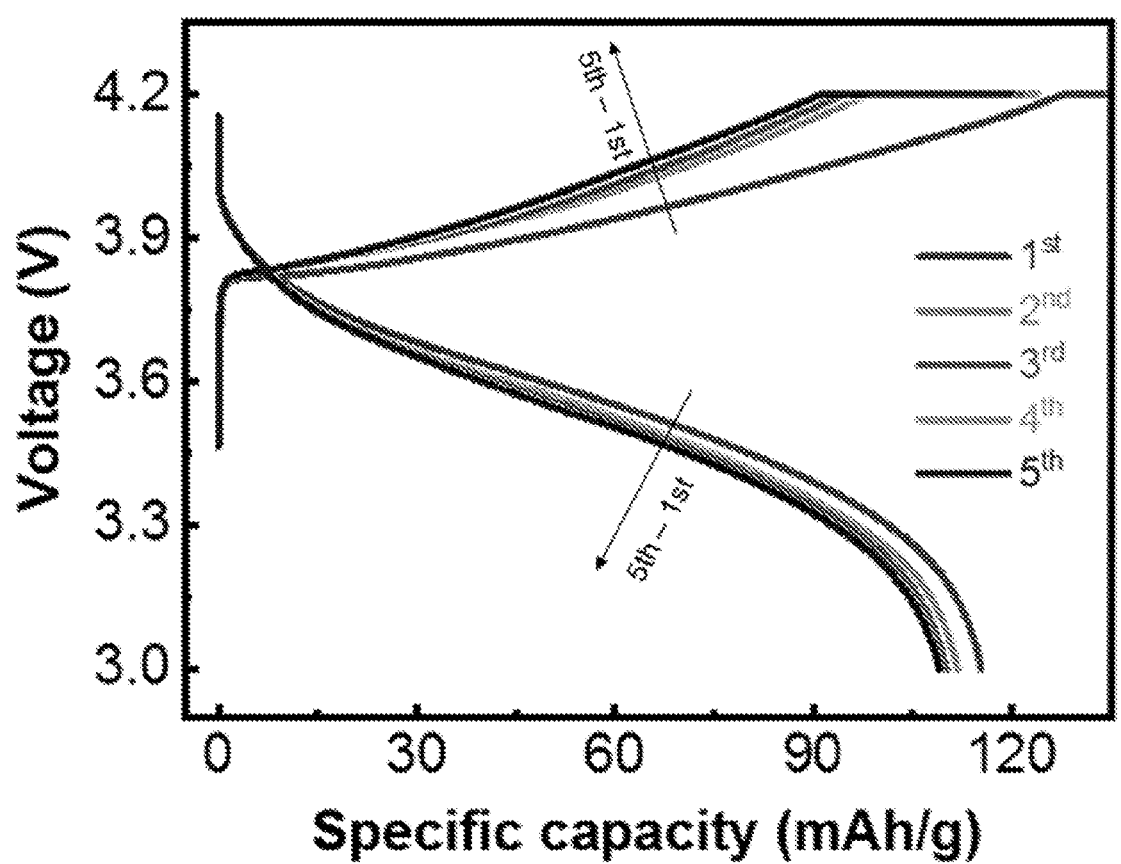

FIG. 63 shows discharge/charge profiles for Li metal-∣NCM622 cells with EC/DOL/1 M LiPF$_6$ electrolytes. The DOL content in polymer electrolyte is 50%. The cathode is nickel cobalt manganese oxide NCM622 (60% Ni) with high areal capacity of 3 mAh/cm$^2$. The cells are cycled at 0.2 C in room temperature.

Figure 64:
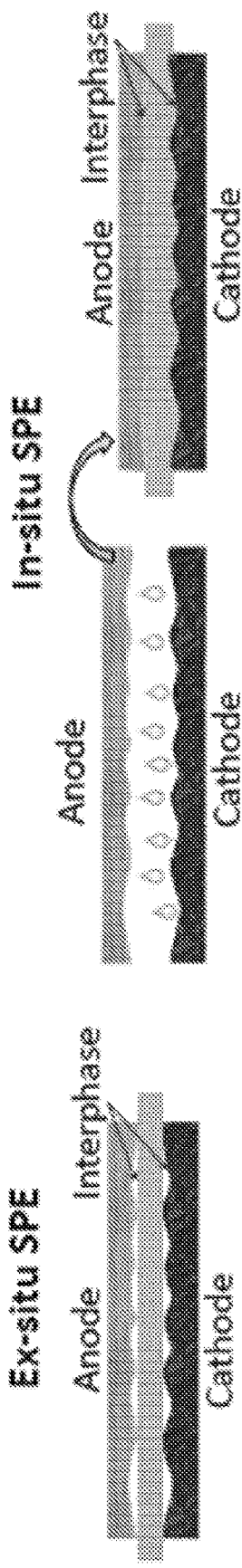

FIG. 64 shows a schematic diagram of an ex-situ and in-situ SPE.

Figure 65:
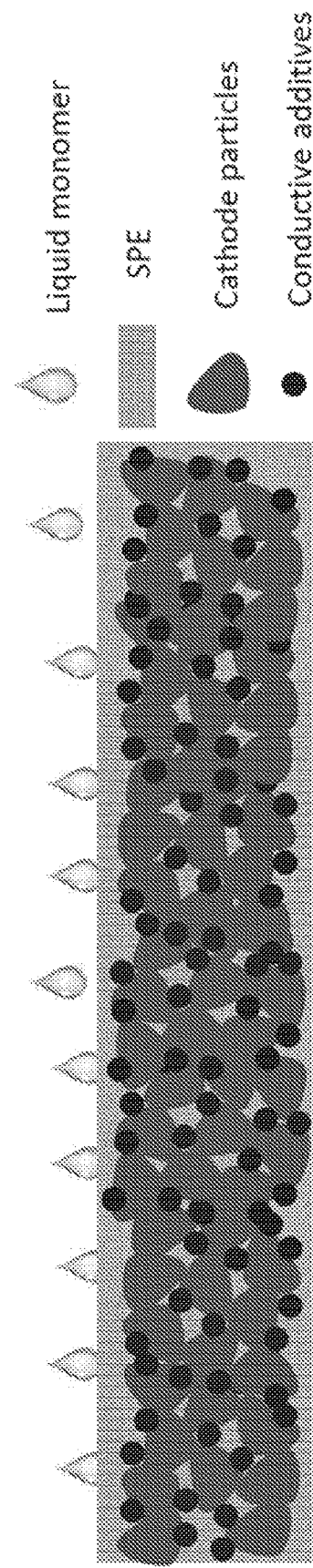

FIG. 65 shows functions of an in-situ SPE in porous cathodes, acting as binders and providing ion transport at the same time.

Figure 66:
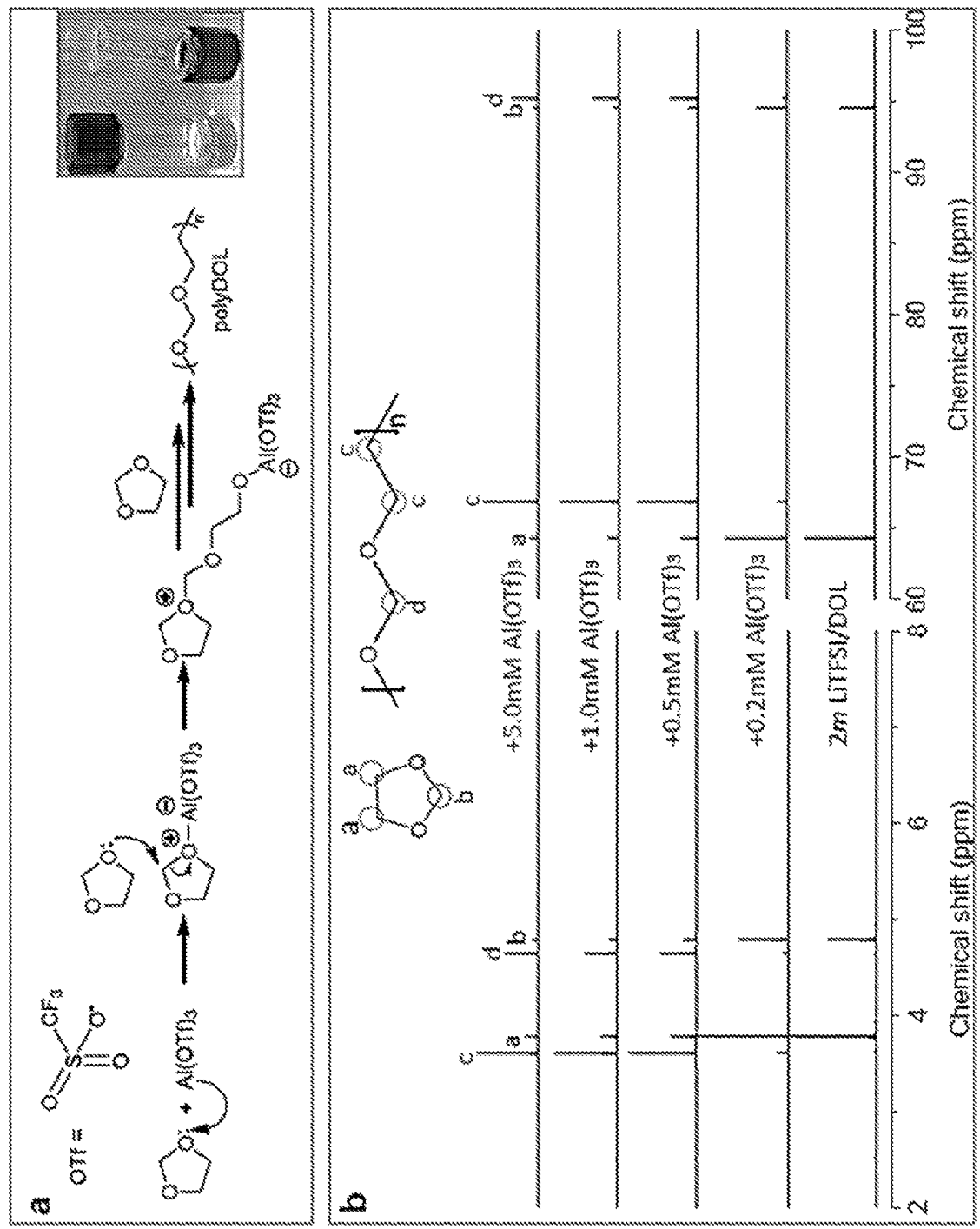

FIG. 66 shows (a) a reaction mechanism illustrating Al(OTf)$_3$ initiation of DOL polymerization. The insert is the digital photos of a liquid DOL electrolyte and a solid-state poly-DOL electrolyte. (b) H (left) and (c) (right) NMR spectra of a liquid DOL electrolyte and poly-DOL electrolytes with different concentrations of Al(OTf)$_3$.

Figure 67:
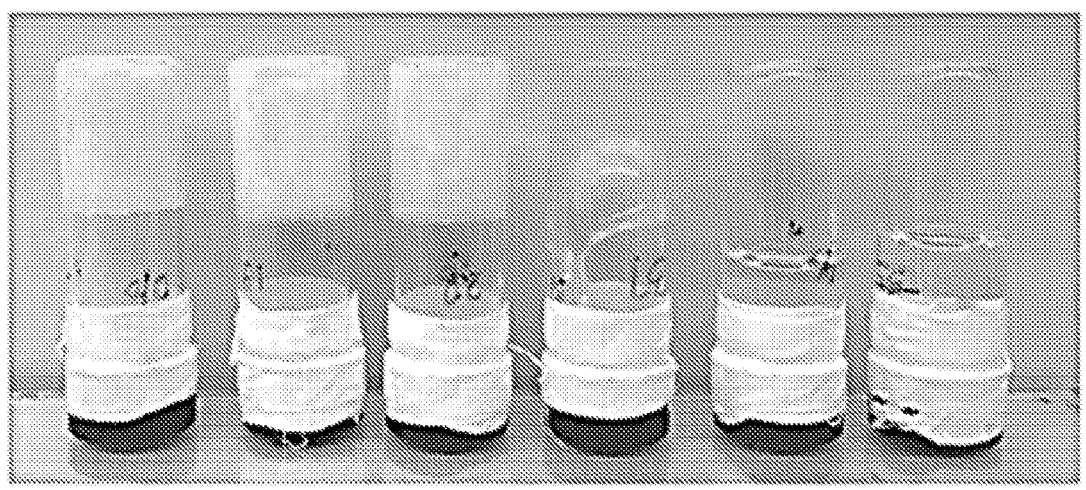

FIG. 67 shows digital photos of long term (over 1 month) prepared poly-DOL-SPE with different amount of EC plasticizer (0%, 10%, 20%, 30%, 40%, 50%, from left to right).

Figure 68:
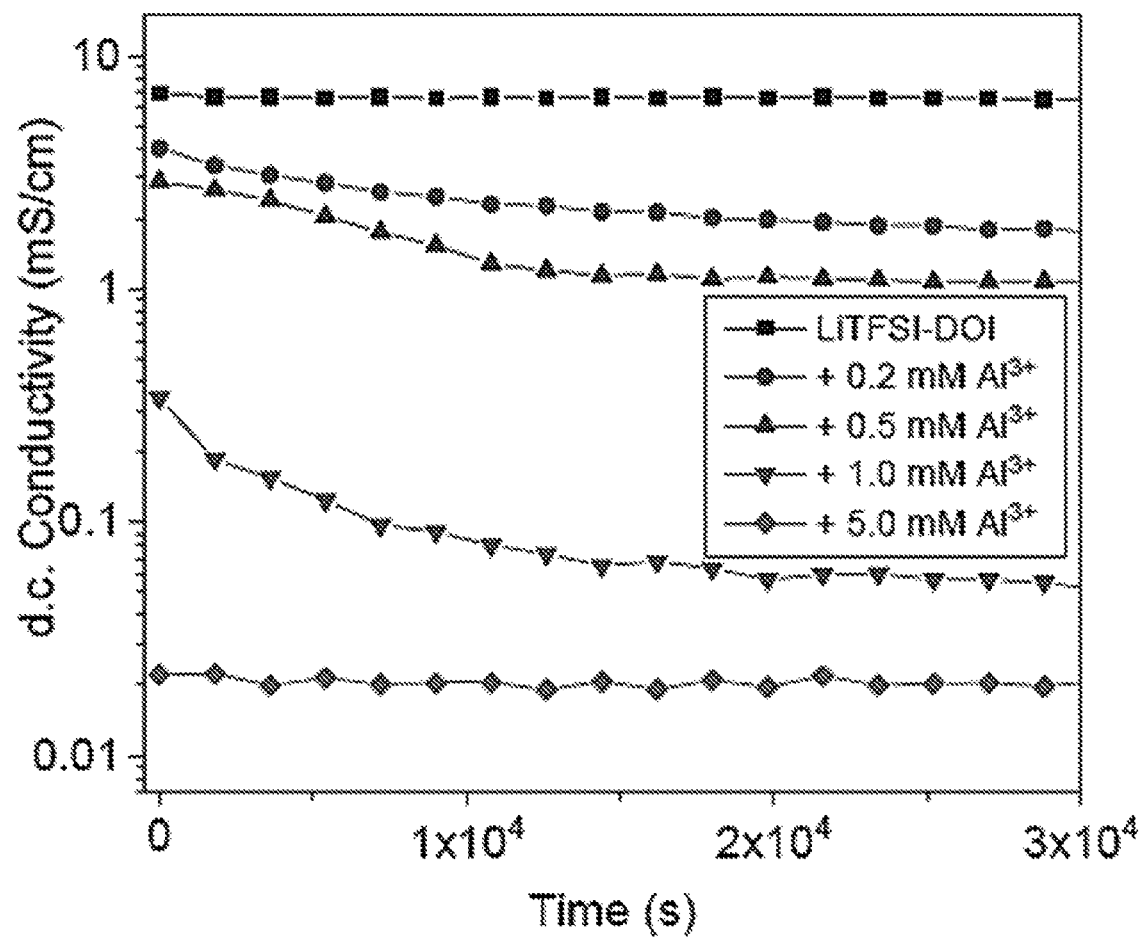

FIG. 68 shows direct current (DC) conductivity changes versus the time of DOL electrolyte polymerization.

Figure 69:
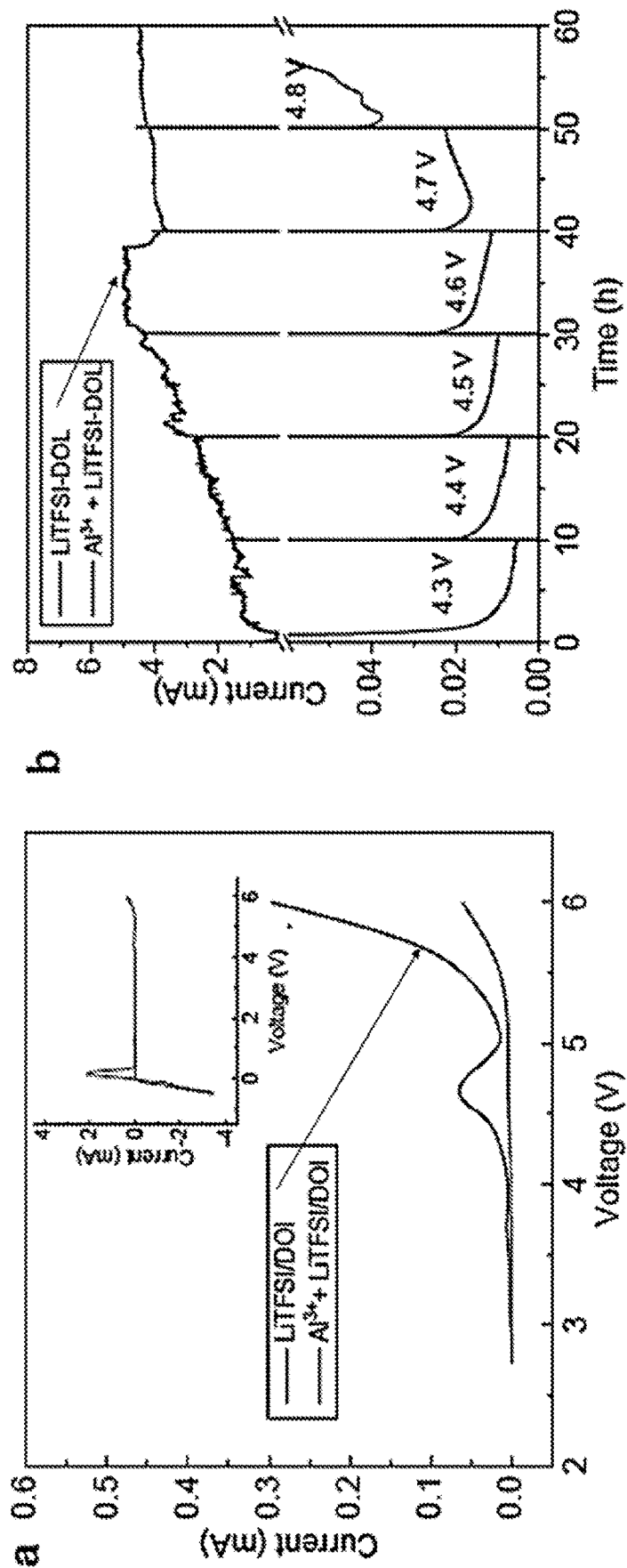

FIG. 69 shows electrochemical stabilities of poly-DOL electrolytes. (a) linear sweep of liquid DOL electrolyte and poly-DOL SPE, the inset is Li plating and stripping curves of poly-DOL electrolyte. (b) Floating test of liquid electrolyte and poly-DOL SPE using NCM cathodes.

Figure 70:
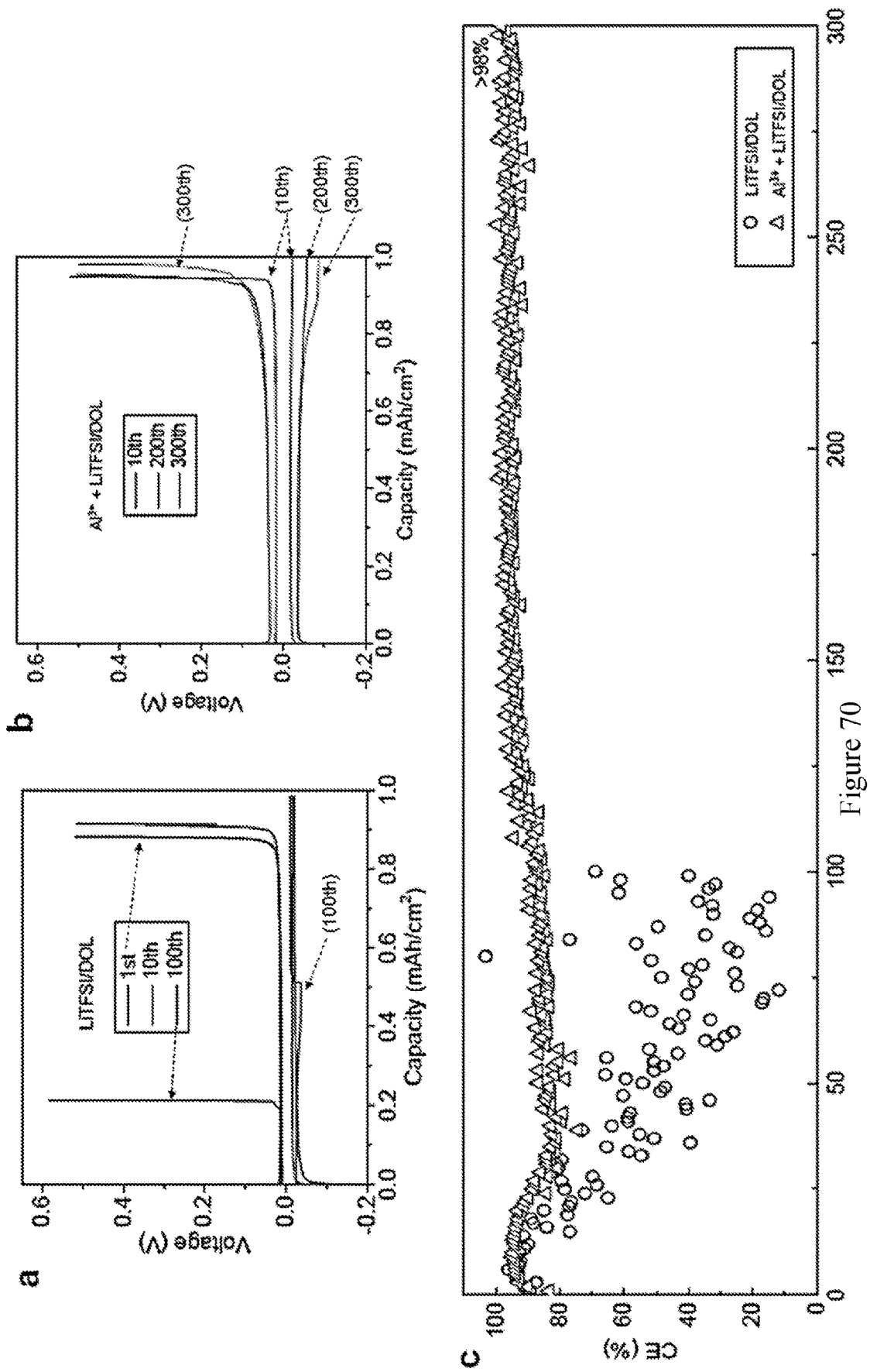

FIG. 70 shows Li stripping and plating profiles for different cycles using (a) liquid DOL electrolyte and (b) poly-DOL SPE. (c) Corresponding coulombic efficiencies.

Figure 71:
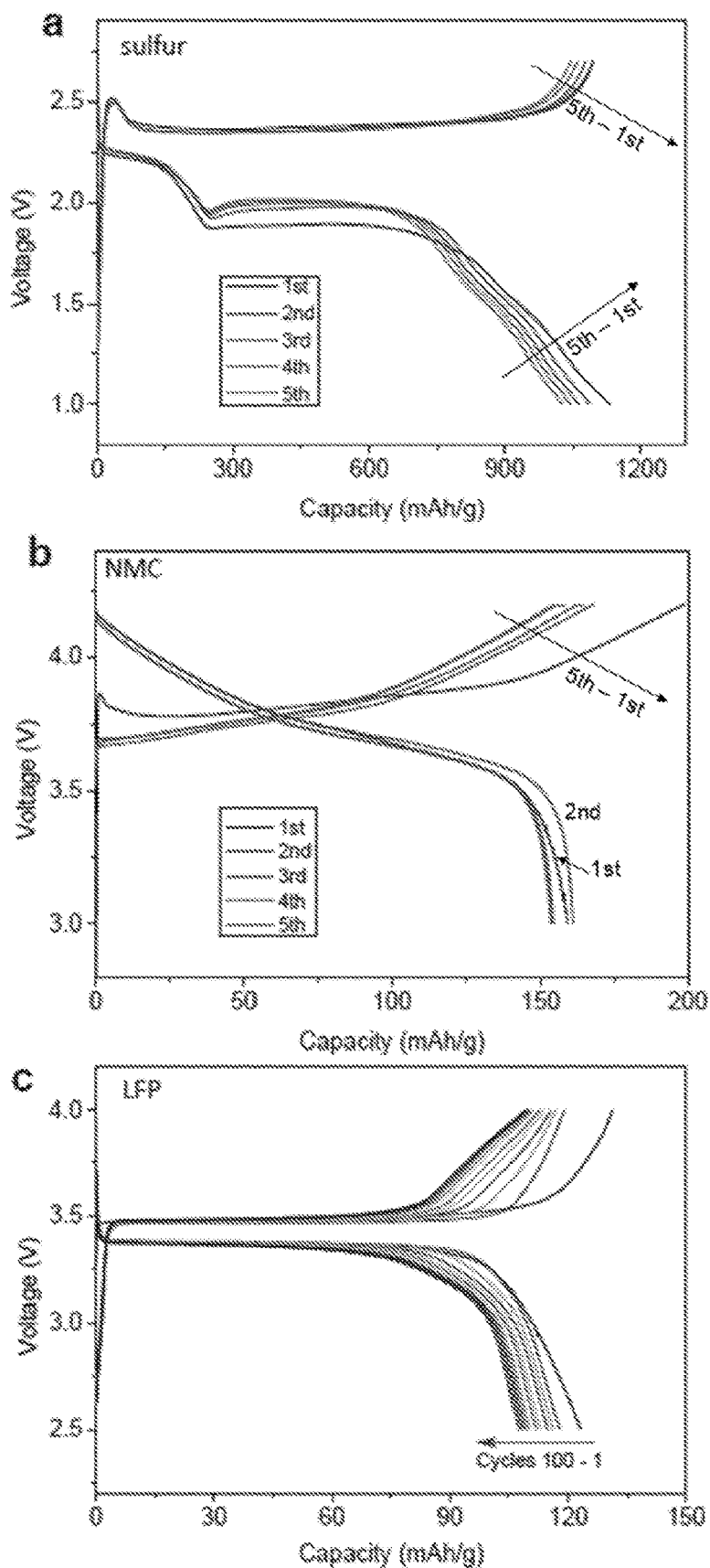

FIG. 71 shows Li metal full cell properties using in-situ SPE. (a) Li—S, (b) Li-NMC, (c) Li-LFP cells.

Figure 72:
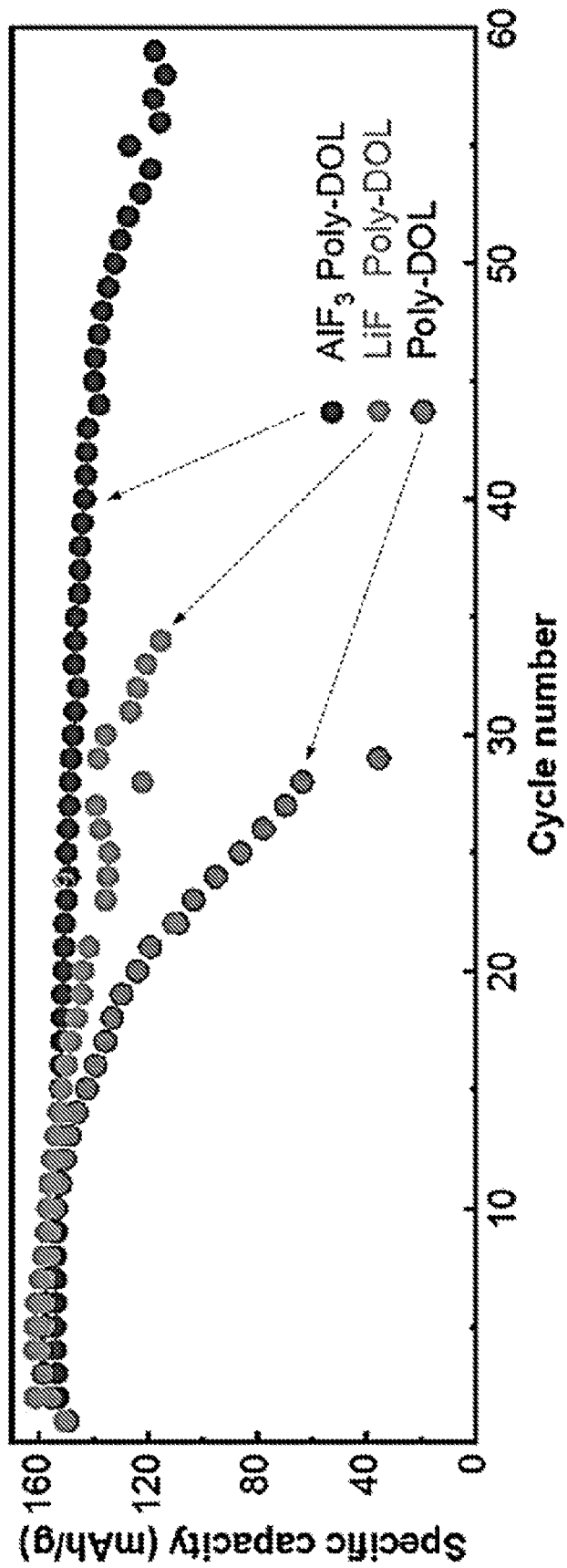

FIG. 72 shows improved cycling performance of in-situ poly-DOL electrolytes for high voltage cathodes (NCM622) after adding inorganic filters (LiF or $AlF_3$).

DETAILED DESCRIPTION OF THE DISCLOSURE

Although subject matter of the present disclosure is described in terms of certain embodiments and examples, other embodiments and examples, including embodiments and examples that do not provide all of the benefits and features set forth herein, are also within the scope of this disclosure. For example, various structural, logical, and process step changes may be made without departing from the scope of the disclosure.

Ranges of values are disclosed herein. The ranges set out a lower limit value and an upper limit value. Unless otherwise stated, the ranges include all values to the magnitude of the smallest value (either lower limit value or upper limit value) and ranges between the values of the stated range.

The present disclosure provides compositions and methods for forming solid-state polymer electrolytes (SPEs) using the compositions. The present disclosure also provides batteries comprising a solid-state electrolyte, which may be formed using a composition or method of the present disclosure.

In various examples, the present disclosure describes formation of SPEs in-situ by polymerization of a liquid precursor introduced in an electrochemical cell using conventional approaches. SPEs may be formed using a ring-open polymerization of a liquid ether based electrolyte.

The present disclosure describes an approach to in-situ polymerize cycled ether based electrolytes using, for example, a ring open reaction and initiator (e.g., an Al salt initiator), which is further applied as the solid-state polymer electrolytes (SPEs) in, for example, rechargeable batteries. In various examples, the resultant SPEs exhibit desirable ionic conductivity at room temperature (e.g., greater than 1 mS/cm), low interfacial resistances, and Li plating/striping efficiencies exceeding 98% after 300 charge-discharge cycles. Further applications demonstrate the SPEs can be used in, for example, Li—S, Li—$LiFePO_4$ and Li-NCM cells.

Without intending to be bound by any particular theory, it is considered that the problem of high interface resistance of the polymer and electrodes in a battery can be addressed by forming the SPE in-situ by polymerization of a liquid precursor introduced in an electrochemical cell. For example, using an initiator of $Al(CF_3SO_3)_3$ ($Al(OTF)_3$) at concentrations as low as 0.5 mM, the originally liquid LiTFSI-1,3-dioxolane (DOL) electrolyte is transformed to a transparent SPE with a high ionic conductivity of over >1 mS/cm at room temperature. An SPE of the present disclosure used in a rechargeable Li metal battery displayed Li plating/striping efficiencies exceeding 98% after 300 charge-discharge cycles, and may be used at least in Li—S, Li—$LiFePO_4$, Li—$LiCoO_2$, and Li-NCM cells.

In an aspect, the present disclosure provides compositions. The compositions may be referred to as SPE precursor compositions or liquid ether electrolytes. In various examples, the compositions comprise one or more cyclic ether(s), one or more salt(s), and, optionally, one or more initiator(s). In various examples, a composition is used to form an SPE. In an example; the composition does not form a gel electrolyte. The SPEs can be used in, for example, batteries, which may be primary or rechargeable/secondary batteries, such as, for example, Li-ion batteries, Li metal batteries, sodium-ion batteries, sodium metal batteries, and the like. Non-limiting examples of compositions are provided herein.

In various examples, a composition comprises: one or more cyclic ether(s) (e.g., ring-ether solvent(s)); a salt (e.g., a lithium salt, a sodium salt, or a combination thereof); and optionally, an initiator (e.g., a cationic polymerization initiator, such as, for example, a ring opening polymerization initiator). The compositions can be used to in-situ form a solid electrolyte in a device.

A composition can include various cyclic ethers. A composition may include a combination of cyclic ethers. A cyclic ether may comprise at least 2 oxygen atoms (e.g., 2 or 3 oxygen atoms) in the ring separated by at least one carbon atom and have 2 to 8 (2, 3, 4, 5, 6, 7, or 8) carbons in the ring. A cyclic ether may be referred to as a ring-ether solvent. A cyclic ether may be substituted with one or more linear or branched alkyl groups (e.g., $C_1$, $C_2$, $C_3$, $C_4$, $C_5$, or $C_6$ groups), each of which, independently, may be substituted with one or more halogen groups (fluorine, chlorine, bromine, or iodine groups). The halogen substituted groups may be perhalogenated groups. In various examples, the cyclic ether is chosen from 1,3-dioxolane, substituted 1,3-dioxolane (e.g., methyl substituted 1,3-dioxolane, such as, for example, 4-methyl-1,3-dioxolane, 2-vinyl-1,3-dioxolane, 2,2-bis(trifluoromethyl)-1,3-dioxolane, and the like), 1,4-dioxane, substituted 1,4-dioxane (e.g., 2,2-diethyl-1,4-dioxane, 2,2-dibutyl-1,4-dioxane, 2-(chloromethyl)-1,4-dioxane, and the like), 1,3-dioxane, substituted 1,3-dioxane (e.g., 2,4-dimethyl-1,3-dioxane, 2-(2-bromoethyl)-2,5,5-trimethyl-1,3-dioxane, 5-(2-bromoethyl)-2,2-dimethyl-1,3-dioxane, and the like), 1,3,6-trioxocane, substituted 1,3,6-trioxocane (e.g. 2-methyl-1,3,6-trioxocane, 2-(fluoro methyl)-1,3,6-trioxocane, and the like), and combinations thereof. Suitable cyclic ethers can be obtained commercially or made by methods known in the art.

A composition may further comprise one or more solvent(s). Examples of solvents include, but are not limited to, ethylene carbonate (EC), propylene carbonate (PC), fluoroethylene carbonate (FEC), vinylene carbonate (VC), dimethyl carbonate (DMC), ethyl methyl carbonate (EMC), diethyl carbonate (DEC), 1,2-dimethoxyethane (DME), diglyme (DEGDME), tetraglyme (TEGDME), and the like, and combinations thereof.

A composition can include various salts. A composition may include a combination of salts. In various examples, the salt is a lithium salt, a sodium salt, or a combination thereof. In various examples, the lithium salt is chosen from lithium triflate (LiOTf), $LiPF_6$, $LiAsF_6$, $LiBF_4$, LiBOB, LiF, LiCl, LiBr, LiI, $LiNO_3$, $LiClO_4$, and the like, and combinations thereof and/or the sodium salt is chosen from sodium triflate (NaOTf), $NaPF_6$, $NaNO_3$, $NaClO_4$, $NaAsF_6$, $NaBF_4$, NaBOB (sodium bis(oxalate)borate), NaF, NaCl, NaBr, NaI, and the like, and combinations thereof. Suitable salts can be obtained commercially or made by methods known in the art.

One or more of the salt(s) may be an ionic liquid (e.g., a lithium ionic liquid and/or a sodium ionic liquid). In various examples, the ionic liquid is a lithium ionic liquid (e.g., sulfonimide and imide ionic liquids) and is chosen from bis(trifluoromethane)sulfonimide lithium salt (LiTFSI), lithium bis(fluorosulfonyl)imide (LiFSI), lithium (fluorosulfonyl) (trifluoromethanesulfonyl) imide (LiFTFSI), and the like, and combinations thereof and/or the ionic liquid is a sodium ionic liquid and is chosen from bis(trifluoromethane)sulfonimide sodium salt (NaTFSI), sodium bis(fluorosulfonyl)imide, sodium (fluorosulfonyl) (trifluoromethanesulfonyl) imide (NaFTFSI), and the like, and combinations thereof. The salts may be a combination of non-ionic liquid salts and ionic liquid salts.

A salt may function as an initiator (e.g., a cationic polymerization initiator, such as, for example, a ring opening polymerization initiator). In this case, the composition may not include an initiator other than the salt(s). Non-limiting examples of such salts include lithium difluoro (oxalato)borate (LiBF$_2$(C$_2$O$_4$), LiDFOB), LiBF$_4$, LiPF$_6$, sodium difluoro(oxalato)borate (NaBF$_2$(C$_2$O$_4$), NaDFOB), and the like, and combinations thereof.

A composition can have various salt concentrations. In various examples, the salt(s) is/are present in the composition at a concentration (in the cyclic ether) of 0.1 M to 5 M, including all 0.05 M values and ranges therebetween.

A composition may have one or more initiator(s). In various examples, an initiator is a cationic polymerization initiator, such as, for example, a ring opening polymerization initiator. Suitable examples of initiators are known in the art and can be obtained commercially or made by methods known in the art.

An initiator or initiators may be present in a composition at various concentrations. In various examples, the initiator(s) concentration is 50 µM to 50 mM, including all integer µM values and ranges therebetween. In various other examples, the initiator(s) concentration is 0.1 mM to 5 mM.

An initiator may be an aluminum salt. In various examples, the aluminum salt is chosen from aluminum triflate (Al(CF$_3$SO$_3$)$_3$), bis(trifluoromethane)sulfonimide aluminum salt (AlTFSI), aluminum halides (AlF$_3$, AlCl$_3$, AlBr$_3$, and AlI$_3$), lithium difluoro(oxalato)borate (LiBF$_2$(C$_2$O$_4$), LiDFOB), LiBF$_4$, LiPF$_6$, sodium difluoro(oxalato) borate (NaBF$_2$(C$_2$O$_4$), NaDFOB), LiBF$_4$, and the like, and combinations thereof.

A composition may have a desirable water content. In various examples, a composition has a water content less than 100 ppm or less than 50 ppm or a composition is anhydrous. In an example, a composition has no detectible water. Water in a composition may be detected using conventional detection methods (e.g. Karl Fischer titration, Fourier transform infrared spectrometry, and the like).

A composition may comprise particles as additives. The particles may be high band-gap metal compounds. The particles may be nanoparticles. Combinations of particles may be used. Examples include, but are not limited to, metal oxide, metal sulfides, metal carbonate particles, and the like, and combinations thereof. Examples of metal oxides include, but are not limited to, silica particles, alumina particles, zirconia particles, titania particles, and the like, and combinations thereof.

The particles may have various sizes. In various examples, the particles have a size (e.g., a longest linear dimension, which may be a diameter) of 5 nm to 100 microns, including all 0.1 nm values and ranges therebetween. The particles may be monodisperse. The particles may also be bidisperse or polydisperse in multiple sizes.

At least a portion or all of the nanoparticles may functionalized with a polymer or polymer groups. Examples of such nanoparticles are known in the art and include, but are not limited to, those described in U.S. Pat. No. 9,397,366 (titled "Ionic-liquid nanoscale ionic material (IL-NIM) compositions, methods and applications" and issued Jul. 19, 2016) and U.S. Pat. No. 9,440,849 (titled "Nanoparticle organic hybrid materials (NOHMS)" and issued on Sep. 13, 2016), the disclosures of which with regard to nanoparticles functionalized with a polymer or polymer groups are incorporated herein by reference.

An initiator or initiators may be present in a composition at various concentrations. In various examples, the initiator(s) concentration is 50 µM to 50 mM, including all integer µM values and ranges therebetween. In various other examples, the initiator(s) concentration is 0.1 mM to 5 mM.

Particle additives may be present in a composition at various concentrations. In various examples, the particle concentration is 1 wt % to 30 wt % (based on the total weight of the composition), including all 0.1 wt % values and ranges therebetween.

Liquid ether electrolytes may be prepared by adding salts into ether solvents. Non-limiting examples of salts include, lithium salts, such as, for example, bis(trifluoromethane) sulfonimide lithium salt (LiTFSI), lithium triflate (LiOTf), lithium bis(fluorosulfonyl)imide (LiFSI), LiPF$_6$, LiNO$_3$, and LiClO$_4$, and sodium salts, such as, for example, bis(trifluoromethane)sulfonimide sodium salt (NaTFSI), sodium triflate (NaOTf), sodium bis(fluorosulfonyl)imide (NaFSI), NaPF$_6$, NaNO$_3$, and NaClO$_4$. The solvent may be ring-ether solvent(s), including, but not limited to, 1,3-dioxolane and 1,3-dioxolane-based solvents (e.g., 4-methyl-1,3-dioxolane, 2,2-bis(trifluoromethyl)-1,3-dioxolane and the like), 1,4-dioxane-based solvent, and the like, and combinations thereof. The composition may comprise a mixture of a ring-ether solvent (such as, for example, as those described herein) with one or more solvent(s) that are commonly used in battery field (e.g., ethylene carbonate (EC), propylene carbonate (PC), fluoroethylene carbonate (FEC), vinylene carbonate (VC), dimethyl carbonate (DMC), ethyl methyl carbonate (EMC), diethyl carbonate (DEC), 1,2-dimethoxyethane (DME), diglyme (DEGDME), tetraglyme (TEGDME), and the like, and combinations thereof). Non-limiting examples of salts may also include LiNO$_3$, LiF, AlF$_3$, Al$_2$O$_3$ particles that may be used as fillers of electrolytes.

The concentrations of the concentration of the salt(s) in the cyclic ether(s), and optionally, solvent(s), which may be referred to as a liquid electrolyte, may be 0.1 M to 5 M, including every 0.01 M value and range therebetween. In various examples, concentration of the salt(s) in the cyclic ether(s), and optionally, solvent(s) is 0.1-0.5 M, 0.1-1.0 M, 0.1-2 M, 0.1-2.5 M, 0.1-3.0 M, or 0.1-4.0 M.

In various examples, all of the components of the composition are compatible with the materials (e.g., cathode materials, anode materials, conducting ions, separator (if present), and the like) and operating conditions (e.g., voltage window, operating temperature range, device lifetime, and the like) of a device (e.g., an battery or a supercapacitor) in which the composition is to be used or is used. In these examples, all of the components of the composition may not adversely affect one or more or all of the operating conditions of a device by 20% or more, 10% or more, 5% or more, or 1% or more.

In various examples, a composition comprises a means for forming an SPE (e.g., an SPE of the present disclosure). The means for forming an SPE may be cyclic ether(s), salt(s), and optionally, inititator(s). These compositions may further comprise a salt, and optionally, an initiator.

In an aspect, the present disclosure provides methods of forming SPEs. The methods may use a composition of the present disclosure. Non-limiting examples of methods are provided herein.

SPEs may be prepared using a ring-opening polymerization of liquid ether-based electrolytes. The ring-opening polymerization of preparing SPEs may be a cationic polymerization.

An SPE may comprise (or be) a solid-state material or a nominally solid-state material. An SPE may comprise solid polymeric material/polymer. An SPE may behave as a solid and may or may not comprise solid polymeric material/polymer. An SPE may comprise oligomers or polymers formed by ring-opening polymerization of cyclic ethers. An SPE may have varying composition. For example, an SPE may comprise oligomer and/or polymers, either of which may have varying molecular weight (e.g., Mw and/or Mn). An SPE may be a discrete separator and may or may not exhibit phase separation. An SPE may or may not exhibit phase separation. An SPE may be a discrete separator and not exhibit phase separation. Any phase separation may not be complete phase separation. In an example; the SPE is not a gel electrolyte.

In various examples, a method for forming a solid-state electrolyte comprises: providing a composition of the present disclosure disposed between a cathode and an anode, and optionally, contacting the cathode material with the composition, such that a solid-state polymer electrolyte (e.g., comprising an oliogoether, polyether, or a combination thereof) is formed. A method may provide in-situ formation of an electrolyte, which means the liquid electrolyte with initiator is put between cathode and anode first for device assembly, then the polymer formed inside the device. Typically, the polymer is formed in from 0.5 hours to 2 days.

The providing may comprise introducing the composition into a space between the cathode and anode (e.g., a space defined by one or more surface of the cathode and one or more surface of the anode); allowing the composition to polymerize and form a polymeric material/polymer; and optionally, contacting the cathode material with the composition. The polymeric material/polymer may completely fills the space between and/or is in electrical contact with the anode and cathode, and at least 80%, at least 90%, or at least 95% of the cyclic ether is polymerized. The polymeric material/polymer may be a polyether.

A method may also comprise contacting (e.g., soaking) a cathode material, which may be an intercalating cathode material that may be porous, in a composition of the present disclosure. This contacting may provide a cathode material where at least a portion of the pores of the polymer have polymeric material/polymer disposed therein such that the cathode material is in electrical contact with the SPE.

In an aspect, the present disclosure provides devices. The devices comprise one or more SPE of the present disclosure and/or one or more SPE formed by a method of the present disclosure. A device may be an electrochemical cell. A device may be a battery (e.g., primary battery, a rechargeable/secondary battery, such as, for example, a lithium-ion conducting or sodium-ion conducting rechargeable/secondary battery, or the like). A battery may be a lithium metal battery or sodium metal battery, or the like. The prepared SPEs may be used as both electrolytes and binders in the batteries. A device may be a supercapacitor or the like. Non-limiting examples of devices are provided herein.

In various examples, a device comprises: an SPE (e.g., a solid-state electrolyte formed from a composition of the present disclosure or formed using a method of the present disclosure. The SPE comprises (e.g., is) a polymeric material (e.g., an oligomer, a polymer, or combination thereof). The SPE may function as a separator. The polymeric material/polymer may be a polyether.

An SPE may be used as both an electrolyte and/or binder in the same battery. The polymeric material/polymer of the SPE may be a network of interconnected and/or entangled polymer chains. The polymeric material/polymer of the SPE may be substantially amorphous or amorphous. In an example, the polymeric material/polymer has no reversible melting and recrystallization peaks are detected through DSC curves.

The SPE may have various desirable properties. In various examples, an SPE exhibits one or more of the following: a glass transition temperature (e.g., wherein the glass transition is the only transition observed in DSC analysis of the polymer, for example, no melting and/or recrystallization transitions are observed); a molecular weight (Mw and/or Mn) of 1K to 100K g/mol, including all integer g/mol values and ranges therebetween; a polydispersity index of 1 to 3, including all 0.01 values and ranges therebetween; an room-temperature ionic conductivity of 0.01 mS/cm to 10 mS/cm, including all 0.01 mS/cm values and ranges therebetween; or a glass-transition temperature ranges from −80° C. to −20° C., including all integer ° C. values and ranges therebetween.

A device may further comprise a liquid electrolyte. A liquid electrolyte may comprise a salt and a solvent. Examples of salts and solvents are provided herein. Examples of liquid electrolytes include, but are not limited to, $LiPF_6$ in EC/DMC, LiTFSI in EC/DMC, and the like. The liquid electrolyte may contact the SPE.

The concentrations of liquid electrolyte (e.g., the concentration of the salt(s) in the solvent(s)) may be 0.1 M to 5 M, including every 0.01 M value and range therebetween. In various examples, the liquid electrolyte concentration is 0.1-0.5 M, 0.1-1.0 M, 0.1-2 M, 0.1-2.5 M, 0.1-3.0 M, or 0.1-4.0 M.

A device may further comprise a current collector disposed on at least a portion of the cathode and/or the anode. In various examples, the current collector is a conducting metal or metal alloy.

A device (e.g., a battery) may comprise a two compartment cell. In this case, the cathode compartment comprises a liquid electrolyte (e.g., as an alkyl carbonate with desirable (e.g., high) oxidative stability that is electrochemically stable in continuous contact with the fully charged cathode) and the anode compartment comprises an SPE, which may be the electrolyte.

A device may be a battery. In various examples, a battery further comprises: a cathode; an anode; and optionally, a separator, and optionally, a liquid electrolyte. The liquid electrolyte, and, if present, the separator, is disposed between the cathode and anode.

A device may be a lithium-ion conducting solid-state battery. In this case, the polymeric material may be a lithium ion conductor.

A device (e.g., a battery) may comprise one or more lithium-containing cathode material(s). A lithium-containing cathode material may be chosen from lithium nickel manganese cobalt oxides, $LiCoO_2$, $LiNi_{1/3}Co_{1/3}Mn_{1/3}O_2$, $LiNi_{0.5}Co_{0.2}Mn_{0.3}O_2$, lithium manganese oxides (LMOs), lithium iron phosphates (LFPs), $LiMnPO_4$, $LiCoPO_4$, and $Li_2MMn_3O_8$, wherein M is chosen from Fe, Co, and the like, and combinations thereof, and the like, and combinations thereof.

A device (e.g., a battery) may comprise one or more anode material(s). An anode material may be chosen from lithium metal, lithium-ion conducting anode materials (e.g., wherein the lithium ion-conducting anode material is a lithium containing material chosen from lithium carbide, $Li_6C$, lithium titanates (LTOs), and the like, and combinations thereof), and combinations thereof.

A device may be a sodium-ion conducting solid-state battery. In this case, the polymeric material may be a sodium-ion conductor.

A device (e.g., a battery) may comprise one or more sodium-containing cathode material(s). A sodium-containing cathode material may be chosen from sodium-containing cathode materials (e.g., wherein the sodium-containing cathode material is chosen from $Na_2V_2O_5$, P2-$Na_{2/3}Fe_{1/2}Mn_{1/2}O_2$, $Na_3V_2(PO_4)_3$, $NaMn_{1/3}Co_{1/3}Ni_{1/3}PO_4$, $Na_{2/3}Fe_{1/2}Mn_{1/2}O_2$@graphene composites, and the like, and combinations thereof), or conversion type cathode materials (e.g. sulfur, oxygen, iodine, metal sulfides such as $MoS_2$, $FeS_2$, $TiS_2$.

A device (e.g., a battery) may comprise one or more anode material(s). An anode material may be chosen from sodium metal, sodium-ion conducting anode materials (e.g., wherein the sodium-containing anode material is chosen from $Na_2C_8H_4O_4$ and $Na_{0.66}Li_{0.22}Ti_{0.78}O_2$, and combinations thereof), and the like, and combinations thereof.

A cathode and/or anode may comprise a conducting carbon material. A cathode may comprise a conversion type material chosen from sulfur, sulfur composite materials, and polysulfide materials, air (oxygen), iodine, metal sulfides such as $MoS_2$, $FeS_2$, $TiS_2$. An anode may comprise a material chosen from silicon-containing materials, tin and its alloys, tin/carbon, and phosphorus.

A solid-state electrolyte, cathode, anode, and, optionally, the current collector may form a cell of a battery. The battery may comprises a plurality of the cells and each adjacent pair of the cells is separated by a bipolar plate.

A device may have one or more desirable properties. In various examples, a device exhibits one or more of the following:
improved voltage stability (e.g., greater than 4 V);
flat metal (Li or Na) deposition on anode side for greater than 100 cycles;
improved cycled life (e.g., greater than 100 cycles);
high Coulombic efficiency (e.g., greater than 98%); or
low interphase resistance (e.g., less than 1000 $\Omega \cdot cm^2$).

The steps of the method described in the various embodiments and examples disclosed herein are sufficient to produce a fabric of the present disclosure. Thus, in an embodiment, a method consists essentially of a combination of the steps of the methods disclosed herein. In another embodiment, a method consists of such steps.

The following Statements provide examples of compositions, methods, and devices of the present disclosure:

Statement 1. A composition of the present disclosure (e.g., a device comprising: one or more cyclic ether(s) (e.g., one or more ring-ether solvent(s)) (e.g., one or more cyclic ether(s) with at least 2 oxygen atoms in the ring separated by at least one carbon atom and 3, 4, 5, 6, 7, or 8 carbons in the ring); one or more salt(s) (e.g., a lithium salt, a sodium salt, or a combination thereof); and optionally, one or more initiator(s) (e.g., a cationic polymerization initiator, such as, for example, a ring opening polymerization initiator)). The compositions (which may be referred to as SPE precursor compositions) may be used to in-situ form a solid electrolyte in a device. The composition may comprise a mixture of a cyclic ether and one or more solvent(s) including, but not limited to, ethylene carbonate (EC), propylene carbonate (PC), fluoroethylene carbonate (FEC), Vinylene carbonate (VC), Dimethyl carbonate (DMC), ethyl methyl carbonate (EMC), diethyl carbonate (DEC), 1,2-Dimethoxyethane (DME), Diglyme (DEGDME), Tetraglyme (TEGDME). The composition may comprise one or more additives (e.g., one or more particles).

Statement 2. A composition according to Statement 1, where the cyclic ether is chosen from 1,3-dioxolane, substituted 1,3-dioxolanes (e.g., methyl substituted 1,3-dioxolane, such as, for example, 4-methyl-1,3-dioxolane, 2-vinyl-1,3-dioxolane, 2,2-bis(trifluoromethyl)-1,3-dioxolane, and the like), 1,4-dioxane, substituted 1,4-dioxanes (e.g., 2,2-diethyl-1,4-dioxane, 2,2-dibutyl-1,4-dioxane, 2-(chloromethyl)-1,4-dioxane, and the like), 1,3-dioxane, substituted 1,3-dioxanes (e.g., 2,4-dimethyl-1,3-dioxane, 2-(2-bromoethyl)-2,5,5-trimethyl-1,3-dioxane, 5-(2-bromoethyl)-2,2-dimethyl-1,3-dioxane, and the like), 1,3,6-trioxocane, substituted 1,3,6-trioxocanes, and the like, and combinations thereof.

Statement 3. A composition according to Statements 1 or 2, where the lithium salt is chosen from Lithium triflate (LiOTf), $LiPF_6$, $LiAsF_6$, $LiBF_4$, LiBOB, LiF, LiCl, LiBr, LiI, $LiNO_3$, $LiClO_4$, and the like, and combinations thereof.

Statement 4. A composition according to any one of the preceding Statements, where the sodium salt is chosen from sodium triflate (NaOTf), $NaPF_6$, $NaNO_3$, $NaClO_4$, $NaAsF_6$, $NaBF_4$, NaBOB (sodium bis(oxalate)borate), NaF, NaCl, NaBr, NaI, and the like, and combinations thereof.

Statement 5. A composition according to any one of the preceding Statements, where the salt is an ionic liquid (e.g., a lithium ionic liquid and/or a sodium ionic liquid).

Statement 6. A composition according to Statement 5, where the ionic liquid is a lithium ionic liquid (e.g., sulfonimide and imide ionic liquids) and is chosen from bis(trifluoromethane)sulfonimide lithium salt (LiTFSI), lithium bis(fluorosulfonyl)imide (LiFSI), lithium (fluorosulfonyl)(trifluoromethanesulfonyl) imide (LiFTFSI), and the like, and combinations thereof.

Statement 7. A composition according to Statements 5 or 6, where the ionic liquid is a sodium ionic liquid and is chosen from bis(trifluoromethane)sulfonimide sodium salt (NaTFSI), sodium bis(fluorosulfonyl)imide, sodium (fluorosulfonyl)(trifluoromethanesulfonyl) imide (NaFTFSI), and the like, and combinations thereof.

Statement 8. A composition according to any one of the preceding Statements, where the salt(s) is/are present in the composition at a concentration of 0.1 M to 5 M, including all 0.05 M values and ranges therebetween.

Statement 9. A composition according to any one of the preceding Statements, where the initiator is an aluminum salt.

Statement 10. A composition according to Statement 9, where the aluminum salt is chosen from aluminum triflate ($Al(CF_3SO_3)_3$), bis(trifluoromethane)sulfonimide aluminum salt (AlTFSI), aluminum halides ($AlF_3$, $AlCl_3$, $AlBr_3$, $AlI_3$), lithium difluoro(oxalato)borate ($LiBF_2(C_2O_4)$, LiDFOB), $LiBF_4$, sodium difluoro(oxalato)borate ($NaBF_2(C_2O_4)$, NaDFOB), $LiBF_4$, and the like, and combinations thereof.

Statement 11. A composition according to any one of the preceding Statements, where the composition is anhydrous (e.g., no detectable water using conventional detection methods or having a water content less than 100 ppm or less than 50 ppm).

Statement 12. A method of the present disclosure (e.g., a method for forming a solid-state polymer electrolyte (SPE) comprising: providing a composition of the present disclosure (e.g., a composition of any one of Statements 1-11) disposed between a cathode and an anode, such that a SPE (e.g., comprising an oligoether, polyether, or a combination thereof) is formed. The method provides in-situ formation of an SPE, which means the liquid electrolyte with initiator is put between cathode and anode first for device assembly, then the polymer formed inside the device.) Typically, the polymer is formed in from 0.5 hours to 2 days.

Statement 13. A method for forming a solid-state electrolyte according to Statement 12, where the providing comprises: introducing the composition into a space between the cathode and anode (e.g., a space defined by one or more surface of the cathode and one or more surface of the anode); allowing the composition to polymerize and form a polymeric material/polymer, where the polymeric material/polymer completely fills the space between and/or is in electrical contact with the anode and cathode, and at least 80%, at least 90%, or at least 95% of the cyclic ether is polymerized. The polymeric material/polymer may be a polyether.

Statement 14. A device of the present disclosure (e.g., an electrochemical device, such as, for example, a solid-state battery, which may be a primary batter, a secondary/rechargeable battery, a supercapacitor, or the like) (e.g., a device comprising: a solid-state polymer electrolyte (SPE) (e.g., an SPE formed from a composition of any one of Statements 1-11 or a method of Statements 12 or 13) that comprises (e.g., is) a polymeric material (e.g., a polymer), which may function as a separator). The polymeric material/polymer may be an oligoether, polyether, or a combination thereof. An SPE may be used as both an electrolyte and/or binder in the same battery. A device may further comprise a liquid electrolyte.

Statement 15. A device according to Statement 14, where the polymeric material/polymer is a network of interconnected and/or entangled polymer chains.

Statement 16. A device according to Statements 14 or 15, where the polymeric material/polymer is substantially amorphous or amorphous, (e.g., no reversible melting and recrystallization peaks are detected through DSC curves).

Statement 17. A device according to any one of Statements 14-16, where the solid-state electrolyte exhibits one or more of the following: a glass transition temperature (e.g., where the glass transition is the only transition observed in DSC analysis of the polymer, for example, no melting and/or recrystallization transitions are observed); a molecular weight (Mw and/or Mn) of 1K to 100K g/mol, including all integer g/mol values and ranges therebetween; a polydispersity index of 1 to 3, including all 0.01 values and ranges therebetween; a room-temperature ionic conductivity of 0.01 mS/cm to 10 mS/cm, including all 0.01 mS/cm values and ranges therebetween; or a glass-transition temperature ranges from −80° C. to −20° C., including all integer ° C. values and ranges therebetween.

Statement 18. A device according to any one of Statements 14-17, where the device further comprises a current collector disposed on at least a portion of the cathode and/or the anode.

Statement 19. A device according to any one of Statements 14-18, where the current collector is a conducting metal or metal alloy.

Statement 20. A device according to any one of Statements 14-19, where device is a battery and the battery further comprises: a cathode (e.g., a cathode material); an anode (e.g., an anode material); optionally, a separator, where the electrolyte, and, if present, the separator, is disposed between the cathode and anode.

Statement 21. A device according to Statement 20, where the device is a lithium-ion conducting solid-state battery and the polymeric material is a lithium ion conductor.

Statement 22. A device according to Statements 20 or 21, where the cathode comprises a material chosen from lithium-containing cathode materials (e.g., where the lithium-containing cathode material is chosen from lithium nickel manganese cobalt oxides, $LiCoO_2$, $LiNi_{1/3}Co_{1/3}Mn_{1/3}O_2$, $LiNi_{0.5}Co_{0.2}Mn_{0.3}O_2$, lithium manganese oxides (LMOs), lithium iron phosphates (LFPs), $LiMnPO_4$, $LiCoPO_4$, and $Li_2MMn_3O_8$, where M is chosen from Fe, Co, and the like, and combinations thereof, and the like, and combinations thereof).

Statement 23. A device according to any one of Statements 20-22, where the anode comprises a material chosen from lithium metal, lithium-ion conducting anode materials (e.g., where the lithium ion-conducting anode material is a lithium containing material chosen from lithium carbide, $Li_6C$, lithium titanates (LTOs), and the like, and combinations thereof), and combinations thereof.

Statement 24. A device according to Statement 20, where the device is a sodium-ion conducting solid-state battery and the polymeric material is a sodium ion conductor.

Statement 25. A device according to Statements 20 or 24, where cathode comprises a material chosen from sodium-containing cathode materials (e.g., where the sodium-containing cathode material is chosen from $Na_2V_2O_5$, $P2-Na_{2/3}Fe_{1/2}Mn_{1/2}O_2$, $Na_3V_2(PO_4)_3$, $NaMn_{1/3}Co_{1/3}Ni_{1/3}PO_4$, $Na_{2/3}Fe_{2/3}Mn_{1/2}O_2$@graphene composites, and the like, and combinations thereof), or conversion type cathode materials (e.g. sulfur, oxygen, iodine, metal sulfides such as $MoS_2$, $FeS_2$, $TiS_2$).

Statement 26. A device according to any one of Statements 20, 24, or 25, where the anode comprises a material chosen from sodium metal, sodium-ion conducting anode materials (e.g., where the sodium-containing anode material is chosen from $Na_2C_8H_4O_4$ and $Na_{0.66}Li_{0.22}Ti_{0.78}O_2$, and combinations thereof), and the like, and combinations thereof.

Statement 27. A device according to any one of Statements 20-26, where the cathode and/or anode comprises a conducting carbon material, and the cathode material.

Statement 28. A device according to Statements 20 or 27, where the cathode comprises a conversion type material chosen from sulfur, sulfur composite materials, and polysulfide materials, air (oxygen), iodine, metal sulfides such as $MoS_2$, $FeS_2$, $TiS_2$ Statement 29. A device according to any one of Statements 20, 27, or 28, where the anode comprises a material chosen from silicon-containing materials, tin and its alloys, tin/carbon, and phosphorus.

Statement 30. A device according to any one of Statements 20-29, where the solid-state electrolyte, cathode, anode, and, optionally, the current collector form a cell, and the battery comprises a plurality of the cells and each adjacent pair of the cells is separated by a bipolar plate.

Statement 31. A device according to any one of Statements 14-30, where the device exhibits one or more of the following: 1) Improved voltage stability (e.g., greater than 4 V). 2) Flat metal (Li or Na) deposition on anode side for greater than 100 cycles. 3) Improved cycled life (e.g., greater than 100 cycles). 4) High Coulombic efficiency (e.g., greater than 98%). 5) Low interphase resistance (e.g., less than 1000 Ω·cm$^2$).

The following examples are presented to illustrate the present disclosure. They are not intended to be limiting in any matter.

Example 1

The following provides examples of compositions, methods, and batteries of the present disclosure, and characterization of batteries of the present disclosure.

Described in this example is Al$^{3+}$-initiated ring-opening polymerization of molecular ethers performed inside an electrochemical cell provide a straightforward path to solid-state polymer electrolytes that overcome these limitations. The approach described in this example takes advantage of interfacial and capillary forces to create liquid-wetted interfaces throughout the cell and in-situ polymerization of the liquid to form solid-state electrolytes able to retain conformal interfacial contact with all cell components forged by the liquid precursors. The resultant solid polymer electrolytes (SPEs) are reported to exhibit high ionic conductivity at room temperature (>1 mS/cm), low interfacial resistances, and to display Li plating/striping efficiencies exceeding 98% after 300 charge-discharge cycles. Further described in this example, by means of direct visualization studies, the SPEs facilitate uniform and dendrite-free Li deposition. Application of the materials in Li—S, Li—LiFePO$_4$ and Li-NCM batteries show that high coulombic efficiency (>99%) and long life (>700 cycles) can be achieved. These results may be desirable for creating solid-state electrolytes that meet both the bulk and interfacial conductivity requirements for practical solid polymer batteries.

The hypothesis that motivates this example is that the most difficult problems with SPEs—those associated with the high interface resistance of the polymer and electrodes in a battery can be solved by forming the SPE in-situ by polymerization of a liquid precursor introduced in an electrochemical cell using conventional approaches. Specifically, the methods described in this example take advantage of the beneficial properties of liquids, including low viscosity & easy handling, and ability to wet and thereby create good interfacial contact with interfaces at all length scales to create electrochemical cells with well-connected pathways for ionic transport that enable full access to the active materials (FIG. 1a). Subsequent polymerization of the liquid electrolyte using a molecular, thermal, or electrical trigger in the fully formed battery transforms the electrolyte from a liquid- to a solid-state material. Beyond the obvious benefits already discussed, the approach should also produce SPEs with high purity levels, i.e. comparable to those achieved with current liquid electrolytes, and the same procedures in current use for electrolyte handling and filling can be employed.

Figure 1:
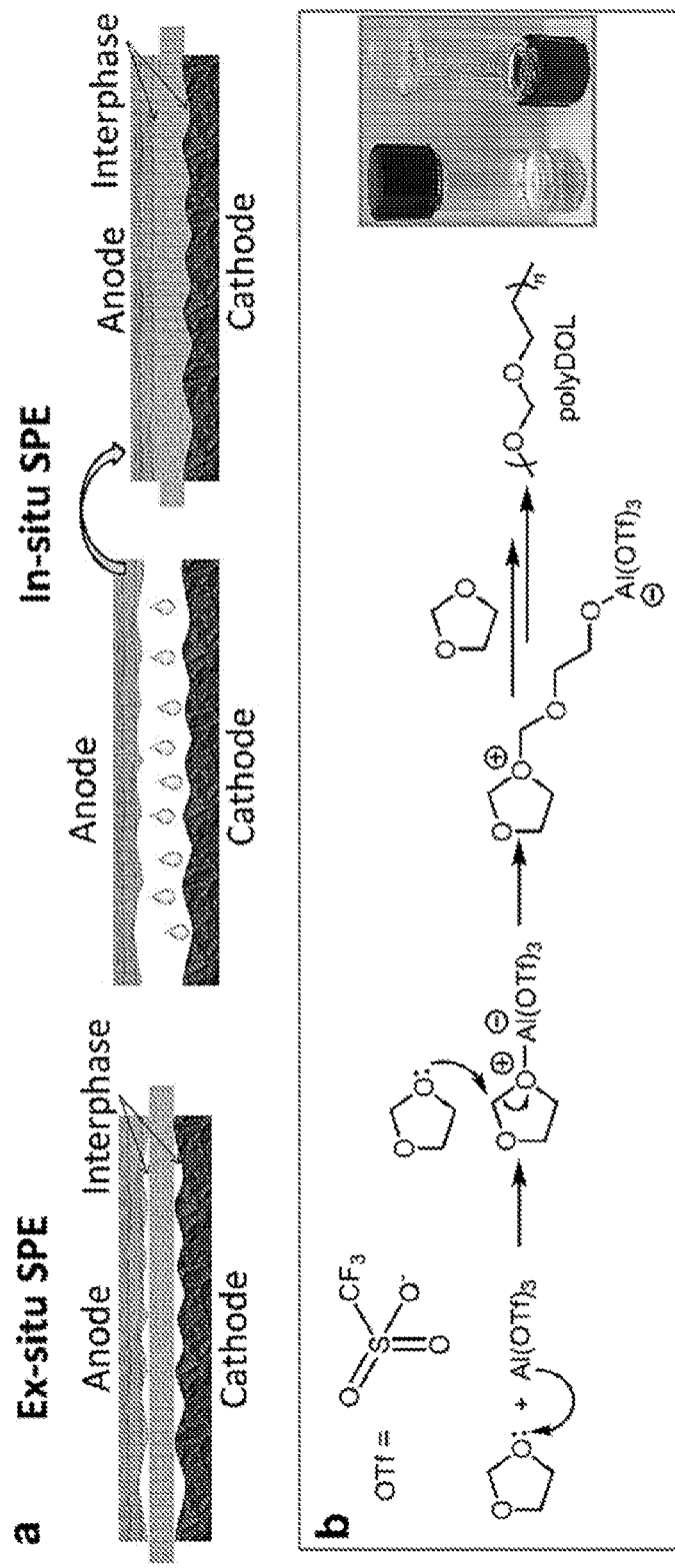
FIG. 1 shows preparation of the solid-state polymer electrolyte. (a) a schematic diagram illustrating ex- and in-situ synthesis of the SPE. (b) Reaction mechanism illustrating how $Al(OTf)_3$ initiates polymerization of DOL. The insert is a digital photo depicting the liquid DOL electrolyte (2 m (m=molal) LiTFSI/DOL, left) and the solid-state poly-DOL electrolyte formed spontaneously in an electrolyte containing 0.5 mM $Al(OTf)_3$ salt. (c) H (left) and C (right) NMR spectra of liquid DOL and the poly-DOL SPE formed at different $Al(OTf)_3$ concentrations.
Figure 1:
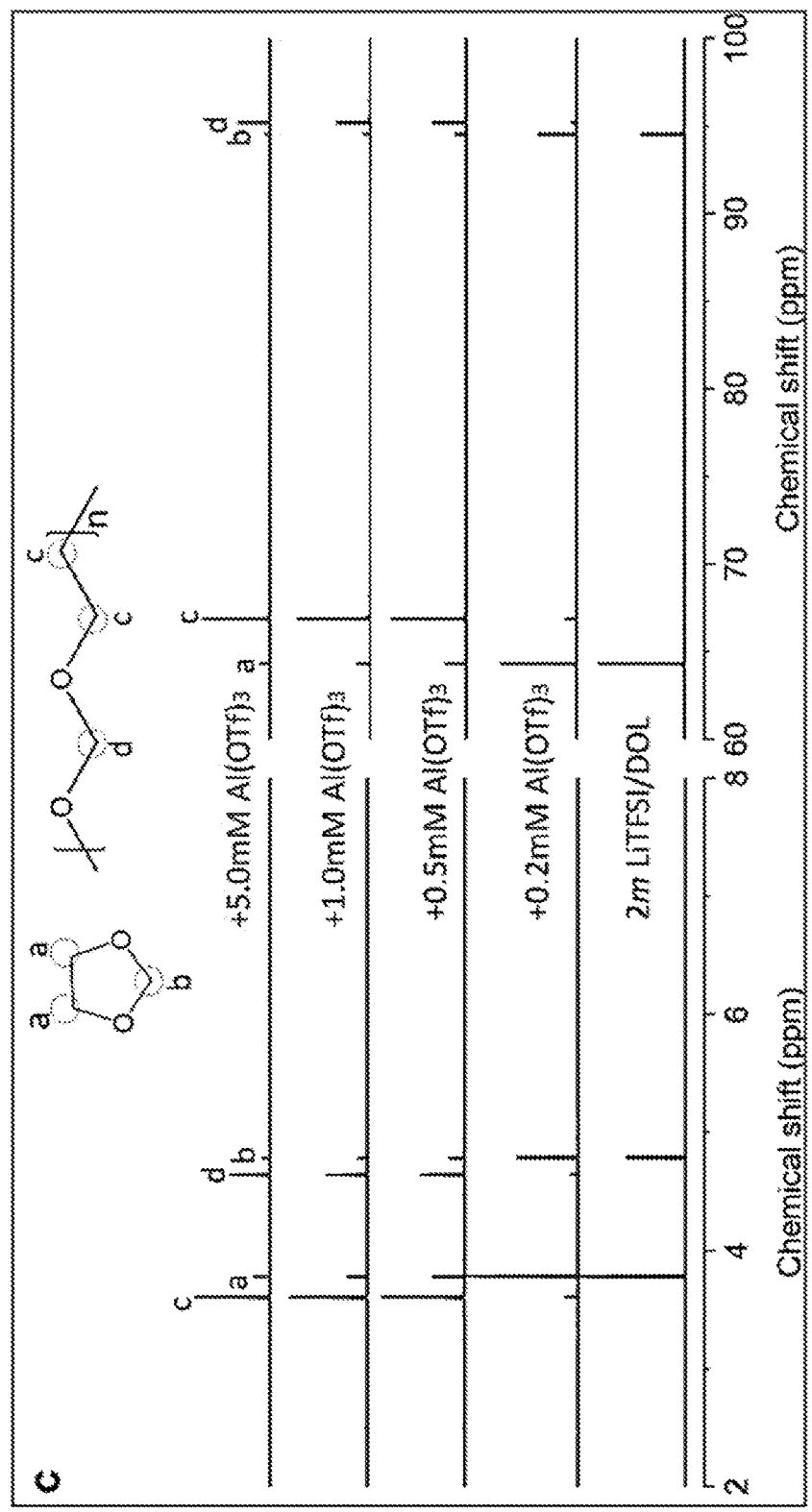
Figure 7:
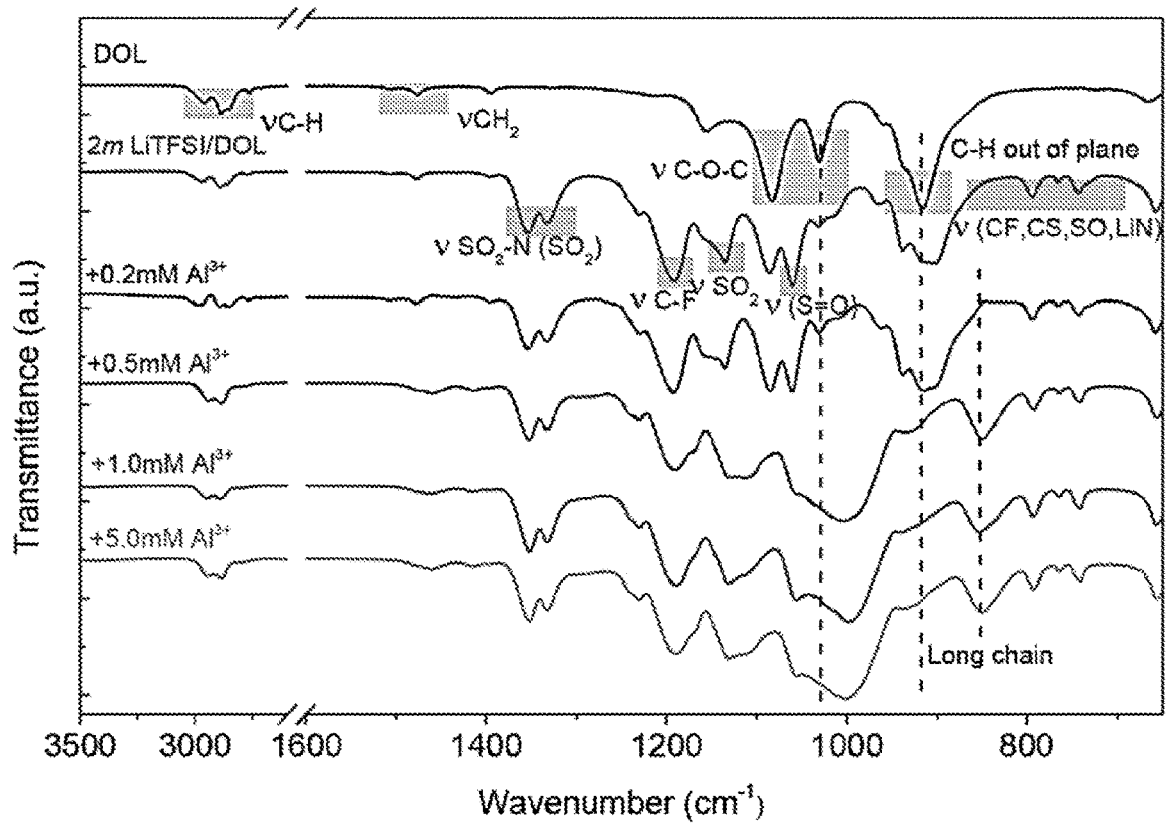
FIG. 7 shows ATR-FTIR spectra of pure DOL, liquid DOL electrolyte (2 m LiTFSI/DOL) and poly-DOL electrolyte with different concentration of $Al(OTf)_3$. Various peaks belong to the vibrations of LiTFSI and DOL are detected for liquid electrolyte. The electrolyte with 0.2 mM $Al(OTf)_3$ still show similar profiles as liquid electrolyte. Then the SPE is generated after increasing the concentrations of $Al(OTf)_3$ higher than 0.5 mM. The position change of —O—C— vibration, the missing of C—H out of plane vibration and the emerging of chain vibration indicate the polymerization of DOL.
Figure 8:
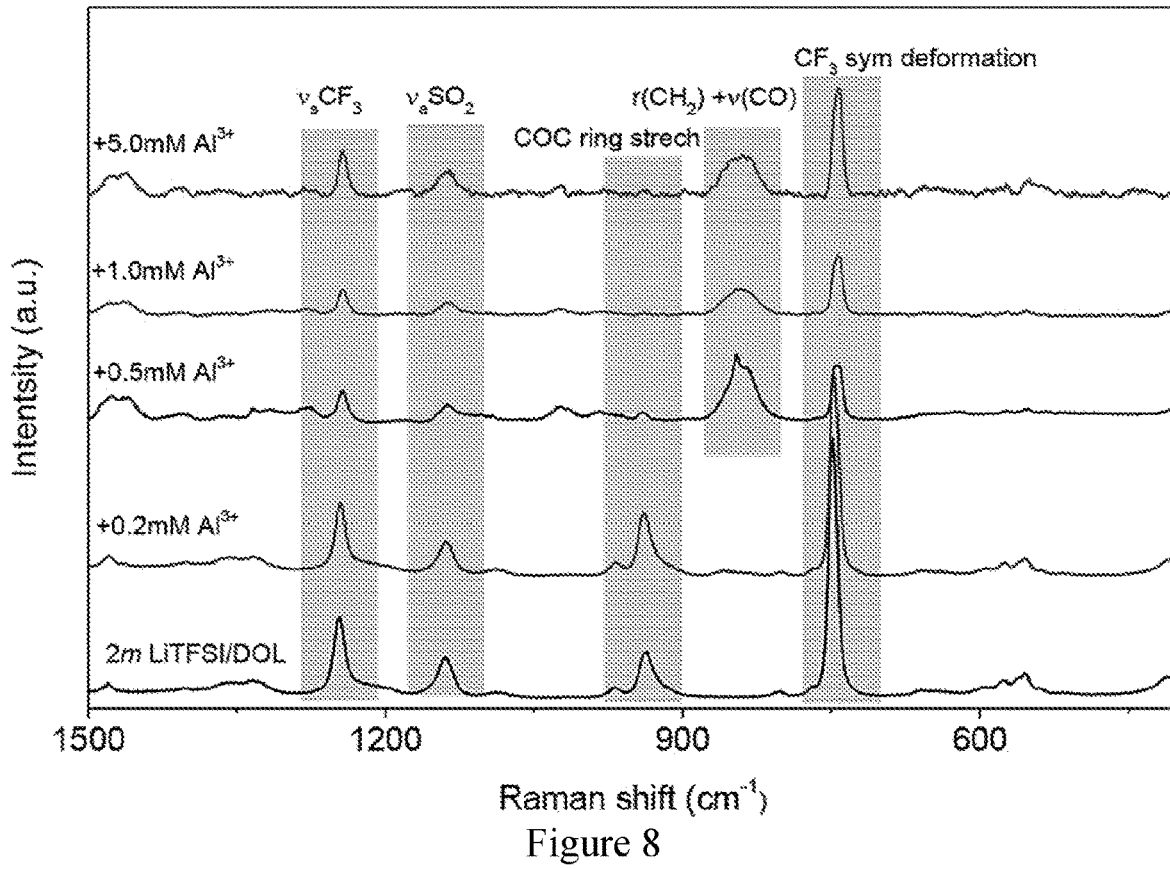
FIG. 8 shows Raman spectra of pure DOL, liquid DOL electrolyte (2 m LiTFSI/DOL) and poly-DOL electrolyte with different concentration of $Al(OTf)_3$. The results of Raman spectra are consistent with FTIR spectra. Typical peaks of $CF_3$, $SO_3$ can be detected for all the electrolytes. After increasing the concentration of $Al(OTf)_3$ to 0.5 mM, the ring stretch belong to DOL are dismissed. Meanwhile, the vibration of C—O and $CH_2$ belong to linear poly-DOL polymer appeared, indicating the polymerization of DOL.

The hypothesis was evaluated by performing ring-opening polymerization of 1,3-dioxolane (DOL) inside an electrochemical cell to produce the solid-state analog of an electrolyte based on this material. As a common low-molar mass ether solvent with low dielectric constant ($\varepsilon \approx 7.2$), ring-opening polymerization of DOL has been studied for over 50 years. Earlier work from 1964 reported that in the presence of water some organo-aluminum compounds, such as diethyl aluminum chloride and ethyl aluminum dichloride initiate polymerization of DOL. Of interest here is electrolyte salts that exhibit similar activity, but without the need for water. Results reported in this example show that aluminum triflate [Al(CF$_3$SO$_3$)$_3$, Al(OTf)$_3$] salts are efficient initiators for the polymerization of DOL and can be used to transform a DOL-based liquid electrolyte to a SPE as low as 0.5 mM. Described in this example are SPEs based on such in-situ transformation of a liquid electrolyte medium are able to overcome many of the key limitations of conventional SPEs and in so doing enable creation of secondary batteries with excellent reversibility and extended cycle life. FIG. 1 summarizes the essential chemical process whereby Al(OTf)$_3$ initiates polymerization of DOL and transforms a liquid DOL-based electrolyte to a SPE. As illustrated in FIG. 1b, the reaction is initiated by a cationic Al species in solution. The Al-based cation first attaches to the oxygen atom and initiates the ring-open polymerization. As an illustration of the efficiency of the reaction, the inset digital picture in FIG. 1b shows that upon addition of as little as 0.5 mM of Al(OTf)$_3$ the originally liquid LiTFSI-DOL electrolyte is transformed to a transparent, solid product, which like the precursor liquid, retains the shape of its container, but like a solid, does not flow under the action of gravity. NMR analysis (FIG. 1b) confirms that the material is poly-DOL. Specifically, after the polymerization reaction, new H and C peaks are observed, which are in accord with the structure of poly-DOL. In addition, the ratio of unpolymerized DOL and poly-DOL can be estimated by integrating the peak area of the $^1$H NMR spectra. In general, the ratio of unpolymerized DOL decreases with increasing content of Al(OTf)$_3$. Results summarized in Table 1 show that the unpolymerized DOL fraction accounts, respectively, for 86%, 19%, 14% and 10% in the electrolytes formed at 0.2 mM, 0.5 mM, 1.0 mM, 5.0 mM Al(OTf)$_3$ initiator. These changes in composition occur in tandem with structural evolution as reported by FTIR (FIG. 7) and Raman (FIG. 8) spectroscopy analysis. While electrolyte with 0.2 mM Al(OTf)$_3$ manifests characteristic vibrations of the liquid DOL precursor, increasing the Al(OTf)$_3$ content to 0.5 mM, produces a complete disappearance of the ring vibration, large shifts in the C—O—C vibration and the emergence of vibration modes associated with long-chain species. Analysis by Gel permeation chromatography showed that the weight averaged molecular weight, Mw, of the poly-DOL formed in the process is approximately 37K, which at first glance may seem large for a typical SPE targeted for room-temperature use. This impression is false in the present case because even at such high Mw, the in-situ formed poly-DOL SPEs maintain high (>1 mS/cm) room-temperature ionic conductivities. Results reported in Table 1 show that the molecular weight and polydispersity index (PI=Mw/Mn) of the poly-DOL decrease approximately as the inverse of the Al(OTf)$_3$ concentration (i.e., Mw [Al(OTf)$_3$]$^{-1}$), which is precisely the relationship one would expect if Al(OTf)$_3$ functioned as an initiator for the ring-opening polymerization reaction. Specifically, the higher concentration of Al(OTF)$_3$ increases the initiation rate, causing more polymer chain formation, which would lower the overall polymer molecular weight-precisely what is observed. Additionally, because the DOL functions as both reactant and solvent, the polymer chain would become smaller—for reactant transport reasons, with increasing Al(OTf)$_3$ content. Comparison of the poly-DOL molecular weights formed in our synthesis with the entanglement molecular weight Me$\approx$1,200 Da estimated from the packing model, implies that at the lower Al(OTf)$_3$ concentrations, the polymer exists minimally as a physical network of interconnected/entangled chains. This would be expected to impart increasing levels of elasticity to the electrolytes as the Al(OTf)$_3$ concentration rises.

Figure 2:
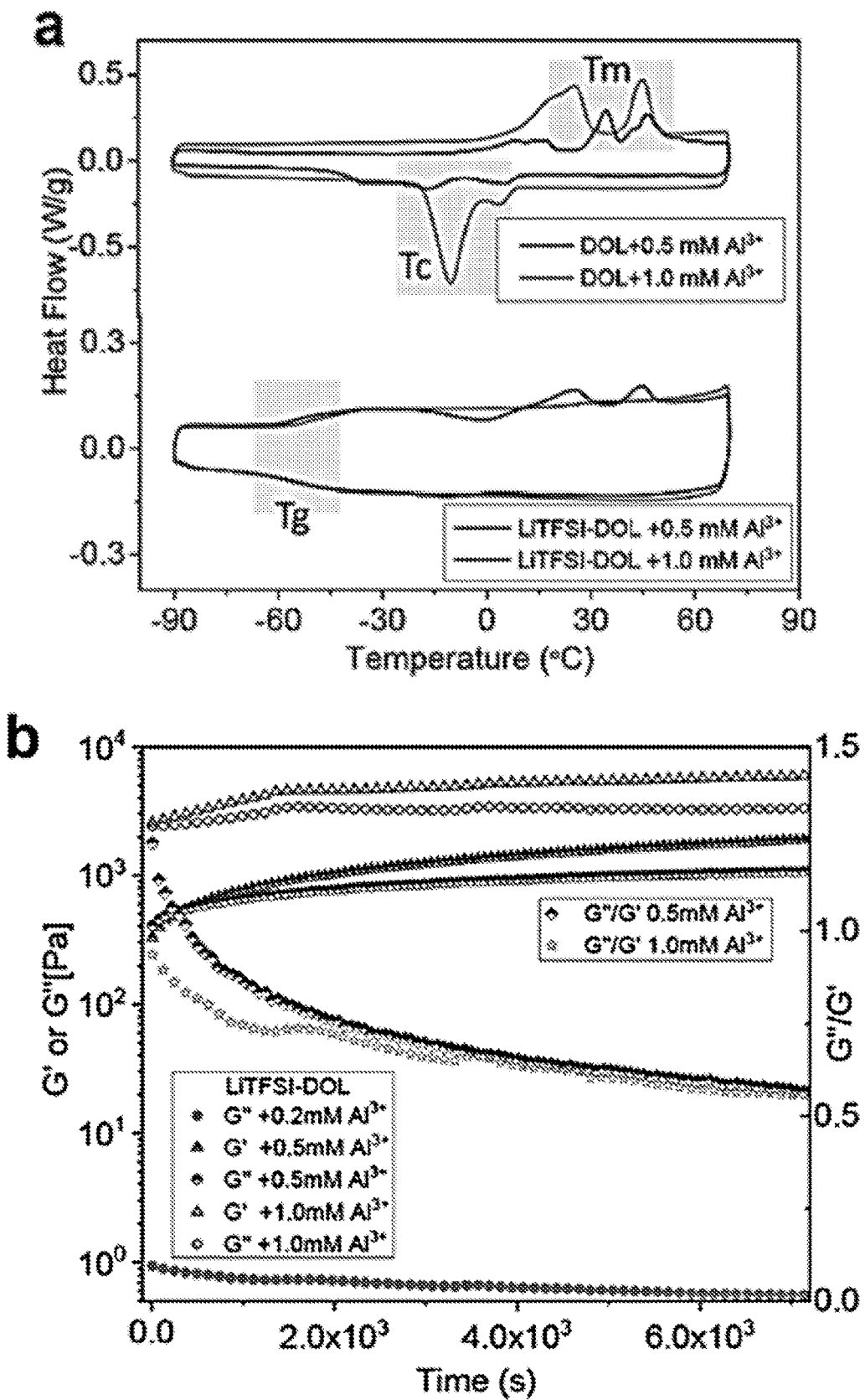
FIG. 2 shows kinetics and electrochemical characteristics of the solid-state polymer electrolyte. (a) DSC analysis of DOL and the poly-DOL electrolyte. (b) Dynamic storage (G') and loss (G") moduli [Pa] and loss tangent tan δ=G"/G' versus time for the poly-DOL electrolyte. (c) d.c conductivity versus polymerization time for SPE. (d) d.c conductivity of poly-DOL electrolyte versus temperature. The solid and dashed lines through the data are fits using the VFT and Arrhenius transport models, respectively.
Figure 2:
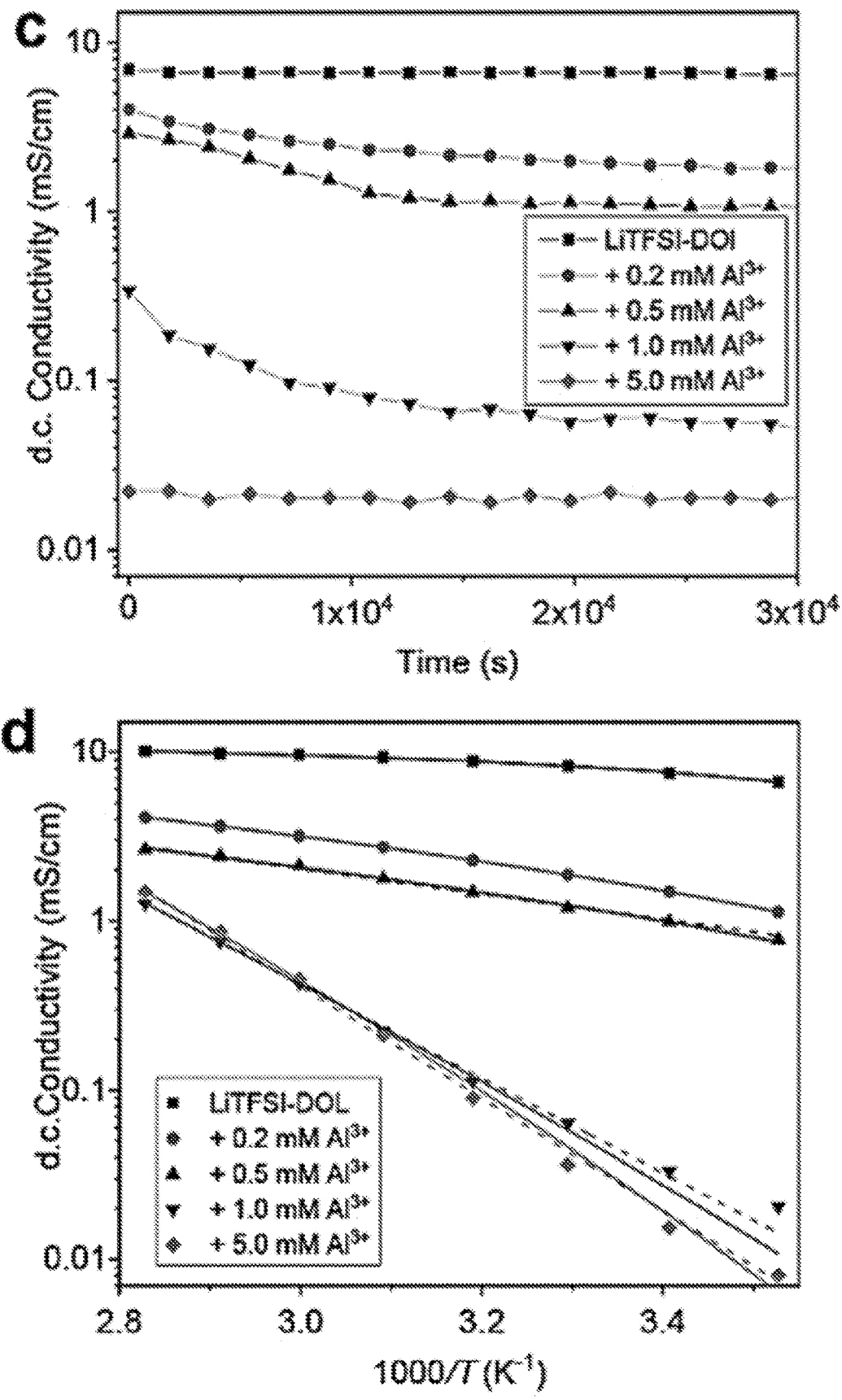
Figure 9:
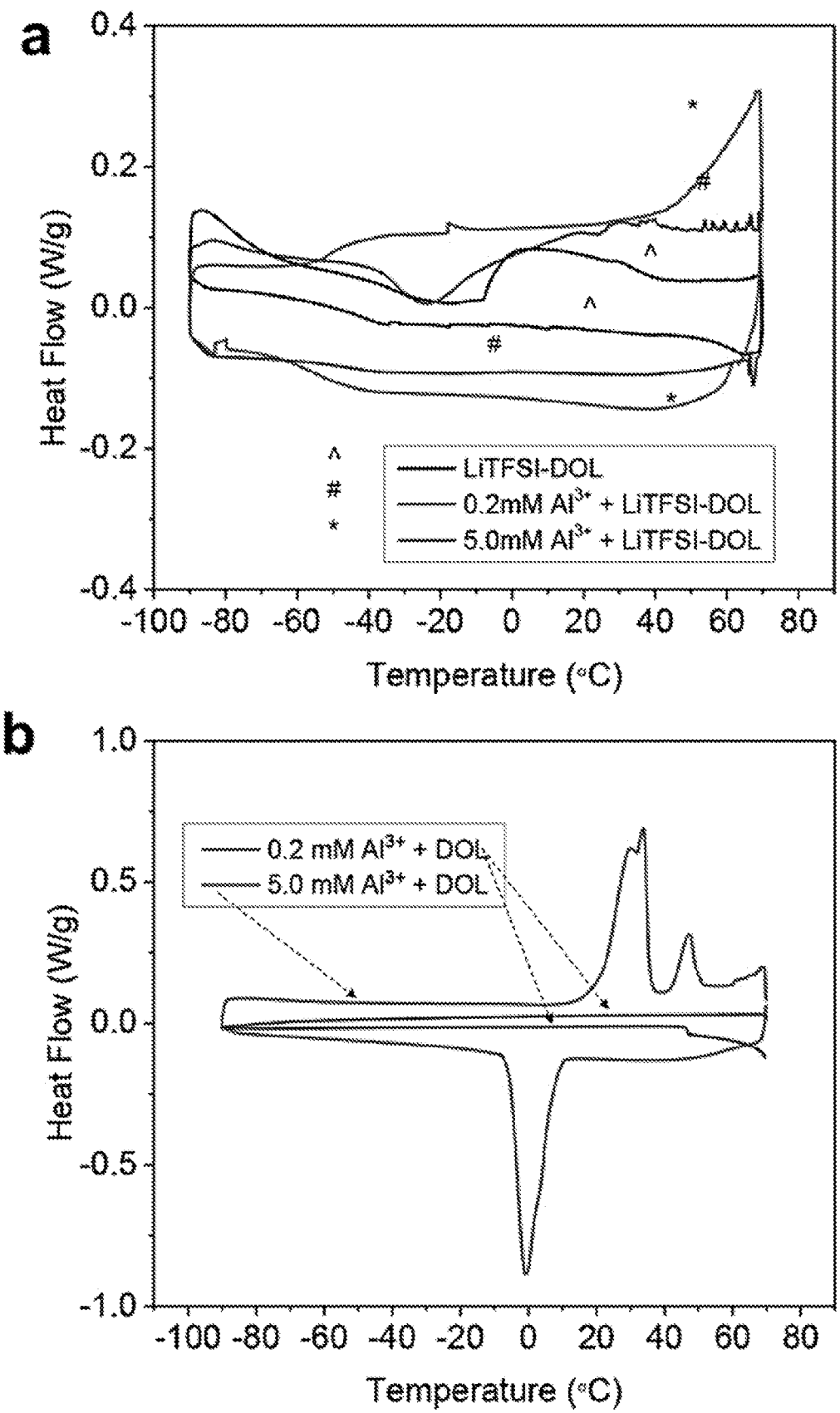
FIG. 9 shows DSC analysis of (a) poly-DOL electrolyte and (b) poly-DOL solvent. The DOL electrolyte and DOL solvent with lower $Al^{3+}$ catalyst (0.2 mM) solvent display liquid like behaviors.
Figure 10:
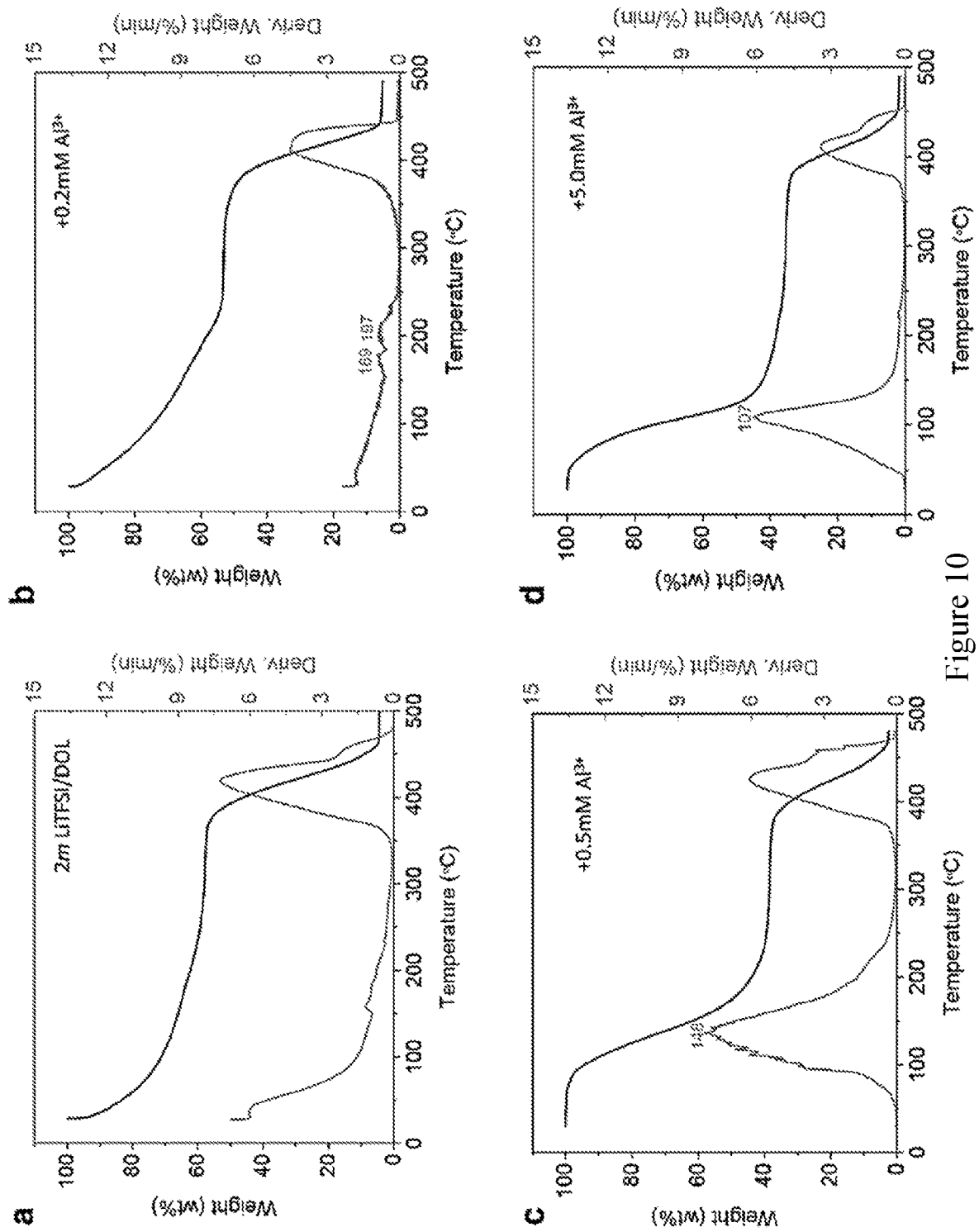
FIG. 10 shows TGA profiles of different electrolytes. (a) 2 m LiTFSI/DOL; (b) adding 0.2 mM $Al(OTf)_3$; (b) adding 0.5 mM $Al(OTf)_3$; (b) adding 5.0 mM $Al(OTf)_3$. The decomposition of LiTFSI occurs at about 400° C. Due to the low boiling points of DOL (75° C.), the liquid like electrolyte (2 m LiTFSI/DOL, 0.2 mM+2 m LiTFSI/DOL) will lose weight even at room-temperature. The thermal stability increased for poly-DOL SPE. After increasing temperature, the decomposition temperature decrease due to the reduction of molecular weight.
Figure 11:
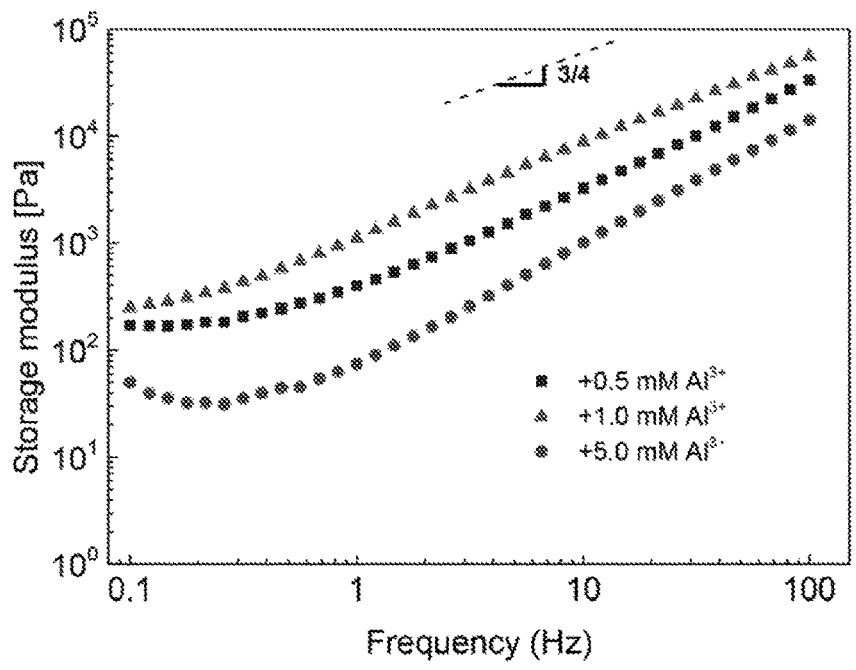
FIG. 11 shows oscillatory shear response of poly-DOL SPE from SAOS measurements.
Figure 12:
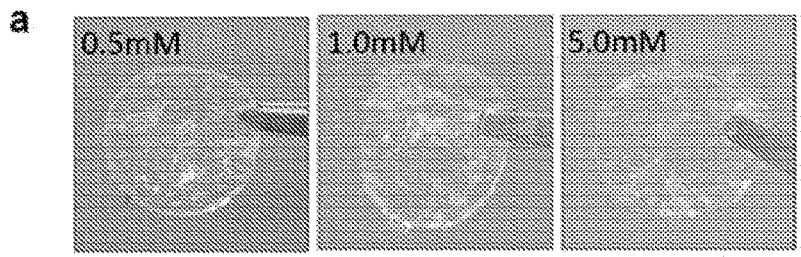
FIG. 12 shows (a) digital images of ex-situ synthesized SPE at different $Al(OTf)_3$ compositions. (b) Stress-strain of prepared free-standing poly-DOL electrolyte. The poly- DOL SPE can be ex-situ made as flexible and free-standing membrane with transparent color. The results of FIGS. 12 and 13 demonstrate that a higher molecular weight tends to enhance the elasticity of the material, and a larger residual monomer content softens the material (see Table 1), which together results in the oscillatory shear response and stress-strain behavior.
Figure 12:
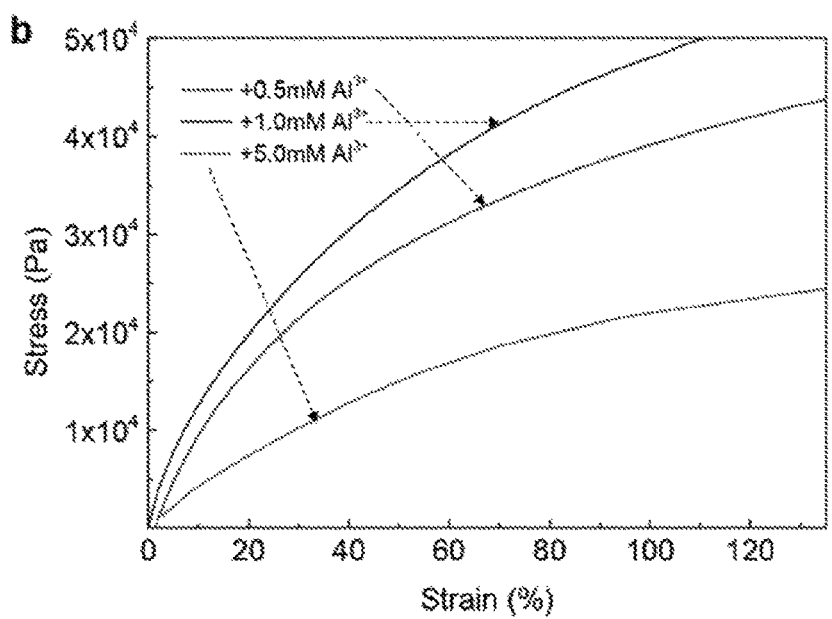

Differential scanning calorimetry (DSC) was applied to study thermal transitions in the poly-DOL from heat flow measurements. The results reported in FIG. 2a and FIG. 9 show that whereas the salt-free poly-DOL is crystalline, the electrolyte (poly-DOL+2 m LiTFSI) is essentially amorphous. Typical peaks associated with the melting, $T_m$, and recrystallization $T_c$, transitions of the salt-free poly-DOL material are observed. However, only a glass transition is observed for the poly-DOL electrolytes. Although there are some small peaks and pits observed in the temperature range 0-60° C. associated with melting behavior, there are no corresponding crystallization peaks. This behavior is inconsistent with normal observations for semicrystalline polymers and clearly at odds with what is observed for the LiTFSI-free poly-DOL SPE; it is attributed here to interactions between long-chain polymer and LiTFSI salt. It is considered that the absence of crystallization in the in-situ formed poly-DOL electrolytes is a key determinant of their high bulk and interfacial ionic conductivities. Thermogravimetric analysis (TGA) demonstrates that the thermal stability is largely improved after transferring liquid DOL electrolyte to Poly-SPE (FIG. 10). The kinetics of the polymerization process are next studied by means of time-dependent changes in elastic and ion transport properties of the electrolyte. Results reported in FIG. 2b show that both the elastic/storage modulus (G') and viscous/loss modulus (G") deduced from dynamic shear rheology measurements of the reaction mixture increase over time, reflecting the rising contribution of growing polymer chains to the rheological characteristics of the electrolytes. For electrolytes containing 0.5 mM Al(OTf)$_3$ catalyst, at early times (t<600 s), the loss modulus is dominant (i.e., G">G'), indicating that the electrolytes are liquid-like. As the reaction proceeds, G' is observed to become more dominant, indicative of a transition to solid-like, elastic behavior as the growing polymer chains begin to form physical entanglements with their neighbors. At long times, both moduli approach a constant, limiting value and their ratio (tan $\delta$=G"/G') termed the loss tangent approach a constant value below unity. This behavior is consistent with the onset of solid-like behavior of elastic materials in which each material element is localized in a cage with "localization length," $\xi=(k_B T/G_0)^{1/3}$ ($\xi\approx 12.7$ nm). At double (1 mM) the Al(OTf)$_3$ concentration, both moduli are higher and the rate at which they approach steady-state increases. The tan $\delta$ plot shows that at the higher Al(OTf)$_3$ concentration the electrolytes are more solid-like and the calculated localization length, $\xi$=8.7 nm, bears this out. In contrast, an elastic contribution cannot be observed at an Al(OTf)$_3$ concentration of 0.2 mM, despite the higher Mw=49K revealed by GPC analysis. The phenomenon is also confirmed in DSC analysis (FIG. 9), where no obvious $T_g$ transition is apparent for these materials. These results can neither be explained in terms of a physical network model for our poly-DOL SPEs (because the higher molecular weight polymer formed at lower Al(OTf)$_3$ concentration should lead to greater elasticity), nor in terms of a covalent network (it would not be possible to separate the interconnected poly-DOL chains to perform GPC analysis as done to provide the results in Table 1). It is hypothesized that instead individual molecules in the poly-DOL SPE are held together by reversible associations with multivalent Al$^{3+}$ ions in the electrolyte. The dynamic mechanical properties of the prepared SPE were also studied by small amplitude oscillatory shear (SAOS) measurements. The materials has a higher storage modulus G' and is thus more solid-like at intermediate Al$^{3+}$ concentration (0.5 mM, 1 mM) (FIG. 11). The figure further shows that over a wide range of shear frequencies, G' follows a sub-linear power-law relationship G'~$\omega^{3/4}$, which ultimately gives way to a frequency-independent plateau at low $\omega$. This behavior is typical of materials in the dynamic universal class viscoelastic solids, it provides fundamental support for their classification as solid-state polymer electrolytes. A further test of this conclusion was performed using tensile analysis of ex-situ synthesized versions of the materials using the same initiator and electrolyte compositions as for the in-situ synthesis. The first finding reported in (FIG. 12a), is that the electrolytes exist as free-standing elastic materials for which Young's modulus E (slope of longitudinal stress vs. strain) also varies in a non-monotonic fashion with Al$^{3+}$ concentration.

The change of d.c. conductivity versus time (FIG. 2c) provides an additional approach for following the polymerization reaction and for evaluating the transport properties of the SPEs as a function of Al(OTf)$_3$ concentration. The results show that the ionic conductivity of poly-DOL electrolytes with 0.5 mM Al(OTf)$_3$ drops by a factor of around 3 within the first 3 hours of initiating the ring-opening reaction, and approaches a constant value of approximately 1 mS/cm at long times. These long-time ionic conductivity values are higher than typical for a SPE at room temperature. They may imply that even at long times/steady-state the polymerization reaction cannot reach completion and a small amount of un-/incompletely-polymerized DOL remains bound in the entangled polymer. This mobile fluid fraction would be expected to facilitate both bulk and interfacial ion transport. NMR analysis of the SPEs confirm this view and in fact shows that depending upon the concentration of Al(OTf)$_3$ in the precursor liquid electrolyte, the extent of the polymerization reaction can be manipulated to produce varying amounts of residual unpolymerized DOL in the polyDOL host material. Increasing the concentrations of Al(OTf)$_3$ above approximately 1 mM produces a sharply lower ionic conductivity, below 0.1 mS at steady-state, which is thought to arise from the complete solidification of the poly-DOL SPE. FIG. 2d reports on the temperature-dependent ionic conductivity of the in-situ formed SPE The solid line through the data is obtained by fitting the measured values using the Vogel-Fulcher-Tammann (VFT), and the dashed line through the data is obtained using Arrhenius model. At all Al(OTf)$_3$ concentrations the measured conductivity is seen to be well described by either model, which is expected because the ionic conductivity is measured at temperatures far beyond the glass transition temperature. Closer inspection of the results nonetheless reveal that the Arrhenius expression provides a slightly better account of the low temperature conductivity, particularly at high Al(OTf)$_3$ concentrations. This observation is uncommon in typical gel and liquid-plasticized polymer electrolytes, where ion motion is always coupled to those side groups in a polymer and the VFT is therefore the more appropriate model for describing ion motions. These observations suggest that the ion motions are decoupled from long range motions of the polymer chains and may progress by an ion rafting process, wherein the unpolymerized component in the materials is the ion carrier at all Al(OTf)$_3$ concentrations. More detailed studies of ion transport over a wider range of temperatures are underway to evaluate this hypothesis.

Figure 3:
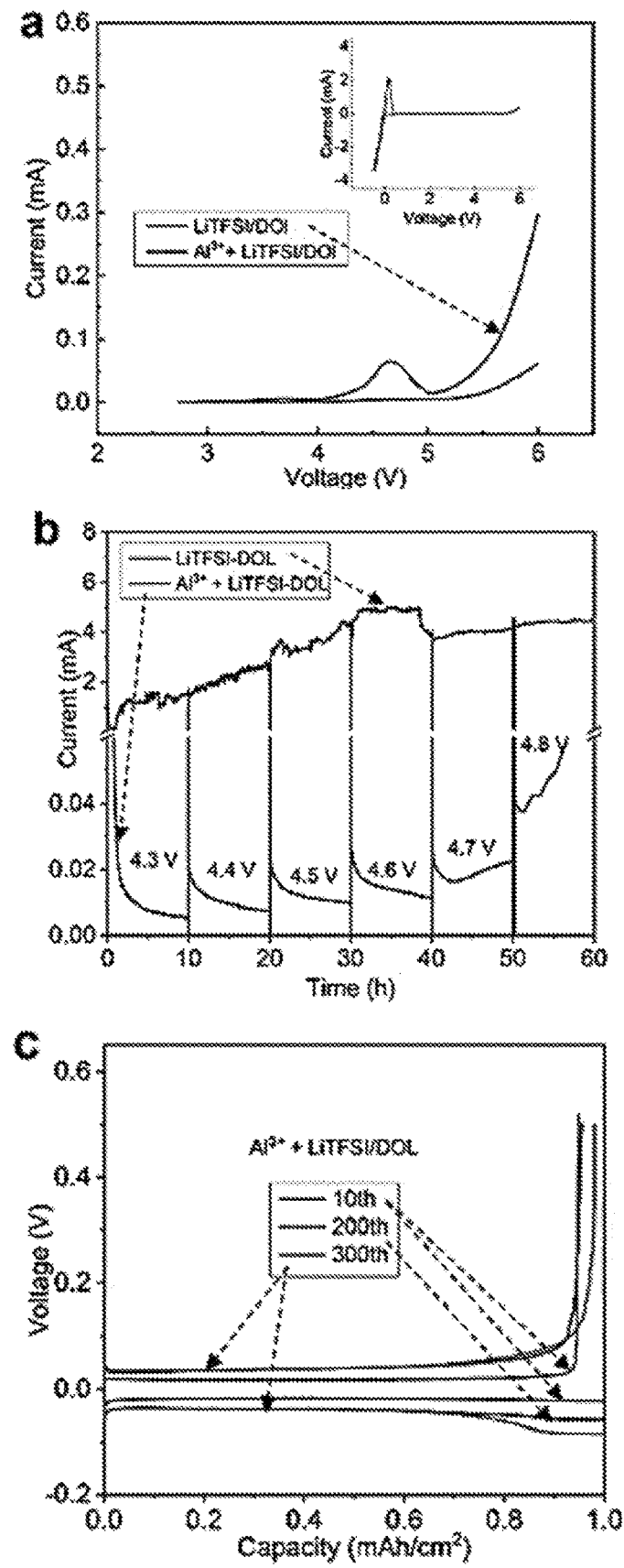
FIG. 3 shows electrochemical stability of poly-DOL electrolyte. (a) linear sweep voltammetry of liquid DOL (2 m LiTFSI/DOL) electrolyte and poly-DOL SPE (0.5 mM $Al(OTf)_3$+2 m LiTFSI/DOL) at a sweep rate of 1 mV/s. The inset are I-V curves for Li plating and stripping in poly-DOL at a sweep rate of 1 mV/s. (b) Electrochemical floating analysis of liquid DOL and poly-DOL SPE using NCM cathodes. (c) Li stripping and plating profiles as a function of cycle number obtained using poly-DOL SPE. (d) Corresponding coulombic efficiencies (CE) as a function of cycle number for liquid DOL and the poly-DOL SPE. The current density is 1 mA/cm$^2$ and the plating Li capacity is 1 mAh/cm$^2$ per cycle. (e) Long term cycling of symmetrical Li cells using liquid DOL electrolyte and poly DOL SPE. The current density is 1 mA/cm$^2$ and 1 mAh/cm$^2$ Li is plated and stripped per cycle. The inset are enlarged profiles at the cycle numbers noted.
Figure 3:
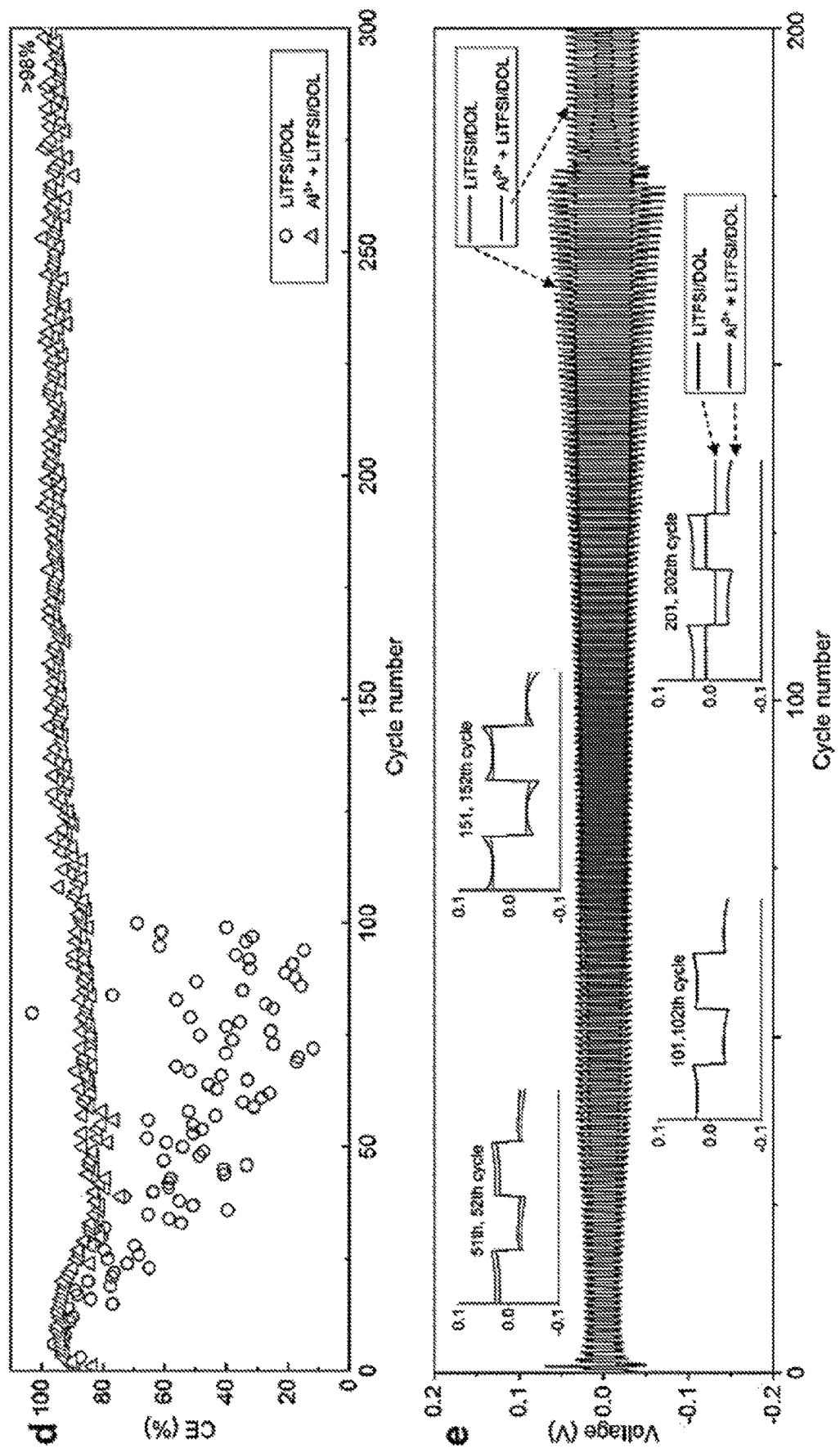
Figure 13:
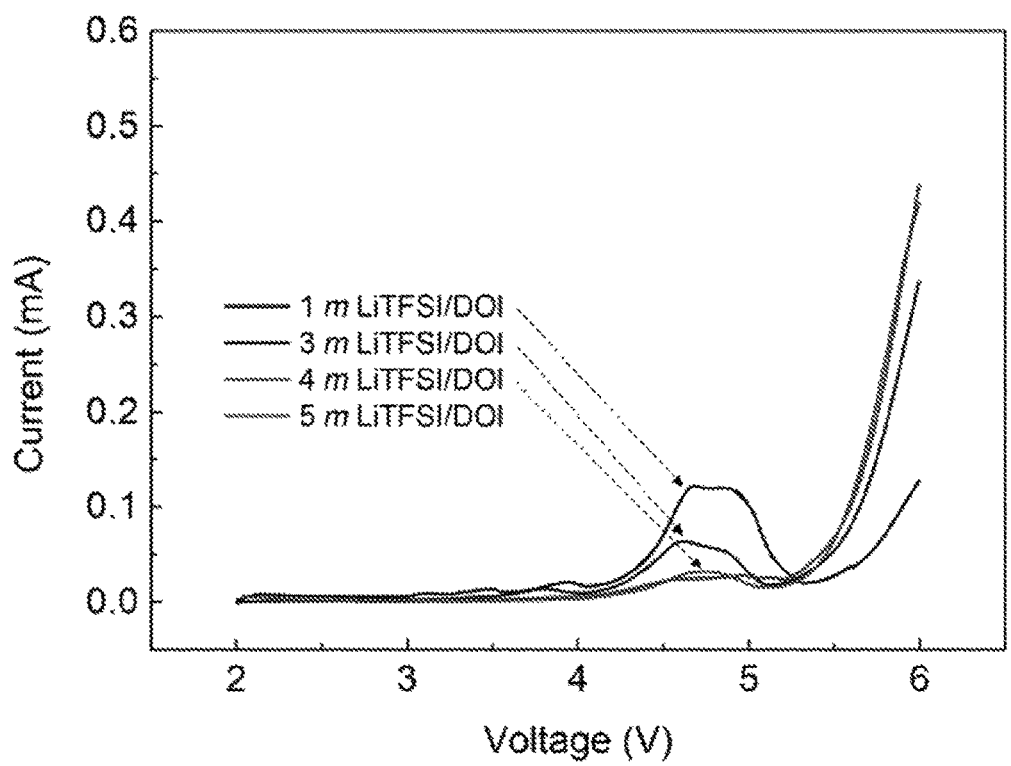
FIG. 13 shows linear sweep of liquid DOL with different concentration of LiTFSI as a sweep rate of 1 mV/s. The voltage stability window of liquid LiTFSI/DOL electrolyte can be slightly improved after increasing LiTFSI concentration.
Figure 14:
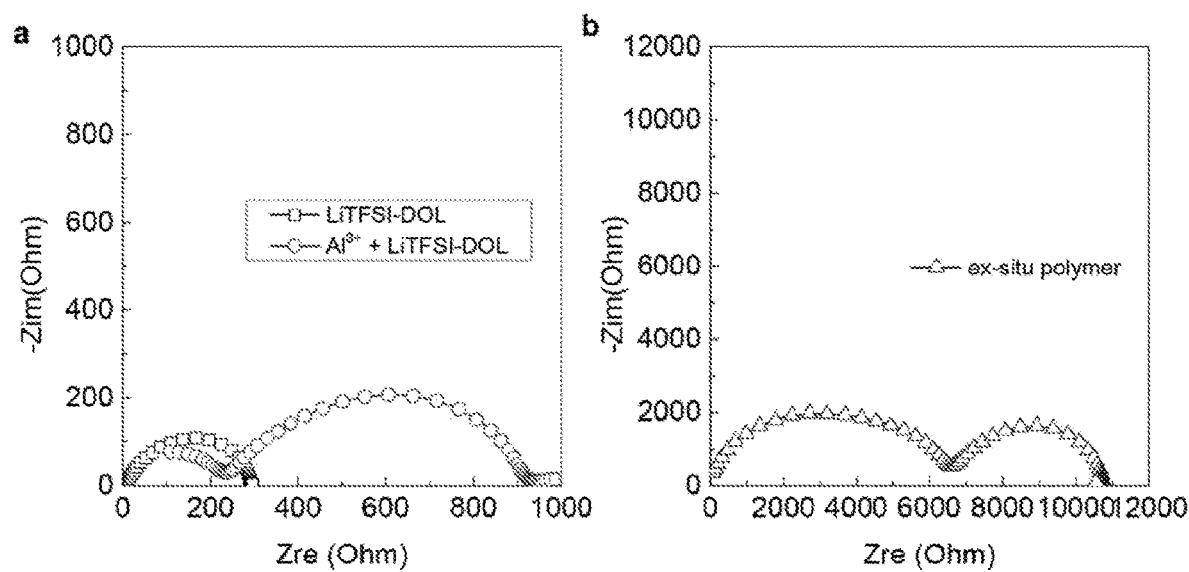
FIG. 14 shows EIS of symmetrical Li cells using (a) liquid electrolyte, In-situ SPE and (b) ex-situ SPE. EIS of symmetrical Li cell with liquid electrolyte was measured using 2 m LiTFSI/DOL. The cell with in-situ SPE was measured using 0.5 mM $Al^{3+}$+2 m LiTFSI/DOL electrolyte that polymerized inside the batteries. For symmetrical Li cells using ex-situ polymer electrolyte, the electrolyte (also 0.5 mM $Al^{3+}$+2 m LiTFSI/DOL) was firstly prepared in glove box, and used to assemble symmetrical cell.
Figure 15:
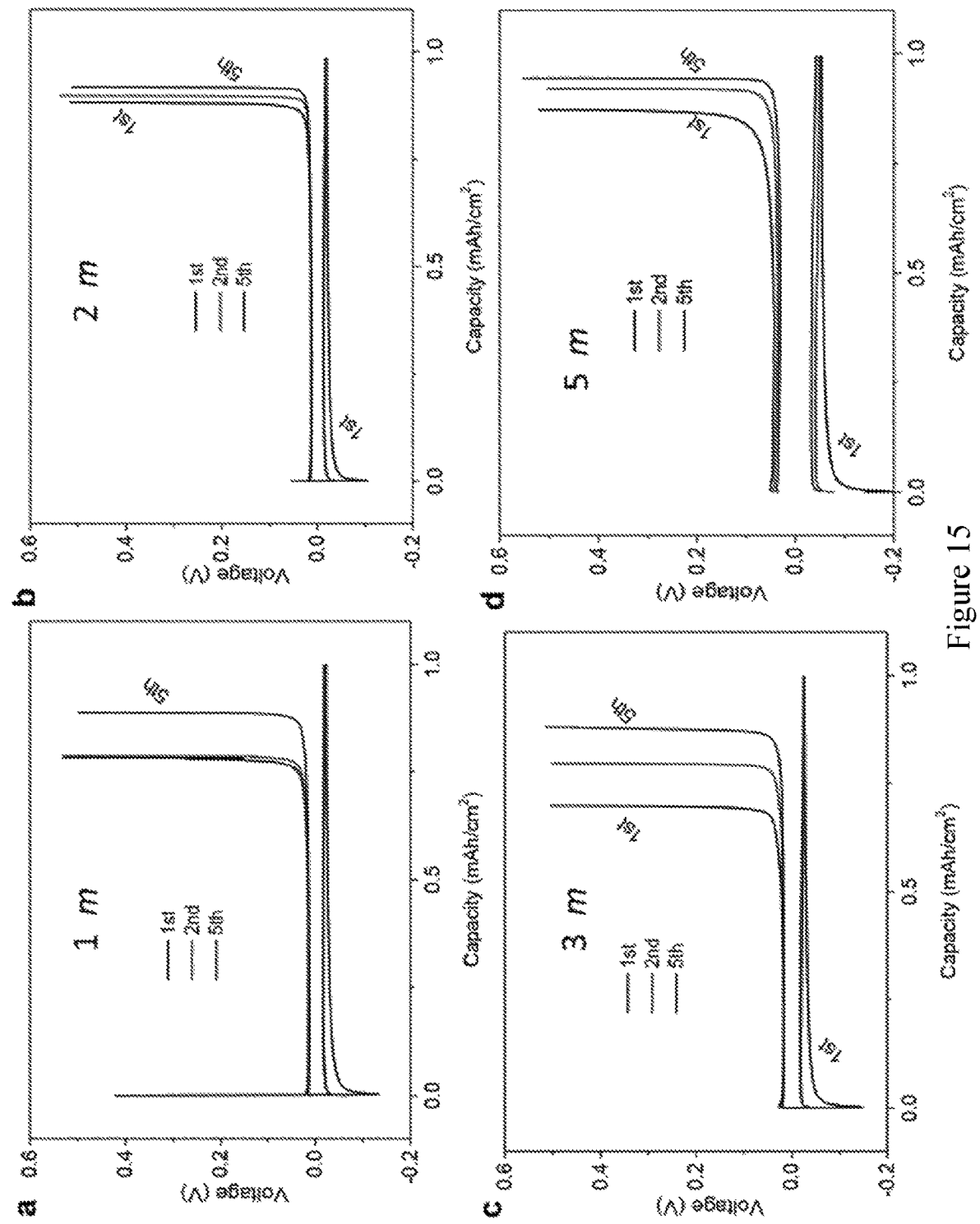
FIG. 15 shows Li stripping and plating properties of Li—Cu cells using liquid LiTFSI/DOL electrolytes with different LiTFSI concentrations. (a) 1 m LiTFSI/DOL; (b) 2 m LiTFSI/DOL; (c) 3 m LiTFSI/DOL; (d) 5 m LiTFSI/DOL. The current density is 1 $mA/cm^2$ and the plating Li capacity is 1 $mAh/cm^2$ per cycle.
Figure 16:
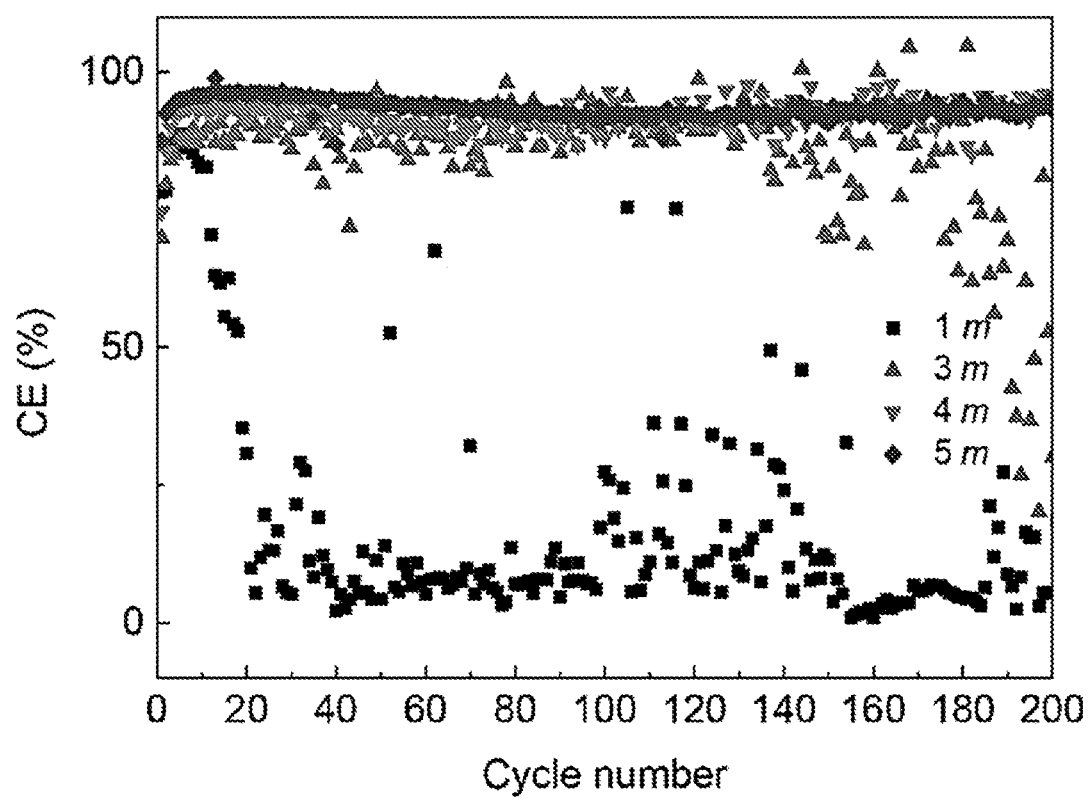
FIG. 16 shows Coulombic efficiencies of Li—Cu batteries using liquid LiTFSI-DOL electrolytes. The current density is 1 $mA/cm^2$ and the plating Li capacity is 1 $mAh/cm^2$ per cycle.
Figure 17:
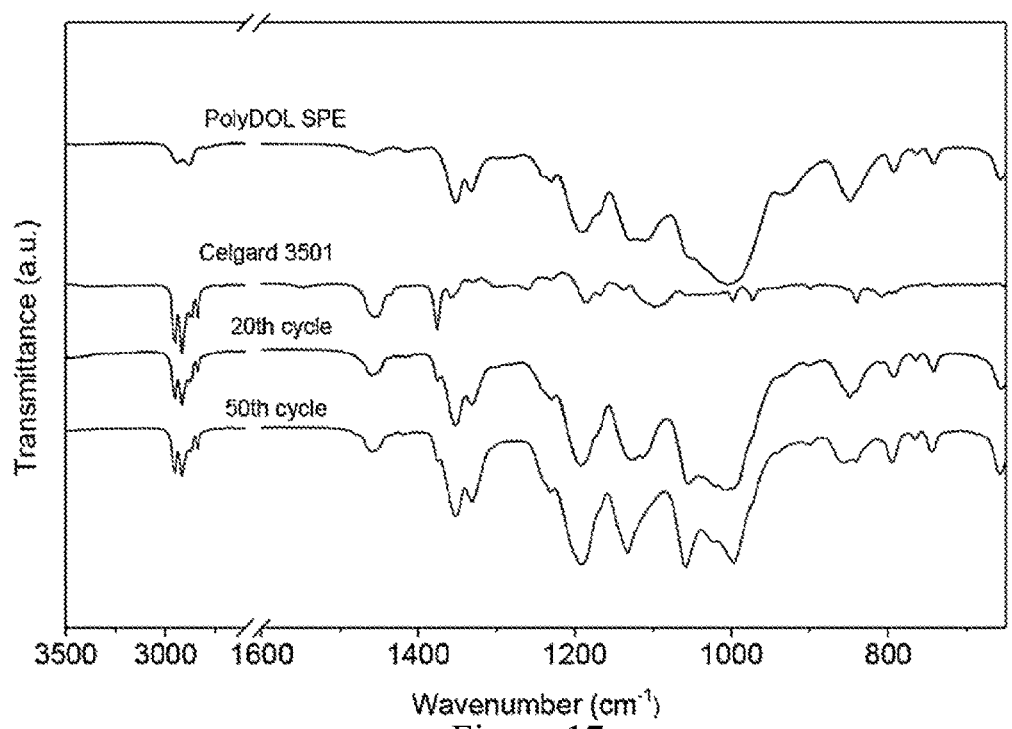
FIG. 17 shows FTIR spectra of cycled poly-DOL SPE in symmetrical cells.
Figure 18:
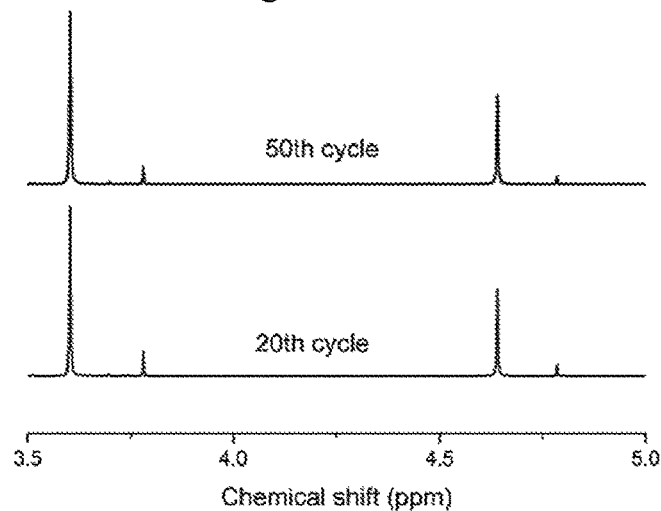
FIG. 18 shows (a), (b) NMR spectra of cycled poly-DOL SPE in symmetrical cells.
Figure 18:
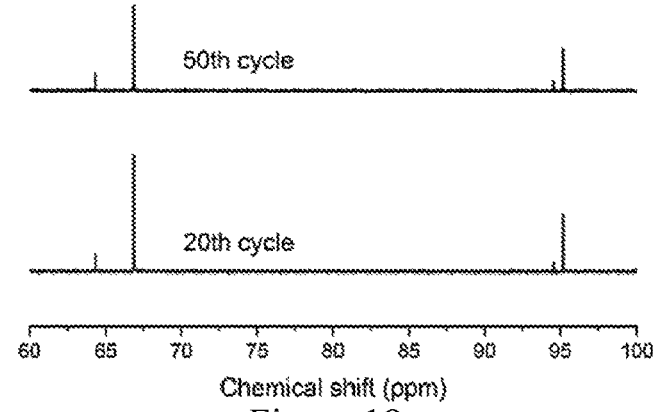

Now considered are the electrochemical properties of the in-situ formed SPEs. The DOL-LiTFSI electrolyte precursor used to create SPEs is not commonly used in lithium batteries that employ intercalating cathodes because of its relatively poor oxidative stability at potentials above 4 V (vs. Li$^+$/Li). Linear sweep voltammetry measurements were used to determine the effect of polymerizing a liquid DOL electrolyte on the electrochemical stability window of the material. The results reported in FIG. 3a clearly show that polymerization dramatically increases the oxidative stability to over 5 V. These same measurements show that for the liquid DOL-LiTFSI electrolyte, oxidation is already important at around 4.2 V (FIG. 3a and FIG. 13). In a wider-range scan from −0.2 V to 6 V, the results show that polymerization does not compromise the excellent lithium stripping/plating profiles (inset in FIG. 3a) that are a known feature of DOL-based liquid electrolytes The electrochemical floating experiment provides a more stringent test of the oxidative stability of the in-situ formed polyDOL SPEs. In these experiments, the electrolytes are used in Li‖NMC cells, which are charged to progressively higher voltages and held at each voltage for a period of 10 hours. The leakage current measured during the experiment provides a straightforward means of assessing the oxidative stability of an electrolyte. Results reported in FIG. 3b show that at voltages below 4.7 V the leakage current measured in the SPEs is small (<20 uA). In contrast, similar experiments using the liquid LiTFSI-DOL electrolyte reveal leakage currents exceeding 1 mA at voltages as low as 4.3 V. A key hypothesis of this work is that in-situ formation of a SPE provides an opportunity to overcome the traditionally high interfacial resistances characteristic of solid-state electrolytes (FIG. 14). A second hypothesis is that polymerization of a liquid electrolyte will reduce its reactivity towards a metallic Li anode, resulting in higher coulombic efficiency (CE) and LMBs with longer term stability. FIG. 3c and FIG. 15 compare results from galvanostatic polarization experiments for liquid DOL electrolyte and the in-situ SPEs. The SPE with 0.5 mM $Al^{3+}$ is selected for in-depth study for two principal reasons. First, it shows typical characteristics of solid-state polymer electrolyte, including existence as a free-standing film and manifesting viscoelastic solid-like properties in shear and tensile testing experiments. Second, in comparison to the SPEs formed at higher $Al^{3+}$ contents, the SPE with 0.5 mM $Al^{3+}$ exhibits the highest combination of mechanical modulus and room temperature ionic conductivity. Both measurements were performed in asymmetric Li‖Cu cells at a current density of 1 $mA/cm^2$. Although the liquid electrolyte shows small polarization between Li stripping and plating, the CE fades quite quickly (FIG. 3d and FIG. 16). This behavior is attributed to the continuous reduction of DOL by the freshly deposited Li metal each cycle, which continuously consumes the electrolyte, thickens the SEI on Li, and limits access to the electrodeposited Li metal. In comparison, the Li—Cu batteries with SPEs show consistent and high CE (>98%) even after 300 Li strip-plate cycles. The reversibility of Li plating and stripping processes in the in-situ formed poly-DOL SPEs and their unpolymerized liquid analogs were investigated in symmetric Li cells. As shown in FIG. 3e, for the initial tens of cycles, cells lower polarization is observed in the liquid electrolytes presumably because of their higher ionic conductivity. After one hundred cycles, however, an obvious but gradual increase in the peak-to-peak voltage is evident for measurements performed in liquid electrolytes. This increase is indicative of the greater difficulty of nucleating Li during the plating segment of the cycle, in stripping Li during the reversing segment of the cycle, and in the overall deposition of Li. It is normally associated with the formation of a thick SEI at the electrode and the accumulation of electronically disconnected/dead Li fibrils at the interface. The process typically ends with a sudden, permanent drop in peak-to-peak voltage and a noticeable squaring of the edges of the voltage profile (see inset figure for the 201-202nd cycle), which is thought to arise from formation of one or more internal short circuits as the Li deposits grow uncontrollably at local regions of the electrode to bridge the inter-electrode space. In comparison, the SPE cells continue to operate stably beyond 200 cycles. In addition, the major structure of poly-DOL SPE remained unchanged from the beginning to the end of the cycling test according to the results of FTIR (FIG. 17) and NMR spectra (FIG. 18).

Figure 4:
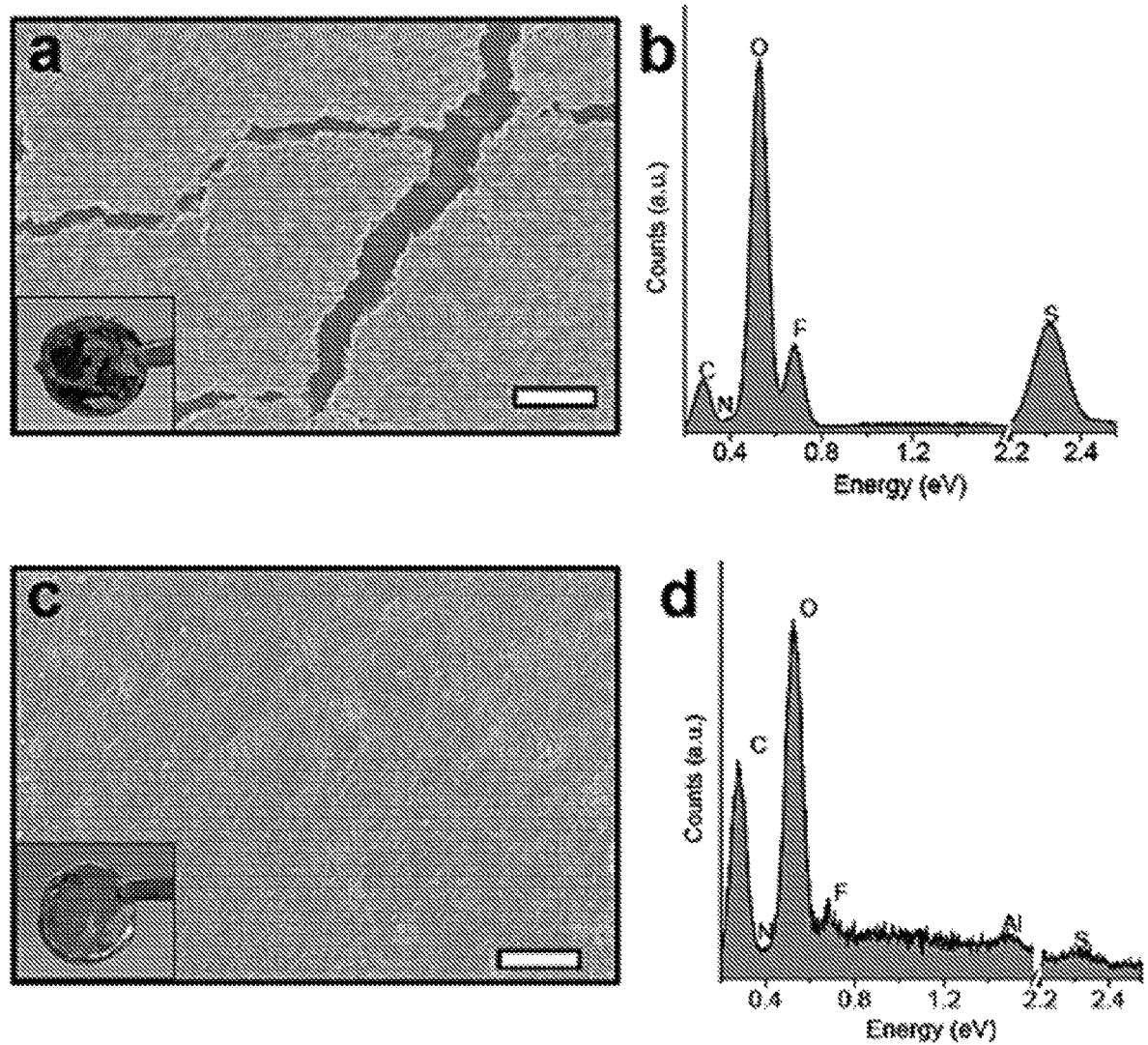
FIG. 4 shows characterization of SEI formed on lithium cycled in liquid DOL and SPE electrolytes. (a), (c) SEM images (inset is digital picture) and (b), (d) EDX analysis of cycled lithium electrode harvested from symmetrical cells. Corresponding XPS analysis of (e), (i) $C_{1s}$, (f), (j) $F_{1s}$, (g), (k) $S_{2p}$ and (h), (i) $Al_{2p}$ on cycled lithium electrodes. (a), (b), (e)-(h) are cycled lithium electrode in liquid electrolyte. (c), (d), (i)-(l) are cycled lithium electrode in poly-DOL SPE. The $Al_{2p}$ spectra of Li electrode using SPE before cycling are also listed as comparison. The scale bars in (a) and (c) are 20 μm.
Figure 4:
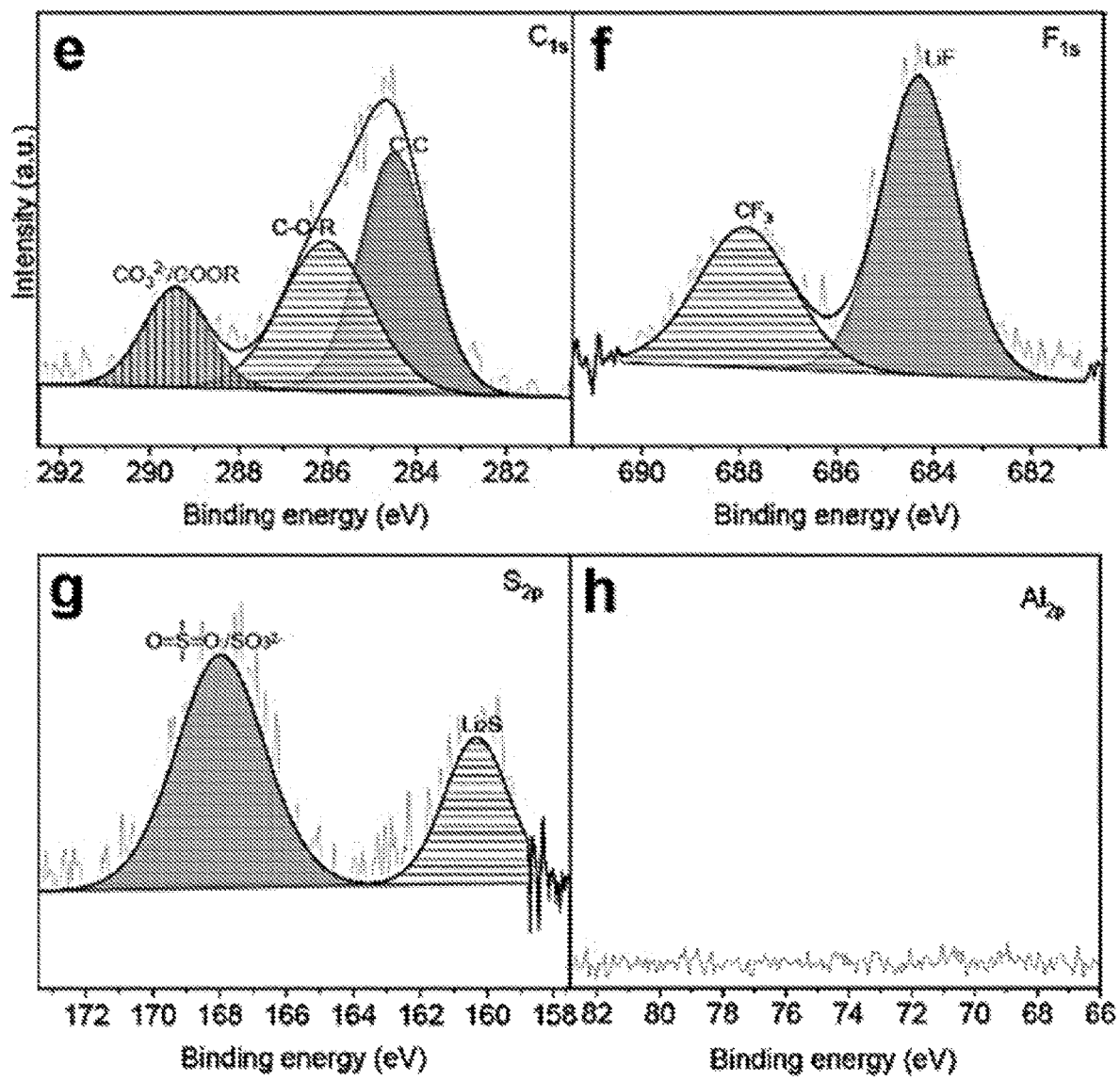
Figure 4:
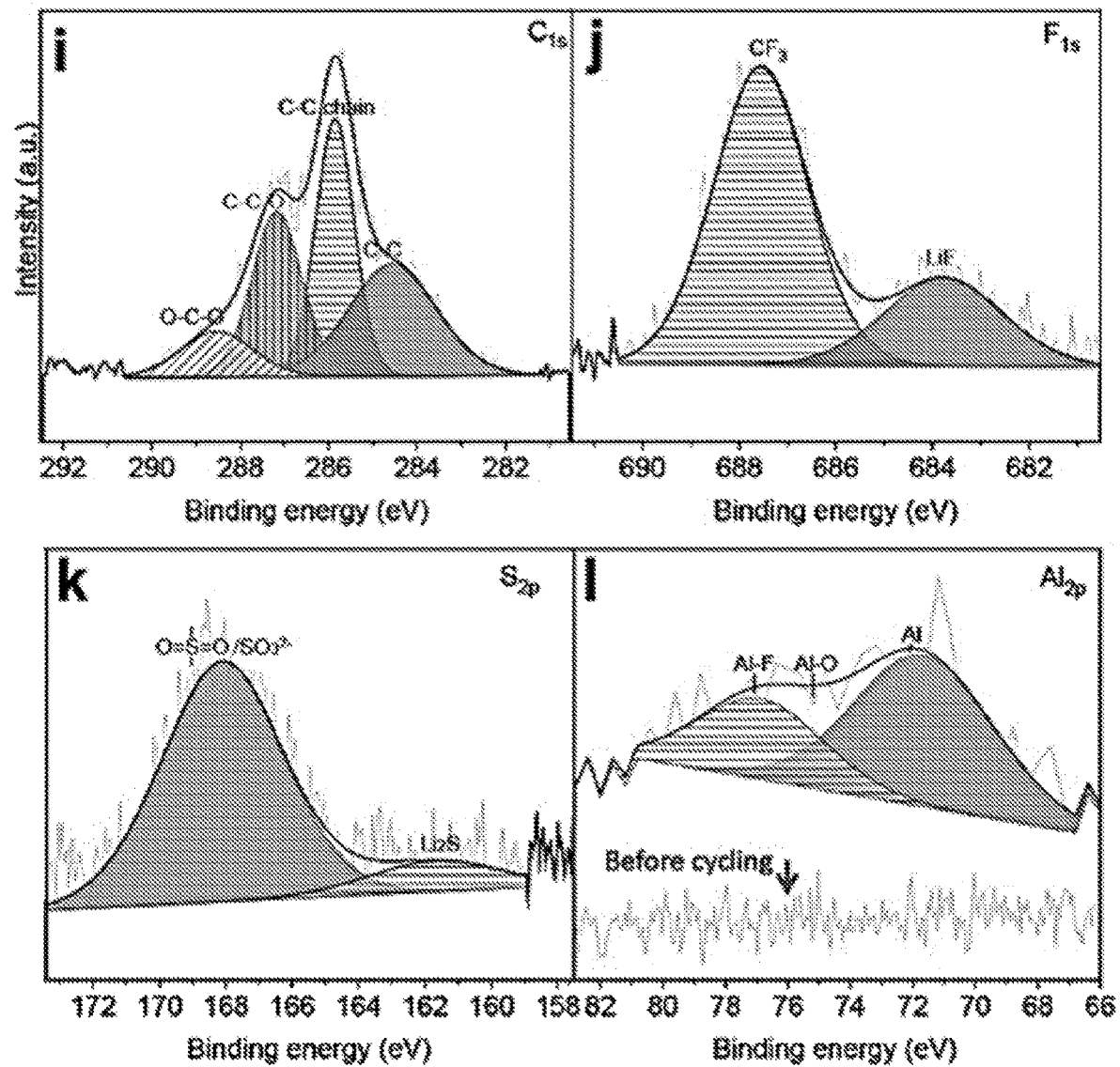

The components and chemical states of SEI formed on Li metal anode using poly-DOL electrolytes were also studied. FIG. 4a-d reports results from SEM and corresponding EDX analysis on a Li anode harvested from a symmetric cell after the 50th cycle. The Li harvested from cells in which liquid DOL is the electrolyte manifests a distinctive black coloration after cycling, and manifests obvious cracks are shown in FIG. 4a. In contrast, the surfaces of lithium harvested from cells based on the poly-DOL electrolyte exhibited almost no change in color and compact, flat topography after 50 cycles (FIG. 4c). According to the EDX analysis, the major elements on the cycled Li anode in liquid DOL electrolyte are C, O, F, S (FIG. 4b). In the case of polyDOL SPE, not only were these four elements found, but also discovered was a small amount of Al (FIG. 4d). In general, the counts/intensity for liquid DOL is much higher than that of poly DOL SPE, indicating much thin SEI formed on the surface of metal lithium. Further XPS spectra are used to characterize the chemical state of SEI in both systems (FIG. 4e-l). The CIs spectra show obvious higher binding energy peak for liquid DOL electrolyte, which should belong to the decomposition of DOL and forming $CO_3^{2-}$ and COOR components (FIG. 4e). This phenomenon is also confirmed by the high O ratio on the surface according to the EDX spectra. As comparison, the major peaks of poly-DOL belong to the segment of polymer chain (FIG. 4l). Meanwhile, the liquid DOL electrolyte also undergoes more serious reduction of salts, typical LiF peaks (FIG. 4f) and $Li_2S$ (FIG. 4g) peaks are detected. The poly-DOL SPE can also generate a considerable amount of LiF on the surface (FIG. 4j), which has now been well acknowledged in the literature as beneficial for stable lithium deposition. However, the less conductive $Li_2S$ are very tiny on lithium surface (FIG. 4k). Furthermore, it was found the Al cation trends to slowly move to the interfaces between Li anode and SPE. As shown in cycled lithium anode with poly-DOL SPE (FIG. 4l), a broad peak belong to aluminum element is found on the surface of Li anode. The aluminum complex ($AlF_3$ and $Al_2O_3$) with very thin layer are should also take crucial in stabilize the interphase of metal Lithium. As a conclusion, during battery operation, polymerization of DOL also occurs by reduction of DOL at the surface of the Li anode, and the polymer formed is thought to become part of the natural SEI that also mixes with other organic and inorganic components resultant from decomposition of the electrolyte. However, this SEI has a finite thickness and it is somehow fragile especially in contact with Li metal during plating, nucleation, and growth of dendritic structures. However, the difference of using in-situ SPE is that all the solvent (or large part of it) becomes a polymer that occupies all the space between electrodes and not only a relatively thin layer at the electrode surfaces.

Figure 5:
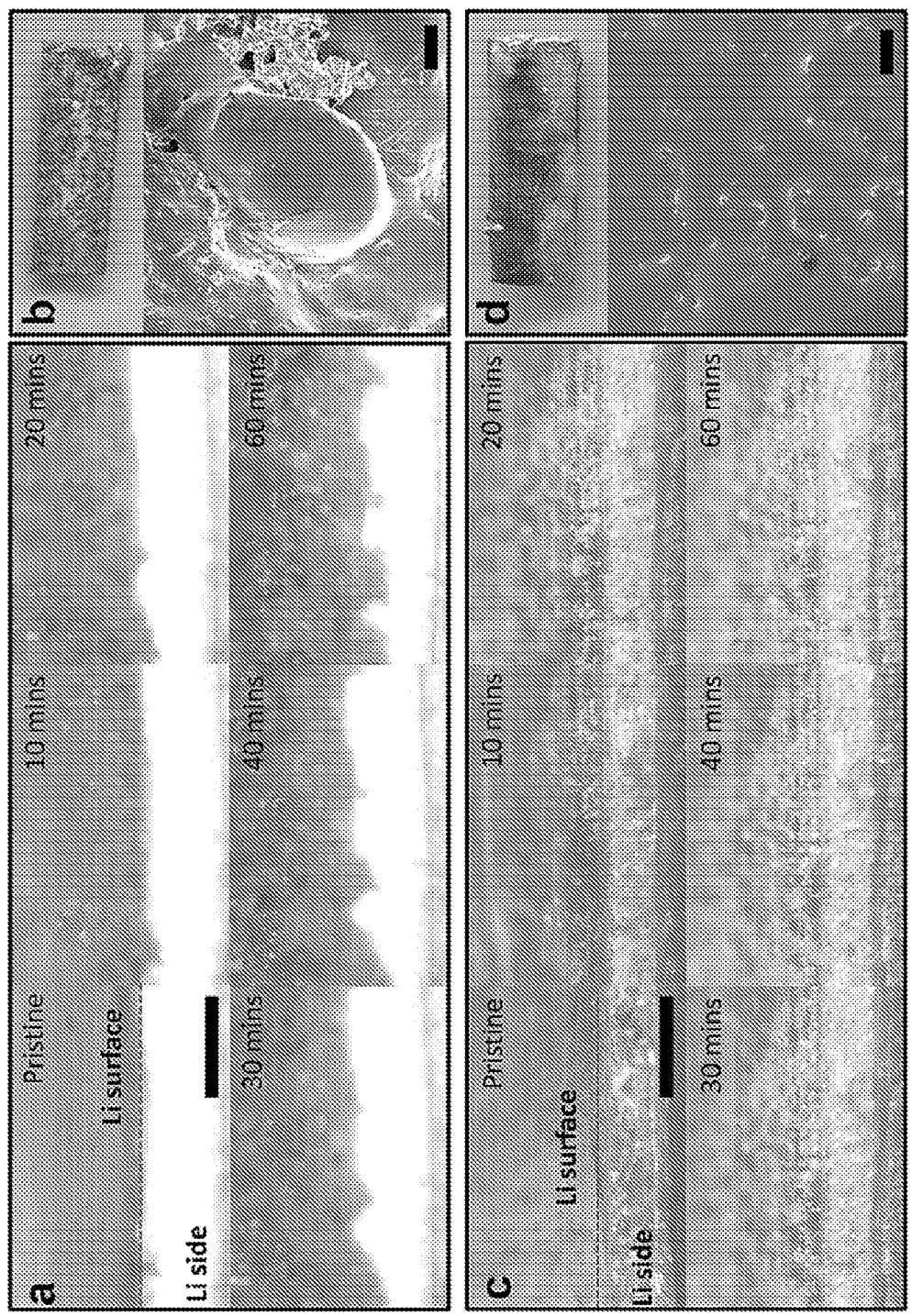
FIG. 5 shows Li electrodeposit morphology in liquid electrolyte and poly-DOL SPE. In-situ optical microscopy investigation of morphological evolution of electrodeposited lithium: (a) in a liquid electrolyte and (c) poly-DOL SPE. The current density is 2 mA/cm$^2$ and the test lasted for 60 mins. Corresponding optical and SEM images of the lithium metal electrode after Li plating using (b) liquid electrolyte and (d) poly-DOL SPE. The scale bars in (a) and (c) are 500 μm and (b) and (d) are 50 μm.

The morphology of Li electrodeposits in liquid DOL electrolytes and in the in-situ formed polyDOL SPEs can be probed directly using optical visualization studies. For this purpose, a two-electrode optical electrodeposition cell was designed that facilitates in-situ, real-time analysis of the evolution of Li/electrolyte interfaces formed in galvanostatic measurements that mimic those discussed in the previous section. Because the measurements are performed without a separator, they also allowed elimination of any effects of separator pressure on the observations. For the symmetrical cells using liquid electrolyte, the nucleation is clearly not uniform from the initial cycles (FIG. 5*a*). Mossy and tree-like lithium electrodeposits are apparent as early as ten minutes after inception of the deposition. The lithium subsequently seems to grow onto these mossy parts and after as little as 1 hour stagnant/loose deposition sites are seen to proliferate. The uneven loose lithium deposits are large enough to be seen by the unaided eye (FIG. 5*b*). These observations are consistent with failure mechanisms already inferred from the analysis reported in FIG. 3, but they clearly provide a more critical/accelerated assessment of the shortcomings of the liquid DOL electrolyte in enabling stable Li electrodeposition. In comparison, lithium plating observed using poly-DOL SPE is more compact. Indeed, viewed either by optical (FIG. 5*c*) or SEM (FIG. 5*d*) methodologies even after 2 mAh/cm$^2$, the surface of the electrodeposited lithium remains visibly flat. It is proposed that both the mechanical and chemical stability imparted by polymerizing the liquid DOL electrolytes lead to obvious improvements in uniformly of lithium plating. The elasticity of poly DOL-SPE provides a mechanism for the interphase to flex and stretch, without cracking, to accommodate volume change during electrodeposition, which it is hypothesized that it facilitates uniform electrodeposition of Li. The polymerization of DOL to form the SPE is also thought to enhance the already good chemical stability of DOL in contact with metallic Li. In that case, the side reaction towards metal surface are suppressed. This combination of features, including the organic elastic polymer, Al-complex and LiF rich inorganic compounds, is considered responsible for the impressive interfacial traits offered by the SPE.

Figure 6:
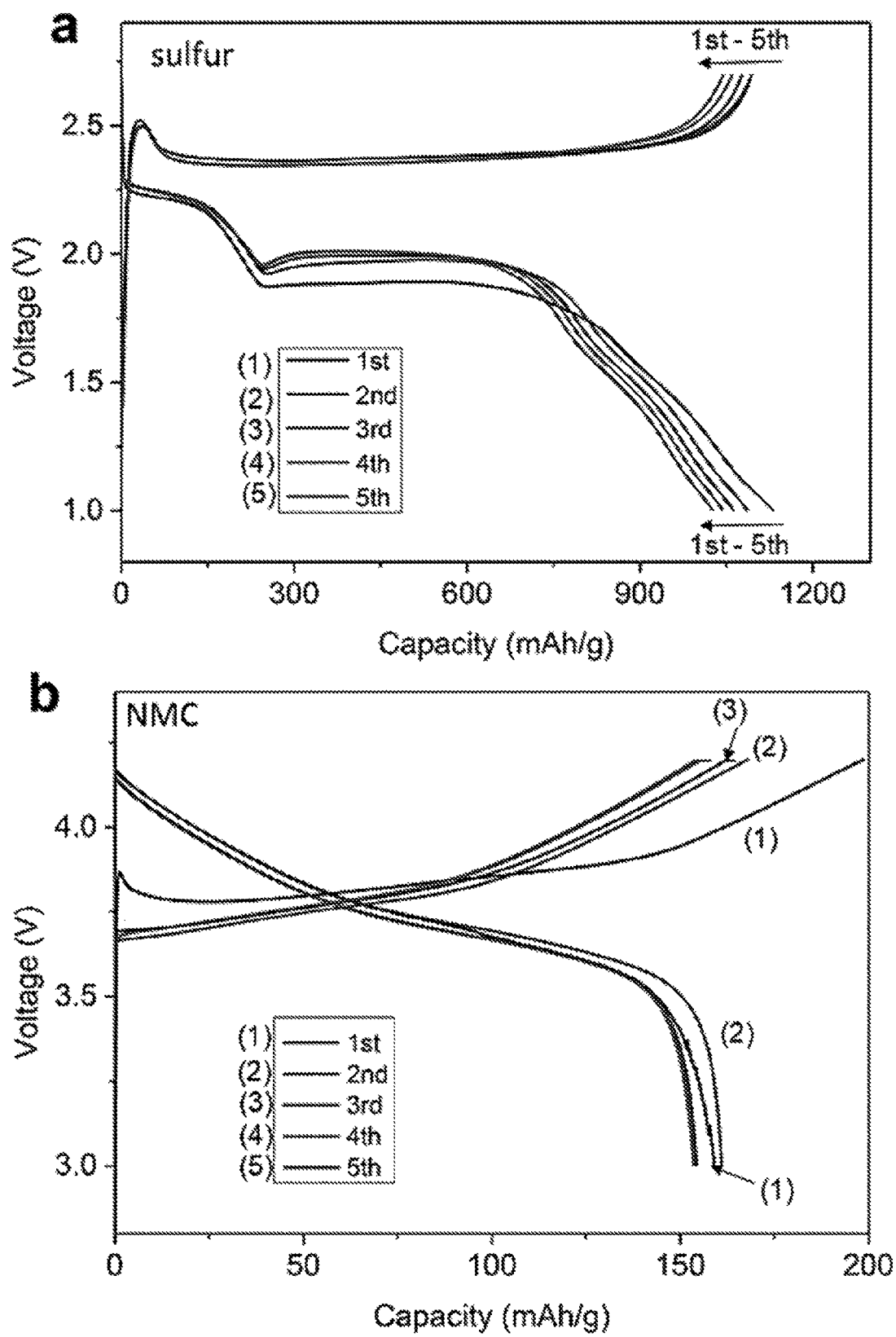
FIG. 6 shows full cell demonstration of electrochemical cells using Li metal anode and polyDOL SPEs. Discharge/charge profiles for (a) Li//poly-DOL SPE//sulfur cells at 0.1 C; (b) Li//poly-DOL SPE//NCM-622 cells at 0.1 C; and (c) Li//poly-DOL SPE//LFP cells at 0.2 C. (d) corresponding galvanostatic cycling performances and coulombic efficiencies of Li/DOL/LFP (squares) and Li//poly-DOL SPE//LFP (triangles, circles) cells.
Figure 6:
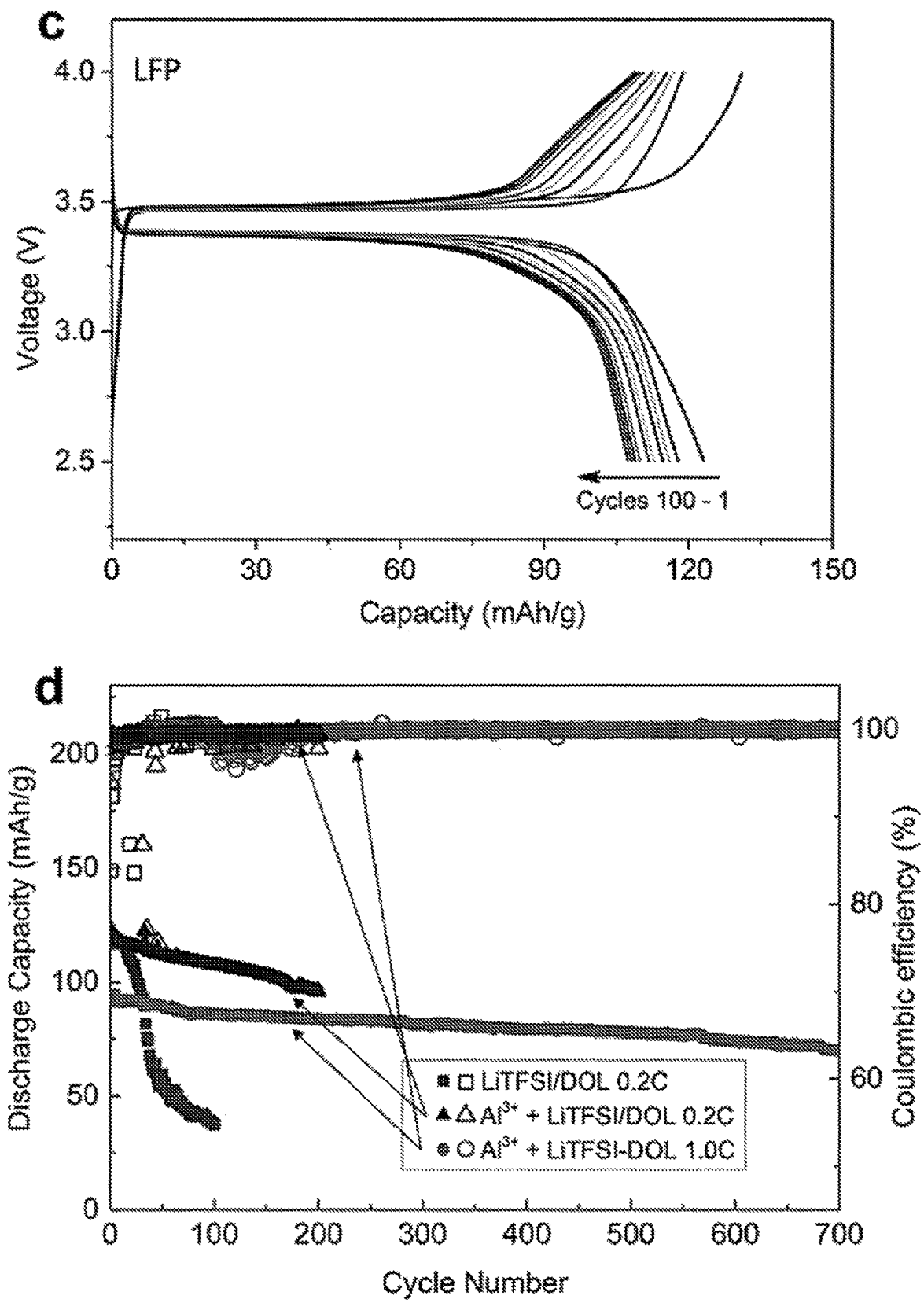
Figure 19:
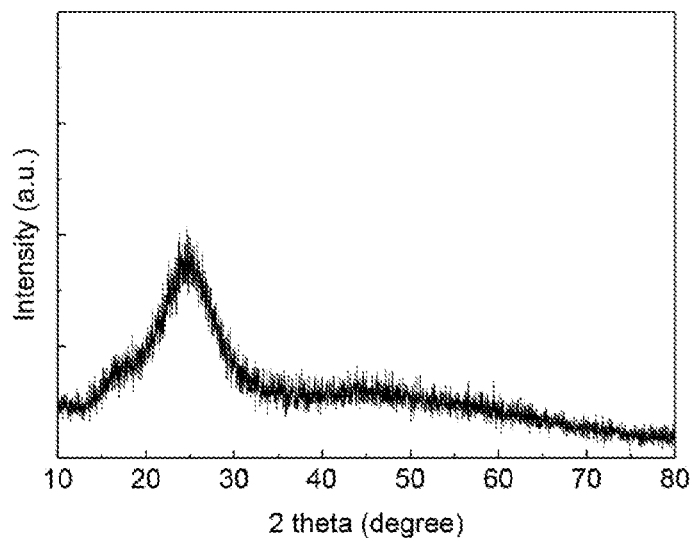
FIG. 19 shows XRD pattern of CMK-3/sulfur composites. The sulfur content is 60 wt % in the composites. No typical peaks of CMK-3 are shown in the pattern, proving the fully impregnation of sulfur powders.
Figure 20:
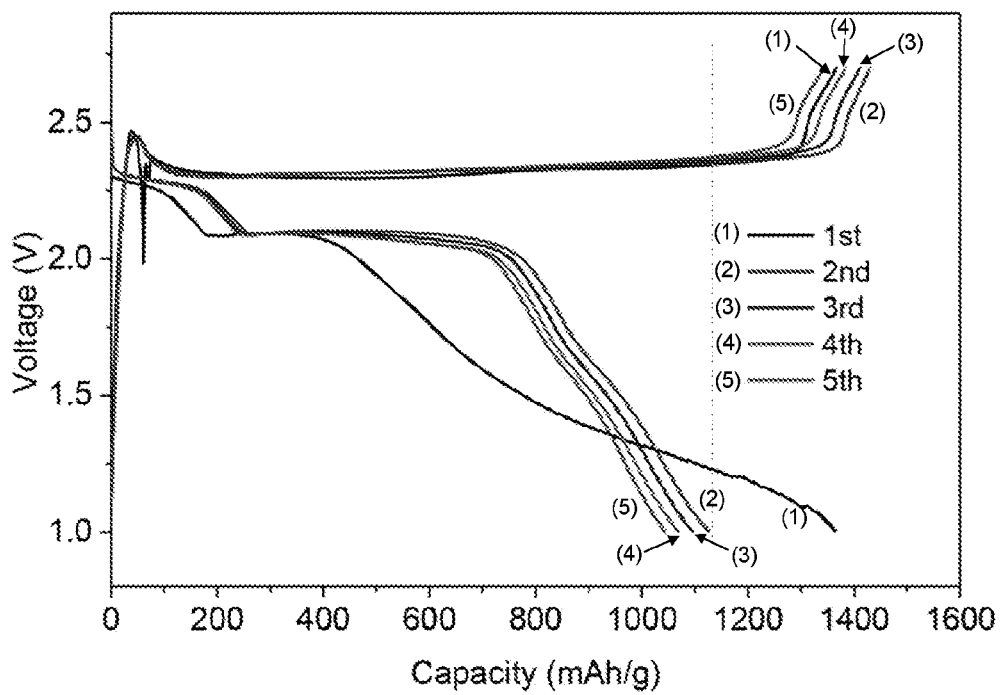
FIG. 20 shows discharge/charge curves of Li—S cells using liquid 2 m LiTFSI/DOL electrolytes at current density of 0.1 C.
Figure 21:
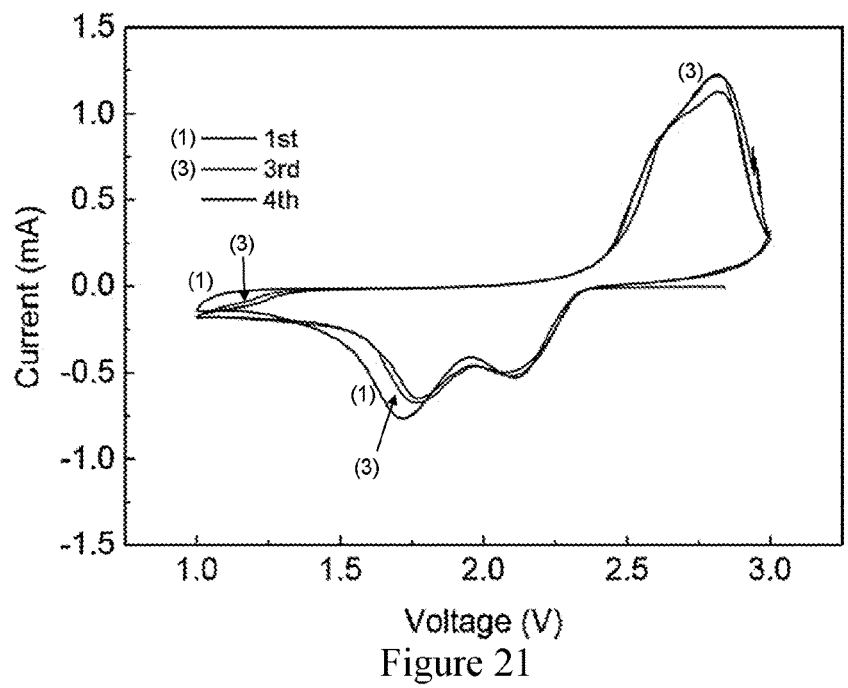
FIG. 21 shows CV curves of Li—S batteries using polymer DOL electrolytes (0.5 mM $Al^{3+}$+2 m LiTFSI/DOL). The scanning rate is 0.1 mV/s.
Figure 22:
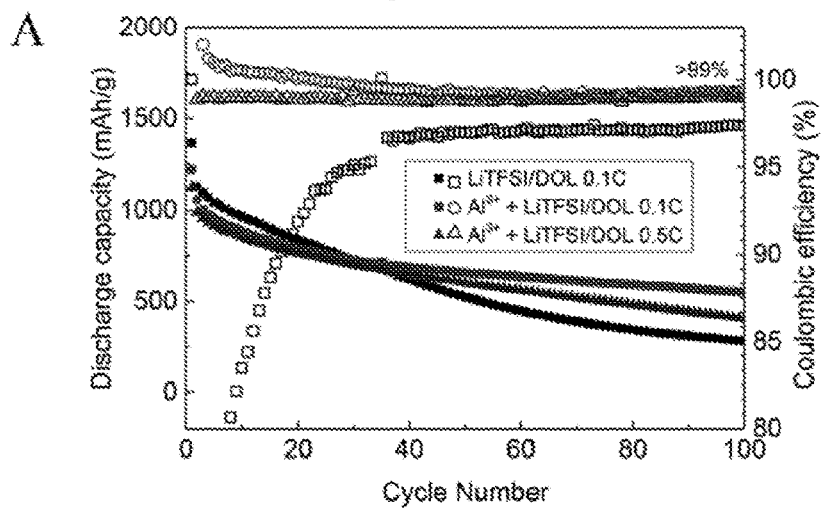
FIG. 22 shows (a) cycling performances and coulombic efficiencies of Li—S cells using liquid. LiTFSI/DOL electrolyte and poly-DOL ($Al^{3+}$+LiTFSI/DOL) electrolyte. (b) Rate performance of Li—S cells using poly-DOL ($Al^{3+}$+LiTFSI/DOL) electrolyte.
Figure 22:
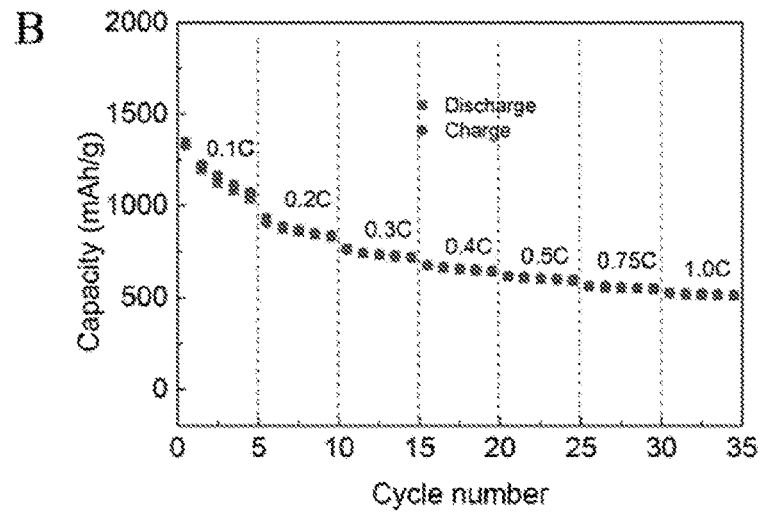
Figure 23:
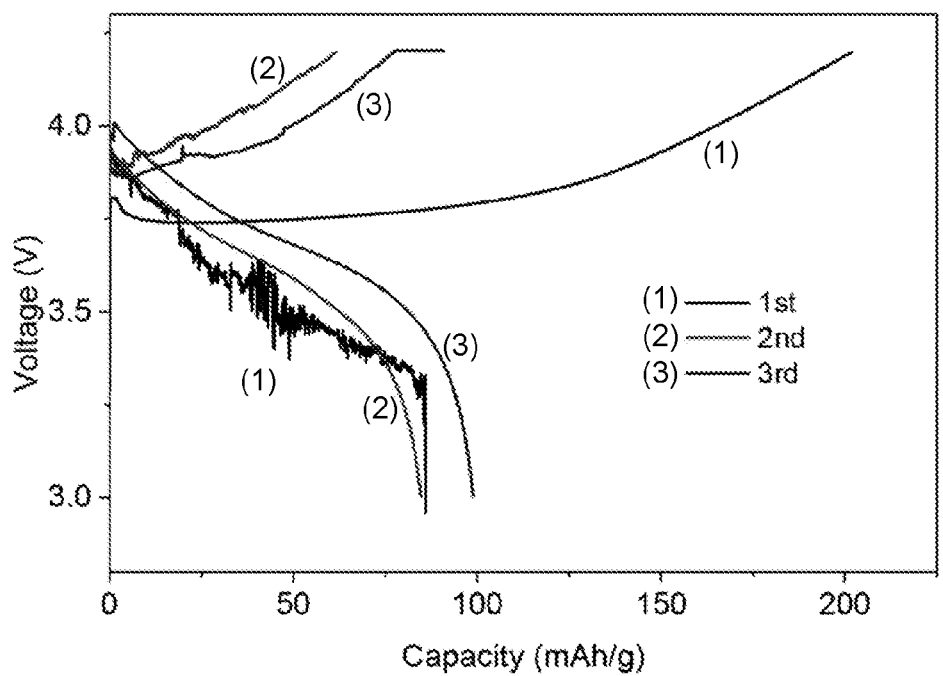
FIG. 23 shows discharge/charge curves of Li-NCM cells using liquid LiTFSI/DOL electrolytes (2 m LiTFSI/DOL) at current density of 0.1 C.
Figure 24:
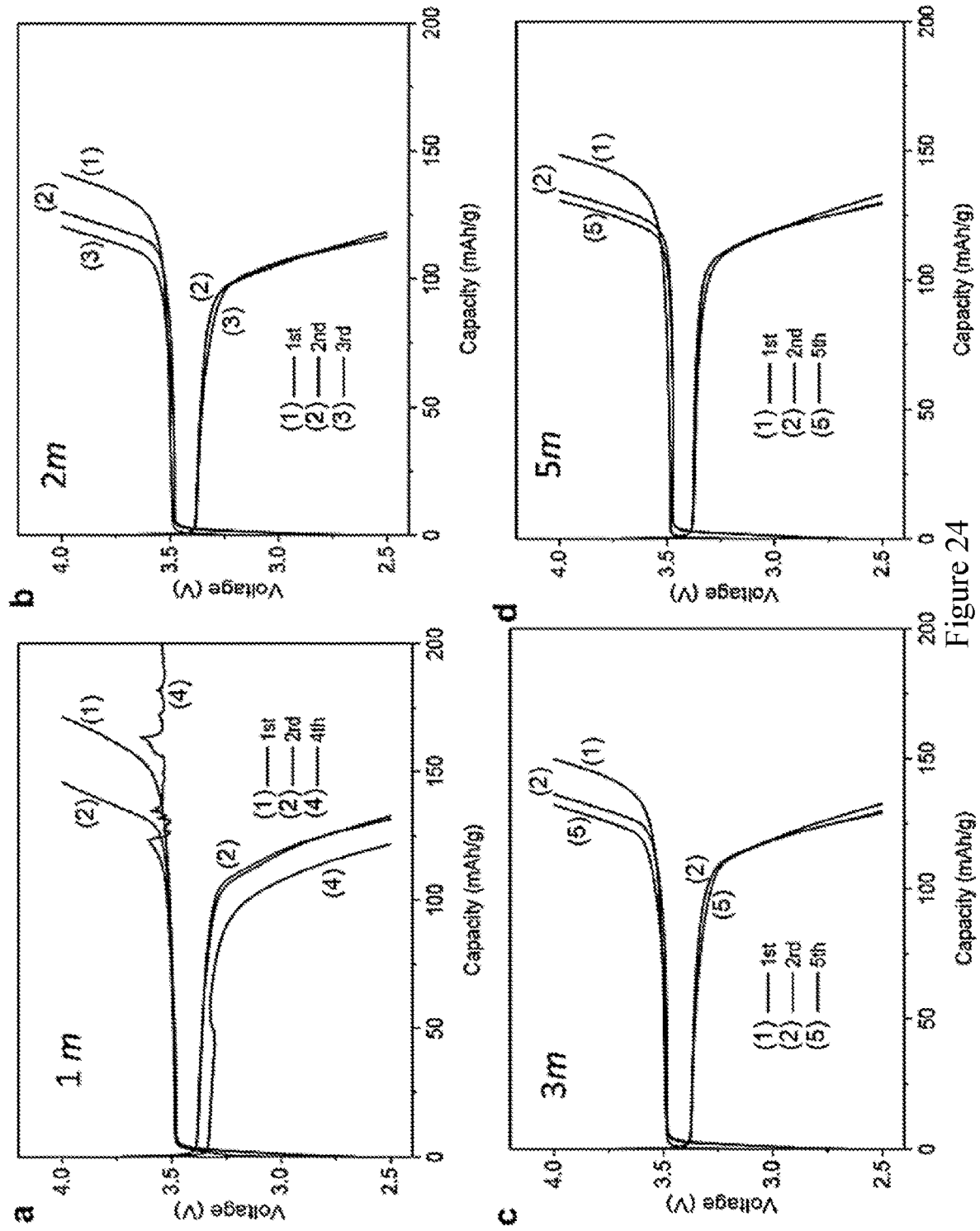
FIG. 24 shows discharge/charge profiles of Li-LFP cells using (a) 1 m LiTFSI-DOL; (b) 2 m LiTFSI-DOL; (c) 3 m LiTFSI-DOL; (d) 5 m LiTFSI-DOL liquid electrolyte.
Figure 25:
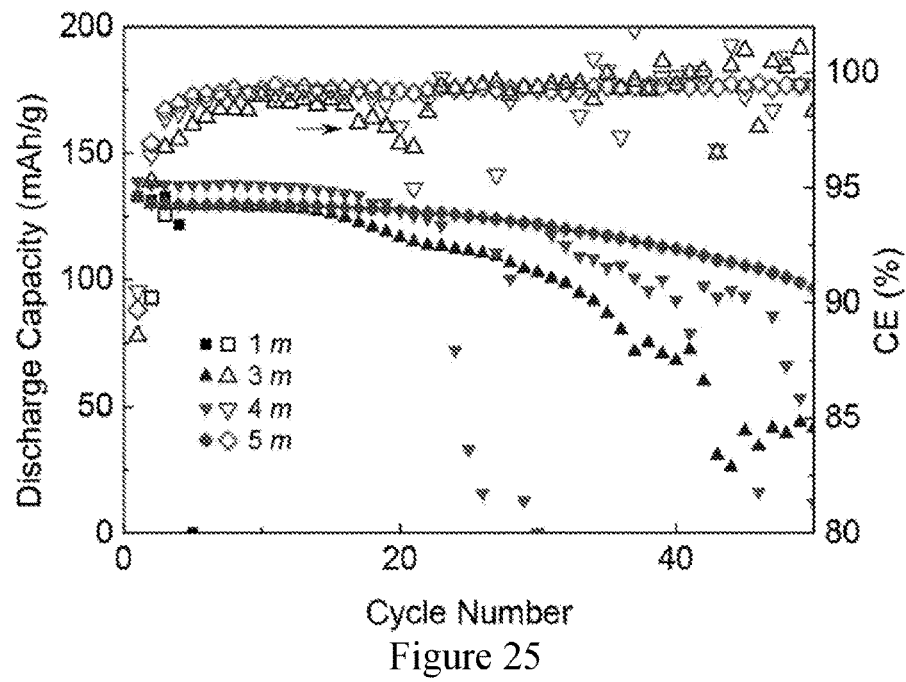
FIG. 25 shows cycling performances and coulombic efficiencies of Li-LFP cells using liquid LiTFSI-DOL electrolytes.
Figure 26:
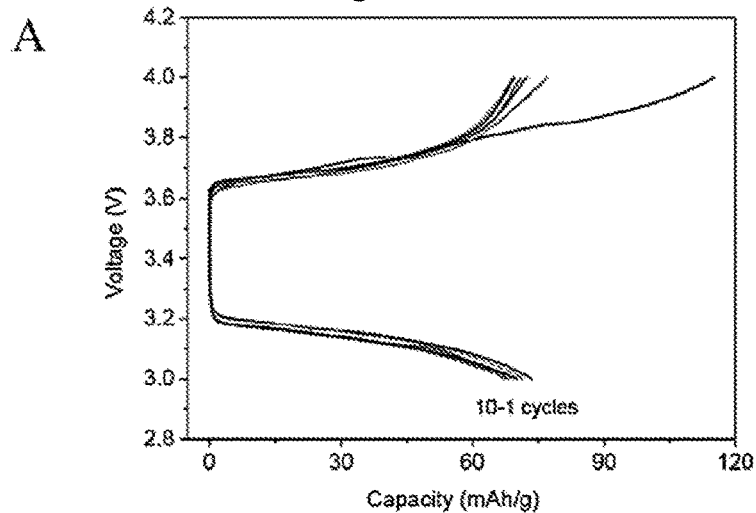
FIG. 26 shows (a) discharge/charge profiles and (b) cycling performances of Li-LFP cells using an ex-situ made free-standing poly-DOL SPE. The current density is 0.1 C.
Figure 26:
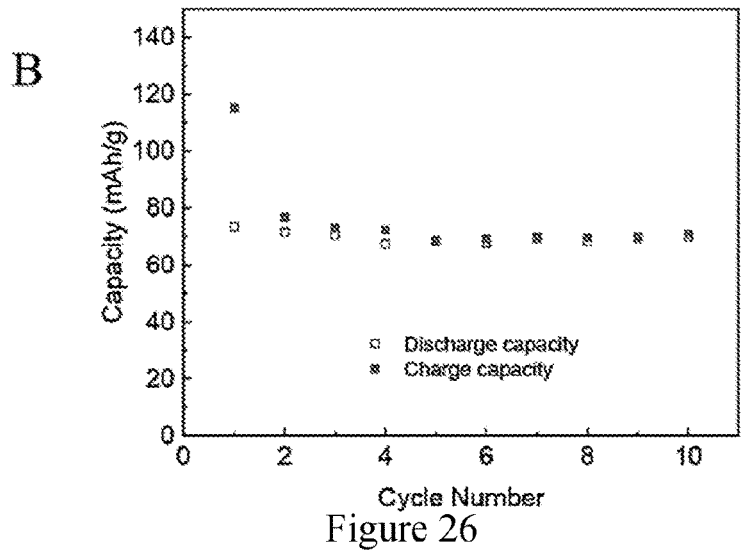

The advantages of in-situ SPE make it suitable for rechargeable lithium metal batteries using various cathode materials such as sulfur, NCM, and LFP. Lithium sulfur batteries have been widely studied for their high theoretical gravimetric energy density. The dissolution of lithium polysulfide (LiPS) in electrolytes and parasitic reactions with metallic lithium are major problems that form the focus of a large volume of published work. Although LiNO$_3$ is a good additive that can increase the stability of lithium and is believed to work in tandem with LiPS to form a stable protective layer on Li for high cell-level Coulombic Efficiencies, LiNO$_3$ is known to decrease the voltage stability window of Li—S batteries (to above 1.7 V) to avoid the decomposition of LiNO$_3$. Here, it is hypothesized that a SPE that does not use LiNO$_3$ as additive would be effective in stabilizing the Li—S cell for more fundamental reasons—it would inhibit the dissolution of polysulfide. As demonstrated in FIG. 6*a*, the Li—S cells using the poly-DOL SPE electrolyte and a CMK-3/sulfur composite cathode (FIG. 19) can be operated under a wider voltage range and display high CE close to 100%, in comparison to the DOL electrolyte (FIG. 20). CV curves for Li—S cells using the poly-DOL SPE also display two typical discharge peaks and one charging peak (FIG. 21). The cycling performance of the cells is also noticeably improved, relative to those based on liquid DOL electrolytes. The CE remains over 98% after 100 cycles even at a relatively small discharge/charge rate of 0.1 C (about 0.3 mA/cm$^2$) (FIG. 22). Notably, these benefits of the poly-DOL SPEs are also apparent at current densities as high as 0.5 C, where high levels of reversibility are also seen. The success with as an electrolyte for a conversion cathode is but one test of our hypothesis that underpins the impact of a poly-DOL SPE. Additional tests include whether such electrolytes can function with intercalating cathodes, where conventionally electrolyte permeation into the porous cathode architecture is a requirement for good ion transport in the electrode. Here, this possibility is evaluated using cycling studies of Li//poly-DOL SPE//NMC(622) and Li//poly-DOL SPE//LFP cells. FIG. 6*b* shows the discharge/charge curves for solid-state Li//poly-DOL SPE//NMC(622) cells. Compared with the corresponding Li//DOL//NMC (622) cells, which exhibit low CEs and fast capacity fading (FIG. 23), the solid-state batteries display both high CEs and excellent reversibility. The corresponding results for the solid-state Li//poly-DOL SPE//LFP batteries are reported in FIG. 6*c*. These cells are likewise observed to display high levels of reversibility and nearly flat discharge plateaus for over 100 charge-discharge cycles at room temperature (FIG. 6*c*, FIGS. 24-25). Results from higher rate (1 C) and longer-term cycling studies reported in FIG. 6*d* show that CEs close to 100% and relatively stable cycling is achieved even after 700 cycles. The excellent performances are attributed to the better interphase by in-situ SPE. When ex-situ SPE with same condition are used for LFP cells, the Li-LFP cell shows very large polarization even at low discharge/charge rate (FIG. 26).

In conclusion, reported in this example that by initiating polymerization of liquid electrolytes inside an electrochemical cell using low concentrations of soluble Al(OTf)$_3$ salt provides a powerful, new approach for creating solid-state polymer electrolytes with mS/cm levels of room-temperature ionic conductivity and low interfacial impedances. As a result, the SPEs developed in the study do not suffer from limitations associated with poor bulk and interfacial ion transport common to all solid-state electrolytes. Deployment of the SPEs as electrolytes in symmetric Li//Li and asymmetric Li//Cu cells, show that they enable high cell-level coulombic efficiency and excellent reversibility in the Li stripping/plating processes. As a final demonstration, the electrolytes were used to create solid-state batteries utilizing conversion (e.g., S) and intercalating (e.g., LFP and NCM) cathode chemistries. In so doing, it was shown that in-situ polymer generation in an electrochemical cell provides a promising path to all solid-state batteries in a range of chemistries.

Preparation of materials and batteries. Electrolyte preparation. Electrolyte preparation and cell assembly were conducted in an Argon gas filled glove box (Inert Inc), in which both 02 and H$_2$O content are maintained below 0.5 ppm. The raw materials including Lithium bis(trifluoromethylsulfonyl)imide (LiTFSI, ≥98.0%, TCI America) Aluminum triflate (Al(OTf)$_3$, Alfa Aesar, 99%) stored in the glovebox and used without further purification. Prior to all experiments, 1,3-Dioxolane (DOl, anhydrous, contains ~75 ppm BHT as inhibitor, 99.8%, Sigma-Aldrich) was treated overnight with coarse pieces of sacrificial metallic lithium foil to chemically "dry" the materials through reaction of the sacrificial Li with any traces of water remaining in the electrolytes. Liquid DOL-LITFSI and DOL-Al(OTf)$_3$ electrolytes containing different contents of the respective salts were prepared by adding the desired stoichiometric amounts of salt into DOL with vigorous stirring. Electrolyte compositions used in the study were created by diluting the homogeneous solutions of DOL-Al(OTf)$_3$ with appropriate amounts of DOL-LITFSI to create initially liquid DOL electrolytes containing variable fractions Al(OTf)$_3$.

Cathode and battery preparation. Sulfur cathodes were prepared by mixing sulfur/CMK-3 composites, super P carbon as a conductivity aid, and Polyvinylidene fluoride (PVDF) with weight ratio of 84:8:8 in NMP solvent to form a smooth slurry. The slurry was ball milled for half an hour and painted on a carbon-coated Al foil. The cathodes are drying in a vacuum oven to remove NMP solvent. The sulfur loading of each cathode was about 2.0 mg (sulfur) cm$^{-2}$. LFP cathodes are prepared with similar procedure and the LFP loading was about 5 mg cm$^{-2}$. CMK-3/sulfur composites are prepared with a typical melting-diffusion method. The sulfur content is about 60 wt % in CMK-3/sulfur composites. Nickel Cobalt Manganese Oxide (NCM 622) cathodes were obtained from Electrodes and More Co. Coin 2032 cells were assembled using Li foil as anode and glass fiber or celgard 3501 as separator. The separator is used in the assembly of cells is to provide the separation and control the thickness of SPE, which can avoid the short circuit at liquid state. For prepared free standing SPE, no separator is used. All electrochemical cell performances are tested under room-temperature.

Materials characterizations. Liquid LiTFSI-DOL electrolytes and poly-DOL electrolytes were dissolved in DMSO-d$_6$ for $^1$H NMR and $^{13}$C NMR analysis. Gel permeation chromatography (GPC) measurements were performed by first dissolving the synthesized poly-DOL electrolytes in THF and eluting the solutions in a Waters ambient temperature GPC equipped with triple detection capability for absolute polymer molecular weight determination. FTIR spectra of the materials were characterized using a Thermo Scientific spectrometer in the ATR mode. D.C conductivity and electrochemical impedance spectroscopy (EIS) were performed using a Novocontrol Broad band dielectric/impedance spectrometer. The morphologies of Lithium after platting are imaged by Field Emission Scanning Electron Microscopy (FESEM). DSC is tested using TA Instruments Q1000 Modulated Differential Scanning Calorimeter (MDSC). Oscillatory shear rheology was conducted using a strain-controlled ARES-LS (Rheometric Scientific) rheometer outfitted with cone and plate geometry (10 mm diameter, 4° cone angle) to monitor the polymerization reaction in real time. The oscillatory shear experiments were carried out with strain $\gamma=1\%$ and angular frequency $\omega=1$ rad/s at ambient temperature (24° C.) for 2 hours. Reaction components were taken out from glovebox and mixed prior to being loaded to the instrument. For small amplitude oscillatory shear (SAOS) measurements, frequency sweeps from 0.1 rad/s to 100 rad/s were performed at a shear strain $\gamma=0.1\%$ to study the response of materials in the linear viscoelastic regime. Tensile measurements were performed at ambient temperature using stress-controlled DMA Q800 (TA Instruments). Materials were taken out directly from glovebox before being loaded. TGA tests were performed at room-temperature to 500° C. under N2 atmosphere at a temperature increase of 5° C./min. The instrument used for TGA test is TG/DTA 6200. Raman test are conducted using the instrument of Renishaw InVia Confocal Raman microscope at excitation wavelengths of 785 nm. X-ray photoelectron spectroscopy SSX-100 (XPS) was used to study SEI on lithium surface. The cycled lithium are washed sufficiently by DOL and dimethoxyethane and dried in glovebox. The in-situ lithium plating images was recorded Dino-Lite digital microscope. A home-made cuvette cell with two parallel Li electrodes inside was used to observe morphological changes of Li surfaces real time. Galvanostatic discharge/charge tests were performed using Neware battery tester at room temperature. A CH 600E electrochemical workstation is used for cyclic voltammetry measurements.

TABLE 1

GPC results, ionic conductivity and unpolymerized DOL ratio of prepared electrolytes using different concentrations of Al(OTf)$_3$.

| Sample | Mn (Daltons) | Mw (Daltons) | Polydispersity | Ionic conductivity (mS/cm) | DOL/ (DOL + poly DOL) |
|---|---|---|---|---|---|
| 2 m LiTFSI/ DOL | | | | 6.5 | |
| 0.2 mM Al$^{3+}$ | 20K | 59K | 2.5 | 1.8 | 86% |
| 0.5 mM Al$^{3+}$ | 15K | 37K | 2.5 | 1.1 | 19% |
| 1.0 mM Al$^{3+}$ | 8.4K | 15K | 1.8 | 0.055 | 14% |
| 5.0 mM Al$^{3+}$ | 2.3K | 3.3K | 1.4 | 0.020 | 10% |

Example 2

The following provides examples of compositions, methods, and batteries of the present disclosure, and characterization of batteries of the present disclosure.

In this example, ether-based electrolytes are in situ polymerized by a ring-opening reaction in the presence of aluminum fluoride (AlF$_3$) to create solid-state polymer electrolytes inside LiNi$_{0.6}$Co$_{0.2}$Mn$_{0.2}$O$_2$ (NCM)||Li batteries that are able to overcome both challenges. We report that AlF$_3$ plays a dual role as a Lewis acid catalyst and in building fluoridized cathode-electrolyte interphases, protecting both the electrolyte and aluminum current collector from degradation reactions. The solid-state NCM||Li metal batteries exhibit enhanced specific capacity of 153 mAh/g under high areal capacity of 3.0 mAh/cm$^2$. This work offers an important pathway towards solid-state polymer electrolytes for high-voltage solid-state batteries.

In this example, solid-state batteries created by in-situ polymerization of liquid electrolytes inside a battery cell were investigated. By taking advantage of the low viscosity and interfacial interactions of the liquid precursors, such electrolytes are described to overcome conventional problems with poor interfacial charge transport. SSEs based on polymerized 1,3-dioxolane (Poly-DOL) are of particular interest because this polymer forms chemically stable interphases on Li metal and thereby enables highly reversible cycling of Li metal anodes. Ring-opening polymerization of DOL in the presence of a mixture of Lewis acids, AlF$_3$ and aluminium triflate (Al(OTf)$_3$) is shown in this example, further, to provide a general approach for creating poly-DOL SSEs with in-built functionality to stabilizing the electrolyte at the reducing potentials of a Li metal anode and the oxidizing potentials of a LiNi$_{0.6}$Co$_{0.2}$Mn$_{0.2}$O$_2$ (NCM622) cathode. The AlF$_3$ and Al(OTf)$_3$ are introduced as salt additives in the liquid electrolyte precursor to facilitate complete wetting of the porous NCM cathode and Li anode. The polymerization reaction is gradual and results in formation of a solid-state polymer with well-formed interphases at both the cathode and anode that provide in-built connected pathways for ion migration. The AlF$_3$ also appears to play a dual role in CEI construction and current collector protection, facilitating electrolyte stability, and thus practical cycling performances of NCM622||Li cells.

Figure 27:
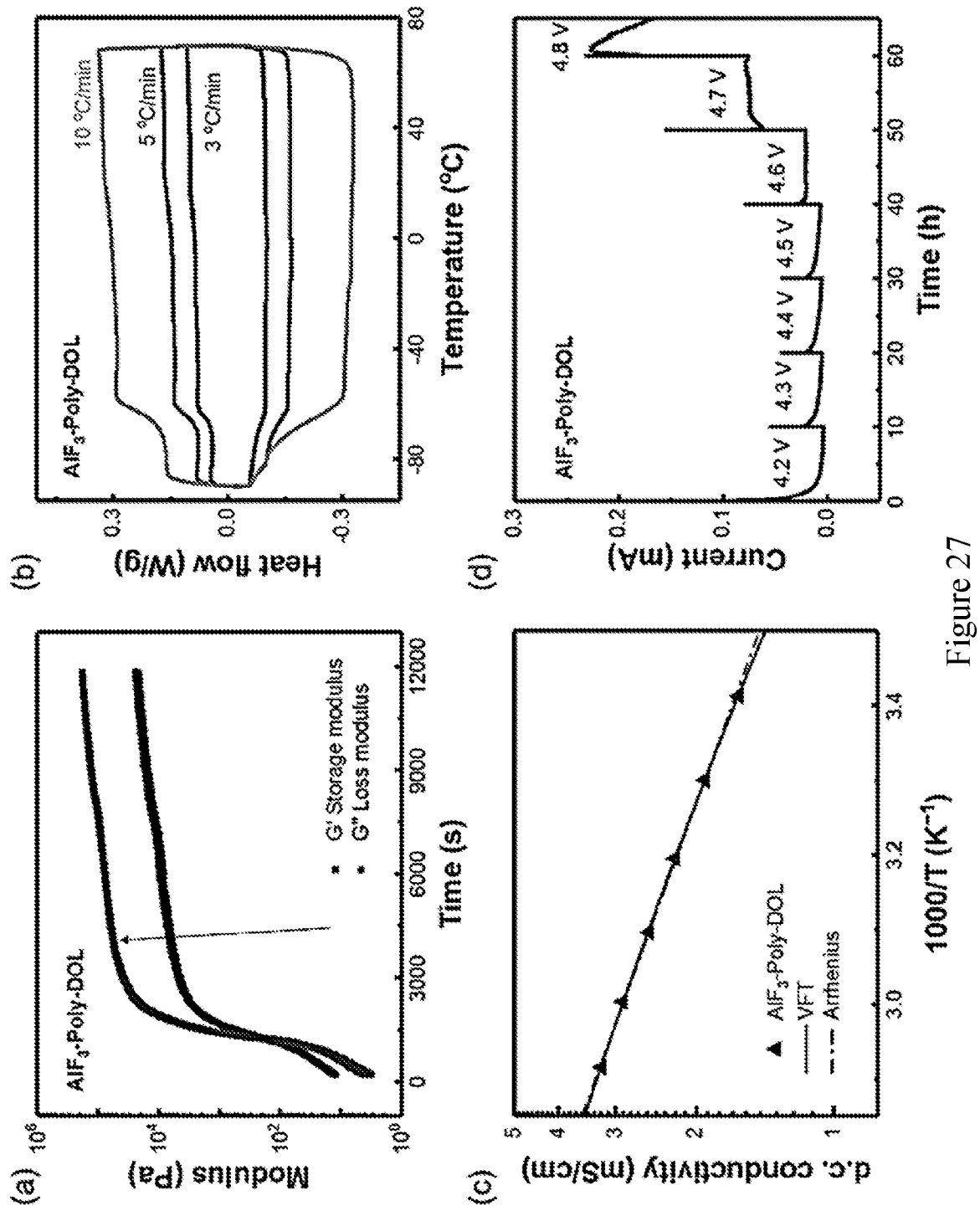
FIG. 27 shows characteristics of $AlF_3$-Poly-DOL electrolyte. (a) Time sweep rheology measurements for $AlF_3$-Poly-DOL electrolyte at angular frequency ω=10 rad/s. The material has a higher storage modulus G' and is thus more solid-like after polymerization process. (b) DSC analysis of $AlF_3$-Poly-DOL electrolyte. (c) Conductivity of the $AlF_3$-Poly-DOL electrolytes versus temperature (0.3 M $AlF_3$). The solid (black) and dashed lines through the data are fitted using the Vogel-Fulcher-Tammann (VFT) and Arrhenius transport models, respectively. (d) Electrochemical floating analysis of the $AlF_3$-Poly-DOL electrolyte and poly-DOL electrolytes using NCM cathodes.

Ring-opening polymerization of DOL was initiated by a mixture of Al(OTf)$_3$ and AlF$_3$, with 2.0 M LiTFSI introduced in the electrolyte. The reaction was carried out at 25° C. and monitored by small amplitude oscillatory shear rheology at a shear strain $\gamma=0.5\%$ for an extended period of time (FIGS. 27$a$ and 32). The polymerization reaction produced a large increase in both the elastic/storage modulus (G') and viscous/loss modulus (G") of the materials; completion of the reaction was identified by the plateauing of both moduli. During the earliest stages of polymerization, the electrolyte is liquid-like and G">>G'. As the polymer chains grow and begin to entangle, G' increases more quickly with time, eventually becoming larger than G". By the end of the polymerization process the electrolyte is transformed to a solid-state, elastic material for which G'≈10 G", and the elastic modulus of the resultant SSE approaches values typical of polyether melts. Upon completion of the polymerization, the weight average molecular weight ($M_w$) of the $AlF_3$-Poly-DOL (0.3 M $AlF_3$) electrolyte reached 18 kDa with dispersity D of 1.59 as measured by gel permeation chromatography (GPC) in tetrahydrofuran. And the molecular weights decrease with the increase of $AlF_3$ concentration (Table 2).

The thermal properties of the in situ formed poly-DOL were measured by differential scanning calorimetry (DSC) at different scan rates. (FIG. 27b) The material was first heated above its melting transition to eliminate any thermal history. The poly-DOL also exhibited a low glass transition temperature ($T_g$) of around −70° C., which implies that under ambient conditions accelerated segmental motions occur, leading to superior ion transport properties at room temperature.

Figure 33:
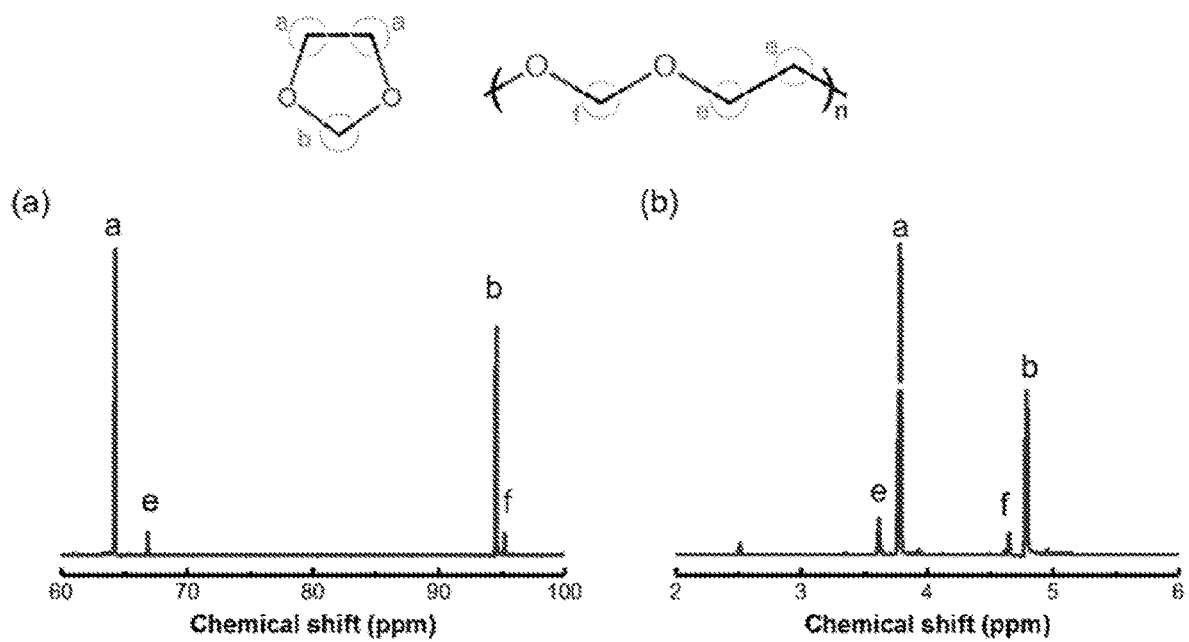
FIG. 33 shows carbon (a) and hydrogen (b) NMR spectra of $AlF_3$-initiated poly-DOL electrolyte. The electrolyte is polymerized with 1.0 M $AlF_3$ and without $Al(OTf)_3$. After polymerization, new carbon and hydrogen peaks appear, indicating the poly-DOL structure.
Figure 34:
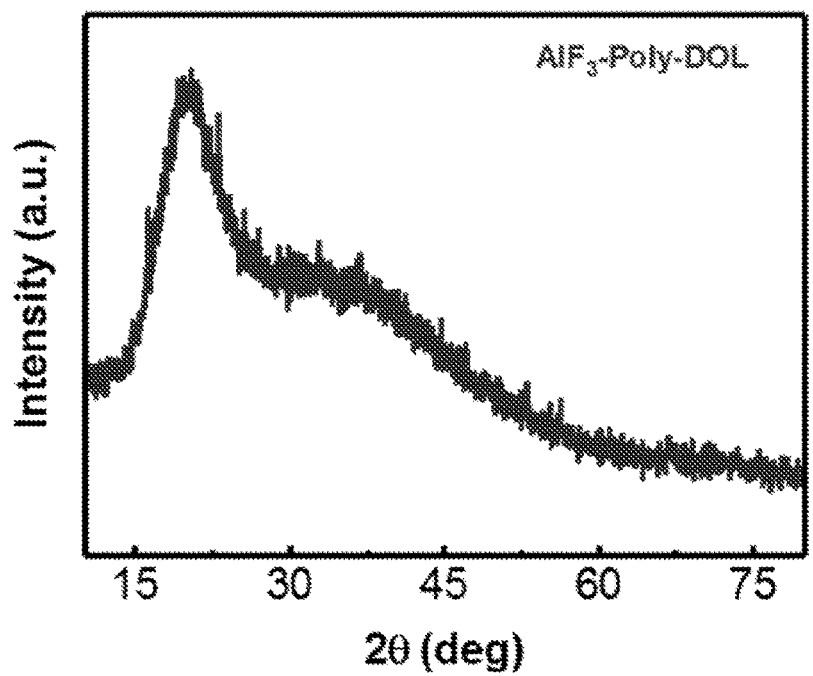
FIG. 34 shows an XRD pattern of $AlF_3$-Poly-DOL electrolyte.
Figure 35:
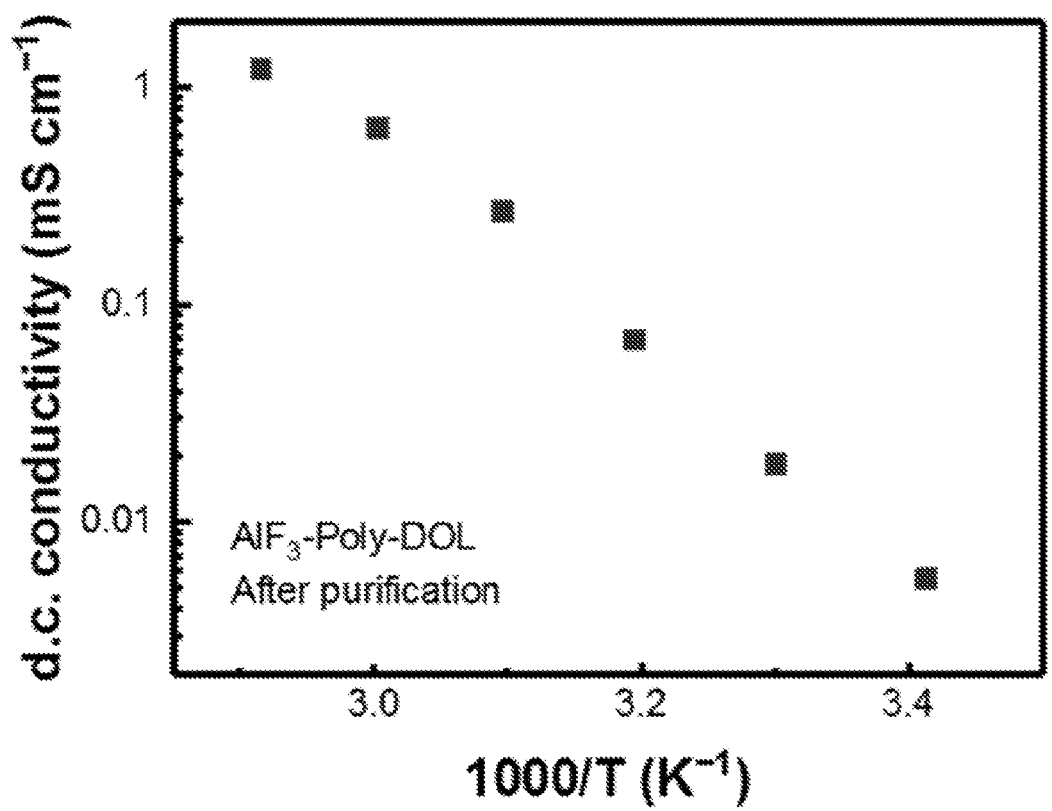
FIG. 35 shows conductivity of the $AlF_3$-Poly-DOL electrolytes versus temperature after purification. The electrolyte is first polymerized with higher concentration of initiator (5.0 mM, compared to 0.5 mM $Al(OTf)_3$) with the same 2 M LiTFSI present. Then the obtained electrolyte is vacuumed to remove the unreacted liquid DOL. The approach allows to minimize the fraction of unreacted liquid DOL and avoid extracting uncontrolled amounts of LiTFSI salt.

Ionic transport properties of the in situ polymerized $AlF_3$-Poly-DOL electrolyte are shown in FIG. 27c. The poly-DOL electrolytes exhibit ionic conductivities at mS/cm level at both room and elevated temperatures, where the conductivities are enhanced with the addition of $AlF_3$ additives compared with routine Poly-DOL electrolyte. The enhancement is thought to reflect the broadening of the poly-DOL molecular weight distribution as well as the average poly-DOL molecular weight, because $AlF_3$ is itself a strong Lewis acid capable of initiating ring-opening polymerization of DOL (FIG. 33). At the lower polymer molecular weights studied here, both features lower the glass transition temperature, which facilitates ion migration. The X-ray diffraction (XRD) patterns indicate that no obvious crystallinity is observed for the SPE (FIG. 34). The temperature-dependent conductivity for the in-situ polymerized electrolyte can be fitted well either using the Arrhenius or Vogel-Fulcher-Tammann equation (Table 3). This finding is consistent with the low $T_g$ of the materials and reflects the fact that the conductivity data in FIG. 27c are measured at temperatures well above the glass transition temperature of the electrolyte. It should be noted that in most cases a small fraction of incompletely polymerized liquid-like DOL remains in the SPE plays a role in the favorable bulk and interfacial transport properties (FIG. 35).

Figure 28:
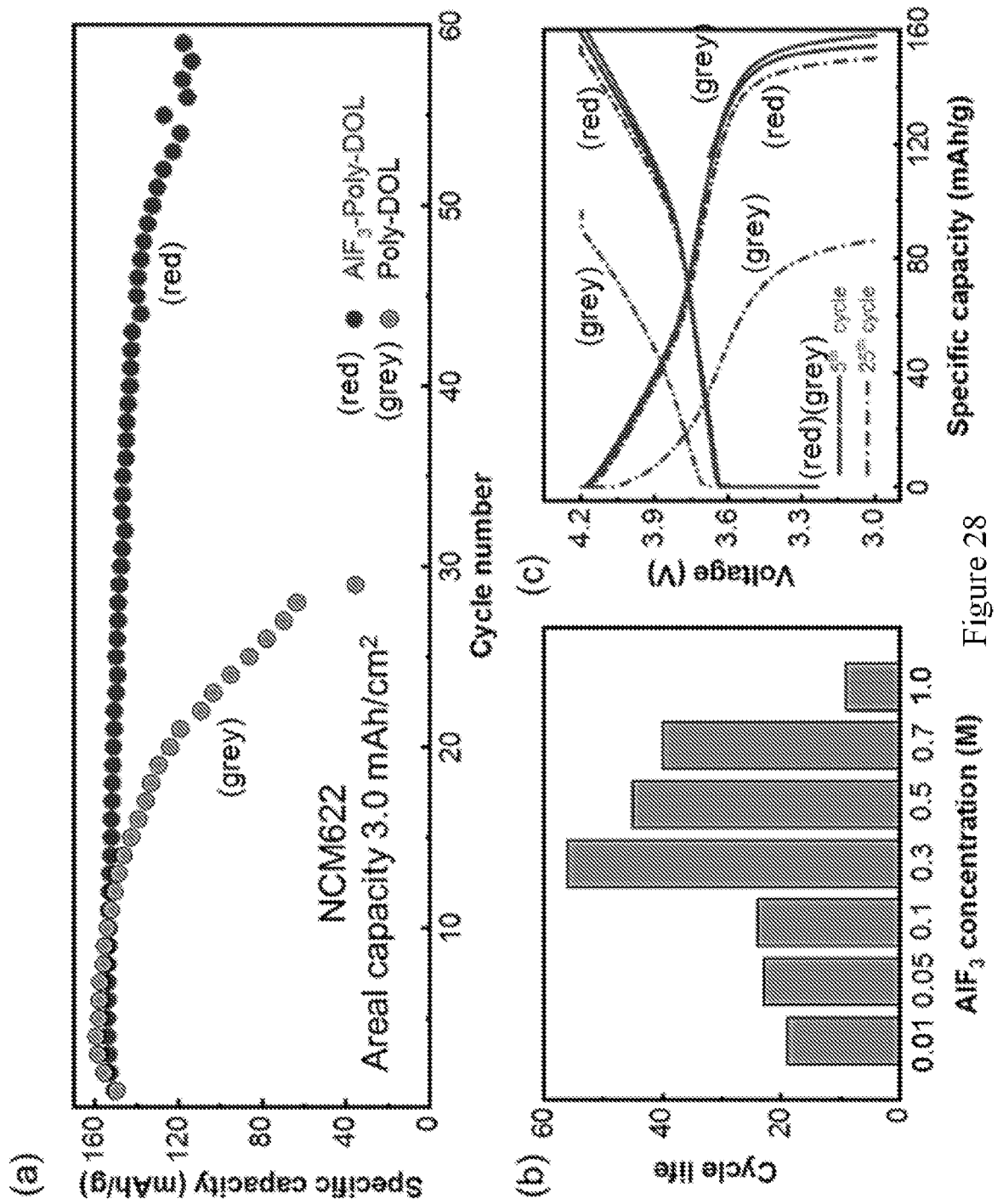
FIG. 28 shows electrochemical performances of cells using high-loading NCM cathodes and Li metal anodes. (a) Galvanostatic cycling performances of solid-state NCM∥Li metal batteries with $AlF_3$-Poly-DOL and routine polymerized DOL at 0.1 C under room temperature. (b) Cycle life of high-loading NCM batteries with different $AlF_3$ concentrations in poly-DOL electrolytes. (c) Corresponding discharge/charge profiles of NCM batteries with 0.3 M $AlF_3$-Poly-DOL (red) and Poly-DOL (grey) electrolytes.

A well-known, but stubborn problem faced by all ether-based electrolytes is their poor oxidative stability at the battery cathode, where modifying Li salts contributes to extending the electrochemical stability window of ether-based liquid electrolytes. Quantifying the leakage current measured in an electrochemical floating test provides an aggressive approach for evaluating this stability. Results reported in FIG. 27d indicate that $AlF_3$-Poly-DOL electrolyte exhibit limited leakage current as high as 4.7 V. A more rigorous approach for characterizing stability of a polymer SSE is to evaluate the performance of rechargeable batteries composed of Ni-rich nickel-cobalt-manganese oxides cathodes. Investigated in this example are the reversibility of NCM622||Li metal batteries composed of commercial cathodes with a high areal loading of 3.0 mAh/cm² and utilizing the in situ formed poly-DOL SSEs (FIG. 28). The results reported in FIG. 28a show that the $AlF_3$-Poly-DOL batteries are able to operate without over-charging or side reactions at an elevated cut-off voltage of 4.2 V, which is consistent with the floating test results showing excellent anodic stability. However, there is a continuous capacity decay and a sudden drop after the $20^{th}$ cycle for routine Poly-DOL electrolytes. It is hypothesized that this behavior reflects the limited compatibility of the Poly-DOL electrolyte with the NCM cathode.

Figure 36:
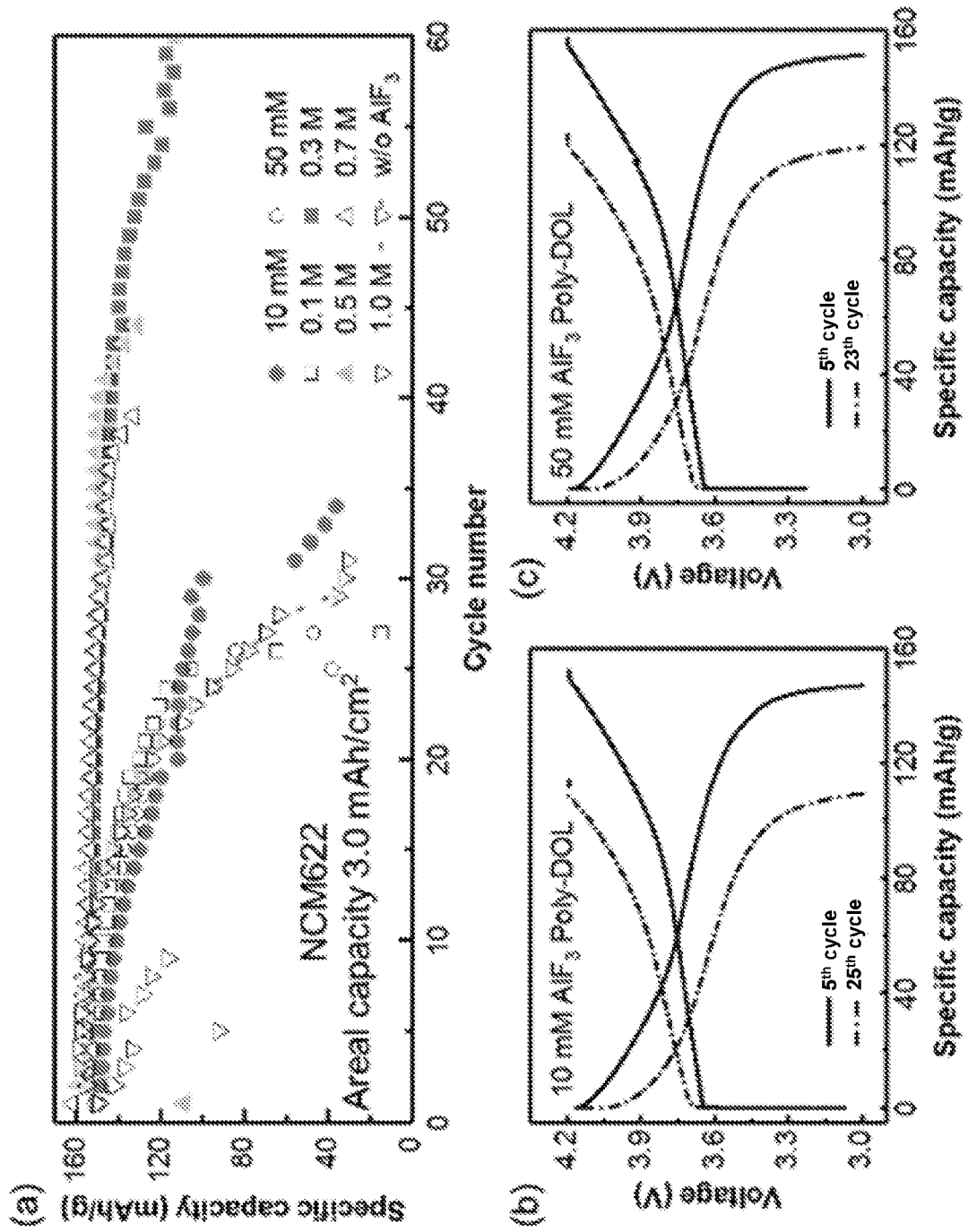
FIG. 36 shows (a) galvanostatic cycling performances and curves of NCM∥Li metal batteries utilizing Poly-DOL electrolytes with different $AlF_3$ concentrations at 0.1 C under room temperature. (b-g) Corresponding charge/discharge curves of batteries with (b) 10 mM, (c) 50 mM, (d) 0.1 M, (e) 0.5 M, (f) 0.7 M, (g) 1.0 M $AlF_3$ in poly-DOL electrolytes.
Figure 36:
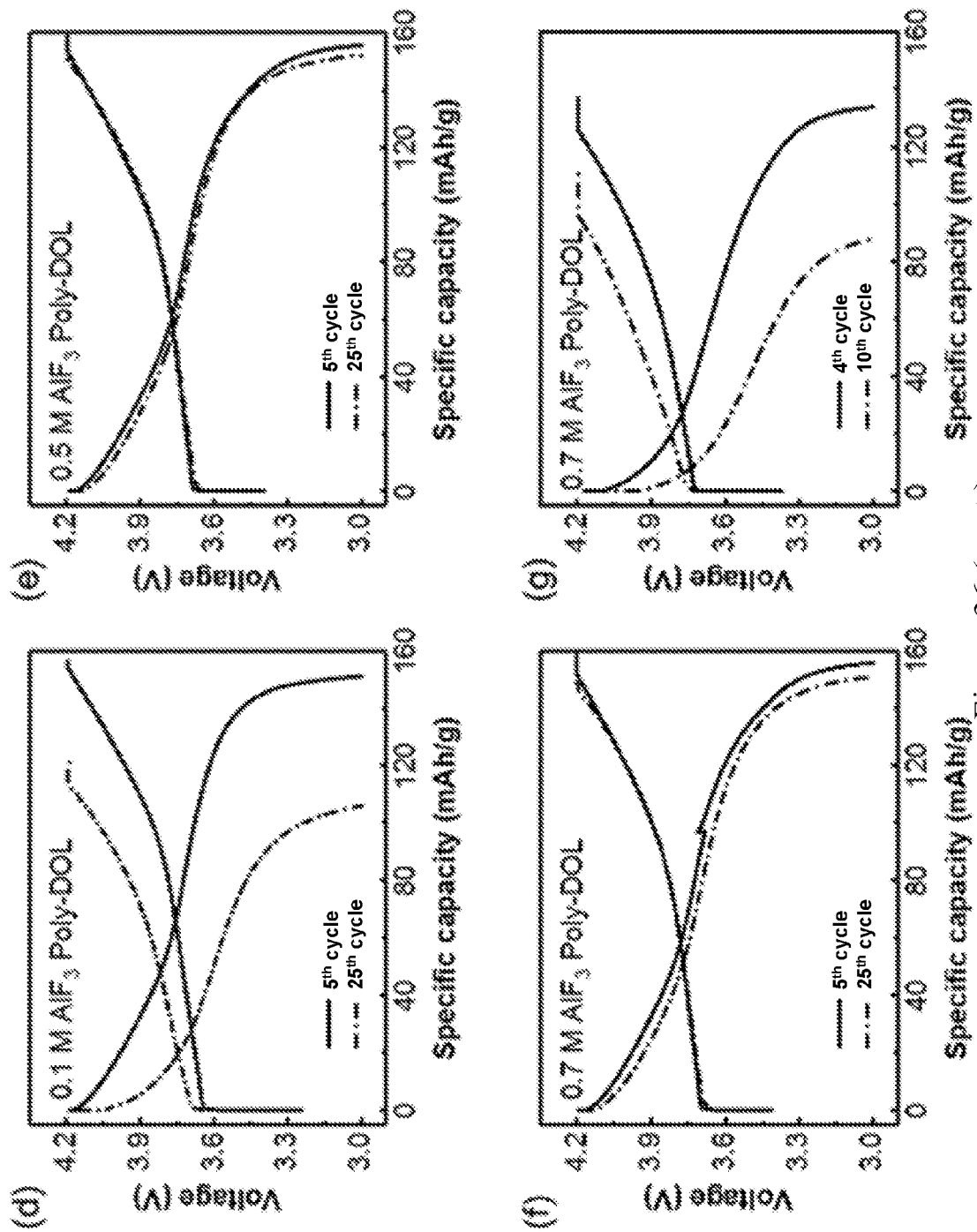
Figure 37:
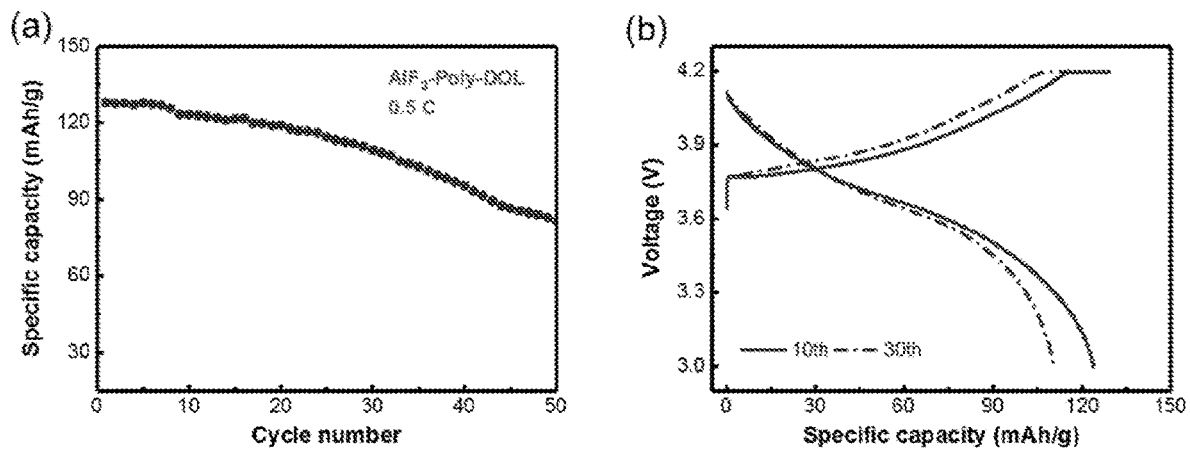
FIG. 37 shows (a) galvanostatic cycling performances and (b) corresponding charge/charge curves of NCM∥Li metal batteries cycling with 0.3 M $AlF_3$-Poly-DOL electrolyte at 0.5 C.
Figure 38:
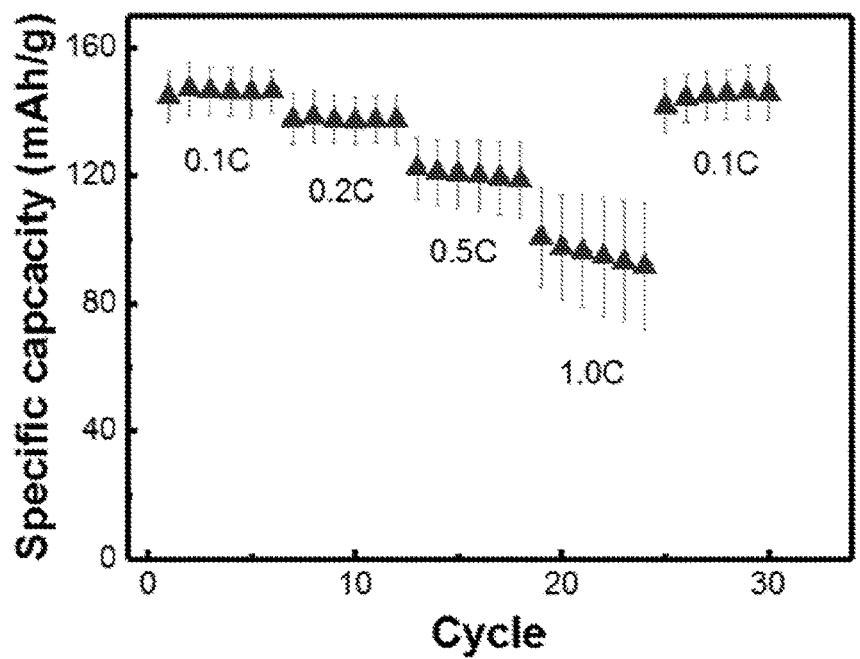
FIG. 38 shows discharge capacity of NCM∥Li metal batteries cycled at rates ranging from 0.1 C to 1 C in a 0.3

The cycling performance of the NCM622||poly-DOL|Li cells was compared with those of analogous batteries in which $AlF_3$ is present at various concentrations in the electrolytes. Defining the cycle life as the number of complete charge/discharge cycles that the batteries support before the capacity falls under 80% of its original capacity, results reported in FIG. 28b shows that the cycle life of the NCM||Li metal batteries exhibit a bell-shaped dependence on $AlF_3$ concentration. The results show that poly-DOL electrolytes containing 0.3 M $AlF_3$ produce the largest enhancement in cycle life, exhibiting specific capacity of 153 mAh/g and extended stability (FIG. 36). At elevated current density of 0.5 C, the NCM||Li metal battery remain over 80% capacity over 30 cycles (FIG. 37). The cells containing this electrolyte also exhibit favorable charge/discharge rate capabilities and good capacity recovery (FIG. 38). The average Coulombic efficiency of lithium metal anode is 92.9% under 1.0 mAh/cm² at current density of 1.0 mA/cm² for first ten cycles (FIG. 39).

Figure 29:
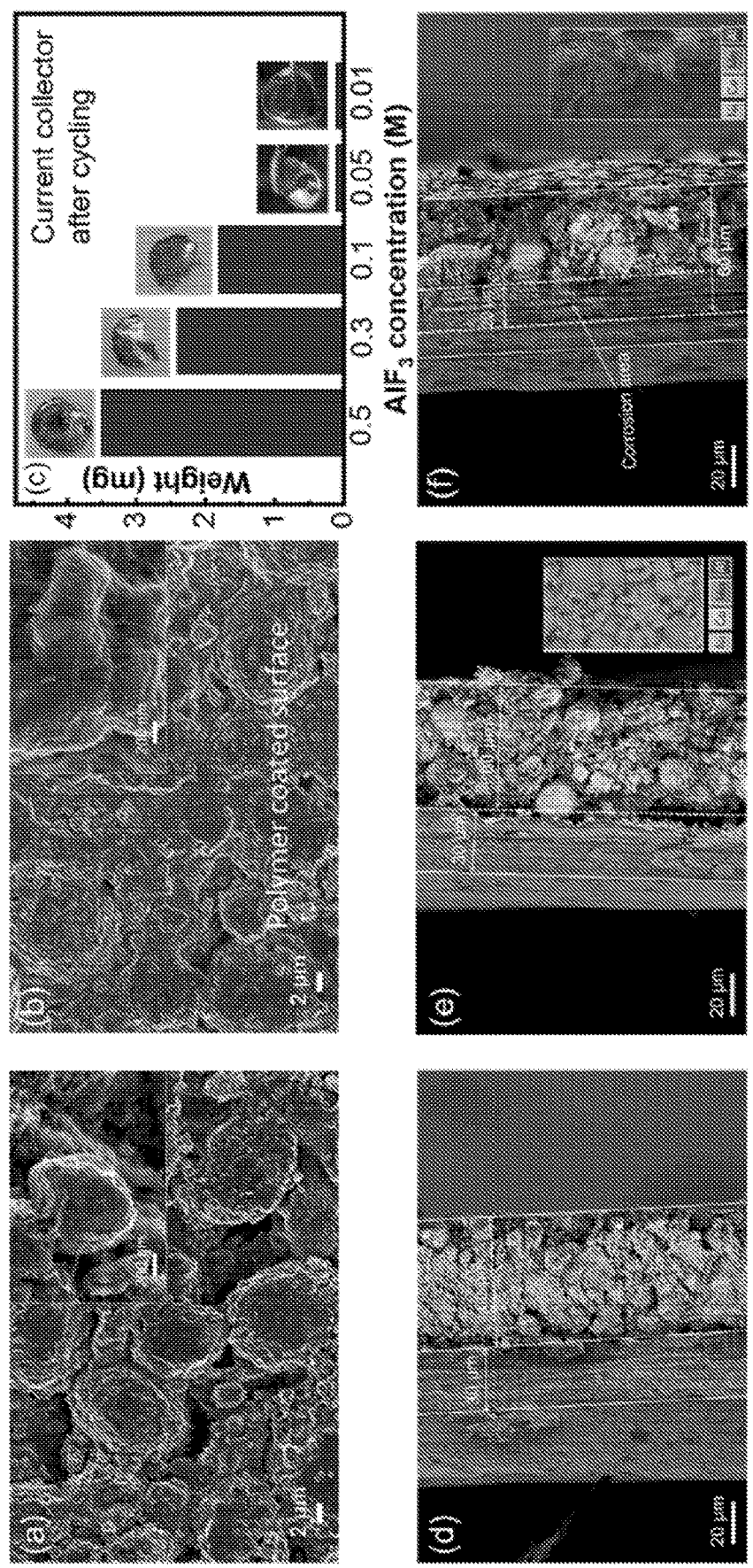
FIG. 29 shows morphologies of NCM cathode before and after cycling. (a-b) Scanning electron microscope (SEM) images of NCM cathode surface (a) before cycling and (b) after cycling in 0.3 M $AlF_3$-Poly-DOL electrolytes. Insert is the enlarged images of NCM particles. (c) Morphologies and the weight of cathode current collectors after continuous cycling in poly-DOL electrolyte with different $AlF_3$ concentrations. (d-f) Cross section view of NCM cathode (d) before cycling, (f) after cycling in $AlF_3$-Poly-DOL electrolytes, and (e) after cycling in routine Poly-DOL electrolytes. Insert is the energy-dispersive X-ray spectroscopy (EDS) mapping of Ni, Co, Mn, Al element for the NCM layer after cycling.

To understand the reasons for the improved cycling stability, a post-mortem investigation was carried out to study NCM cathode material's evolution before and after continuous cycling. Before cycling, the NCM active material together with conductive carbon and binder are uniformly coated on Al foil (FIG. 29a, d), the current collector. After cycling in the $AlF_3$-Poly-DOL electrolytes, the in-situ polymerization process evidently enables the polymer electrolytes to fill the pores of the NCM to form good cathode-electrolyte interphases on the active particles (FIG. 29b). Notably, the post-mortem investigations reveal that the Al current collector for the NCM cathode is severely corroded in some cases (low $AlF_3$ concentrations in the electrolyte), where the current collector disappears entirely after continuous cycling (FIG. 29c). The cross-section view illustrates the corrosion phenomenon most clearly. There is a clear boundary between the Al foil and NCM active layer for the pristine NCM cathode, indicating that the Al current collector has a thickness of approximately 30 µm and the high-loading NCM layer is 60-µm thick (FIG. 29d). After cycling, the current collector is in-tact, with little or no reduction in thickness for $AlF_3$-Poly-DOL electrolytes (FIG. 29e). In comparison, the current collector is obviously eroded in Poly-DOL electrolytes without $AlF_3$ (FIG. 29f, FIG. 40). The corrosion is itself complex. The thick NCM layer invades the Al current collector and the Al foil is dissolved leaving holes and scraps. Energy-dispersive X-ray spectroscopy (EDS) mapping of the electrode (FIG. 29f) reveals aluminum fragments accumulate on top of the NCM layer, indicating that the Al current collector is partially broken during cycling.

The dissolution potential of Al is complicated because the corrosion reaction is sluggish and involves lots of related reactions, such as TFSI anion decomposition and solvent oxidation. To identify the main Al corrosion reactions, Al||Li metal cells utilizing Al foil as the working electrode were created and their electrochemical behaviors were investigated in detail. Liquid electrolytes composed of mixtures of ethylene carbonate/dimethyl carbonate (EC/DMC) solvents were used in these experiments to remove contributions from ether electrolyte decomposition at elevated voltages. Results from electrochemical floating experiments (FIG. 41) reveal an increased leakage current at approximately 4.3 V vs. Li metal, suggesting that a severe reaction occurs at around 4.3 V. Linear sweep voltammetry (LSV) analysis of the Al∥Li cells at a low scan rate of 0.02 mV/s reveals a peak between 4.0 V and 4.4 V, before an exponential increase is apparent (FIG. 42*a, b*). As carbonate-based electrolytes are known to be stable in this voltage range, it is speculated that the current peak is related to the oxidation reactions on aluminum working electrodes, which is consistent with reported results. This perspective is supported by results from the analogous experiments using $AlF_3$-Poly-DOL electrolytes, where the leakage current around the oxidation peak is fairly limited (FIG. 42*c, d*).

Figure 31:
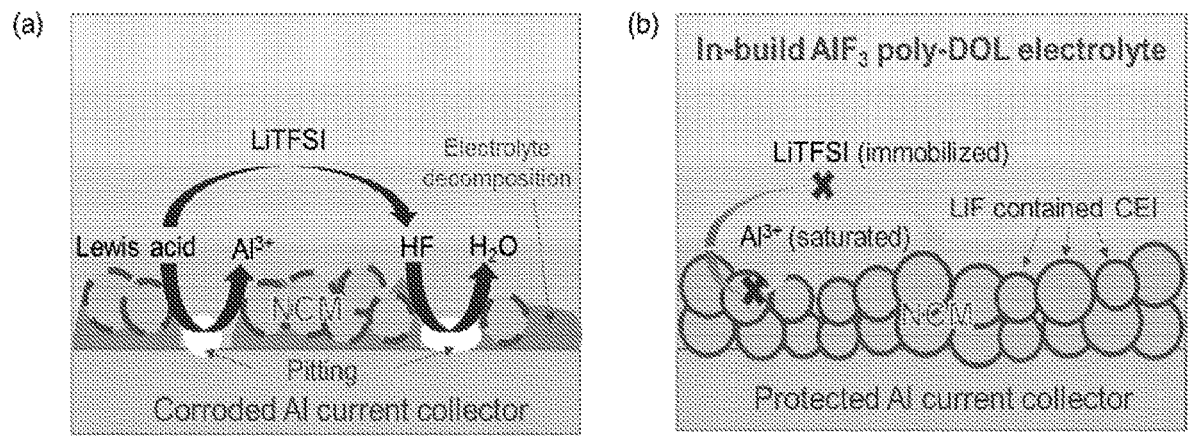
FIG. 31 shows a schematic diagram of current collector corrosion in (a) routine electrolytes and (b) $AlF_3$-Poly-DOL electrolytes.
Figure 32:
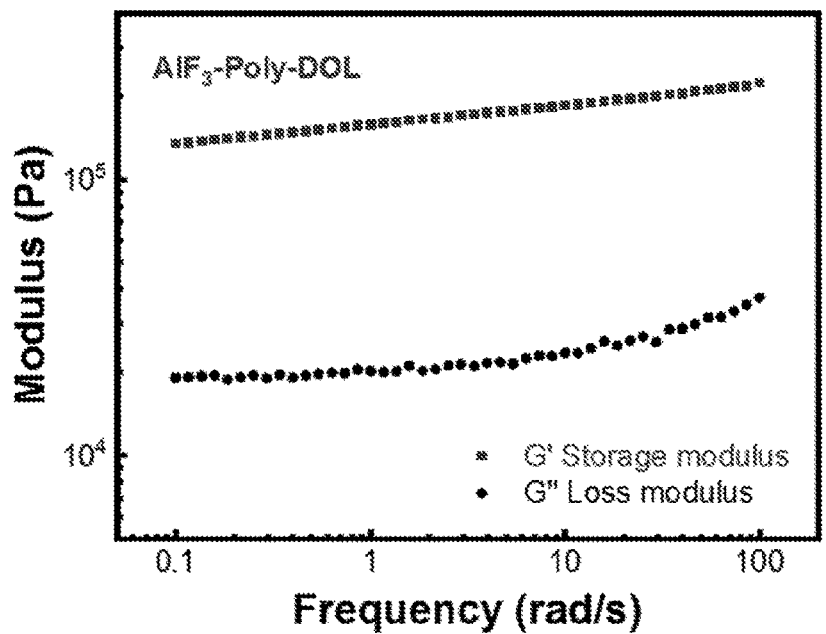
FIG. 32 shows frequency sweep rheology measurements for $AlF_3$-Poly-DOL electrolyte.

To understand the role of $AlF_3$, current-voltage (CV) experiments were performed (FIG. 43) on the Al∥Li cells within a similar voltage range as for the NCM∥Li metal batteries to imitate the electrochemical environment experienced by the Al current collector during cycling of these cells. The concentration of lithium salts is kept constant to facilitate systematic comparisons. It is believed that the Al electrode is passivated during the first scan, and in the following scan Al is continuously oxidized and dissolved in the electrolyte. Batteries utilizing the liquid DOL electrolytes show the most severe evidence of degradation reactions (FIG. 43*a*). Polymerization of the DOL reduces the parasitic reactions and improve electrochemical stability (FIG. 43*b*). Further, adding $AlF_3$ to the Poly-DOL electrolytes visibly decrease the degradation currents (FIG. 43*c*). Since the ionic conductivities of the electrolytes are of the same order of magnitude, the much-reduced leakage current is thought to be the result of a passivation layer formed on the aluminum foil. It was hypothesized that multiple reactions are likely responsible for the Al corrosion (FIG. 31). In particular, the Lewis acids present in the electrolytes generate protons from slow electrochemical oxidation at the cathodes, which are believed to be responsible for breaking down the $Al_2O_3$ layer on Al foil to produce soluble $Al^{3+}$ species. The protons can also react with LiTFSI salt in electrolytes to generate HF, which may further etch the Al current collector. Introducing $AlF_3$ additives in poly-DOL electrolytes is thought to create a solution saturated with $Al^+$ and immobilize TFSI–, which would inhibit $Al_2O_3$ dissolution.

The components of cathode-electrolyte interphases (CEI) are now understood to be crucial in stabilizing the cycling performances of nickel-rich, high-voltage cathodes such as NCM. X-ray photoelectron microscopy (XPS) analysis and EDS were used to probe the chemical features of NCM surface. The C 1s spectra (FIG. 30*a, e*) indicate that common carbonaceous species, such as C—C, C—O and C—F from conductive carbon or the polyvinylidene fluoride (PVDF) binder, are present on both electrodes. There is a unique protuberance of O—C=O peak on NCM cathodes cycled in the neat (no $AlF_3$) Poly-DOL electrolytes, which can be related to poly-DOL high-voltage decomposition in the absence of $AlF_3$. The aluminum peaks in FIG. 30*c* indicate the peeling of the Al foil due to Al corrosion after cycling in the neat Poly-DOL, which is barely detected on cathodes cycled in $AlF_3$-Poly-DOL electrolytes (FIG. 30*g*) and consistent with results from the EDS mapping reported in FIG. 29. Moreover, due to the limited detection depth of XPS surface analysis, the identification of obvious Ni peaks suggests the exposure of active NCM material, while the NCM particles are tightly coated by polymer layer contacting $AlF_3$-Poly-DOL electrolytes (FIG. 30*d, h*).

Figure 30:
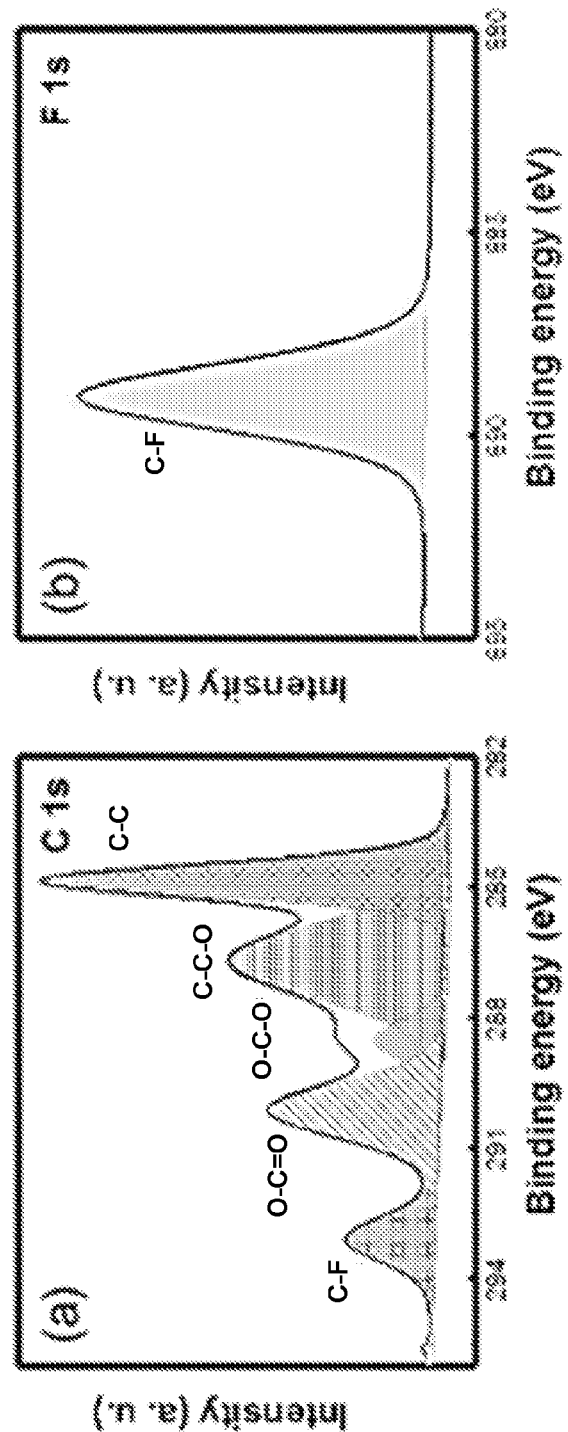
FIG. 30 shows surface analysis of NCM cathode after cycling. XPS spectra of NCM cathode after cycling in (a-d) routine Poly-DOL electrolyte and (e-h) $AlF_3$-Poly-DOL electrolyte.
Figure 30:
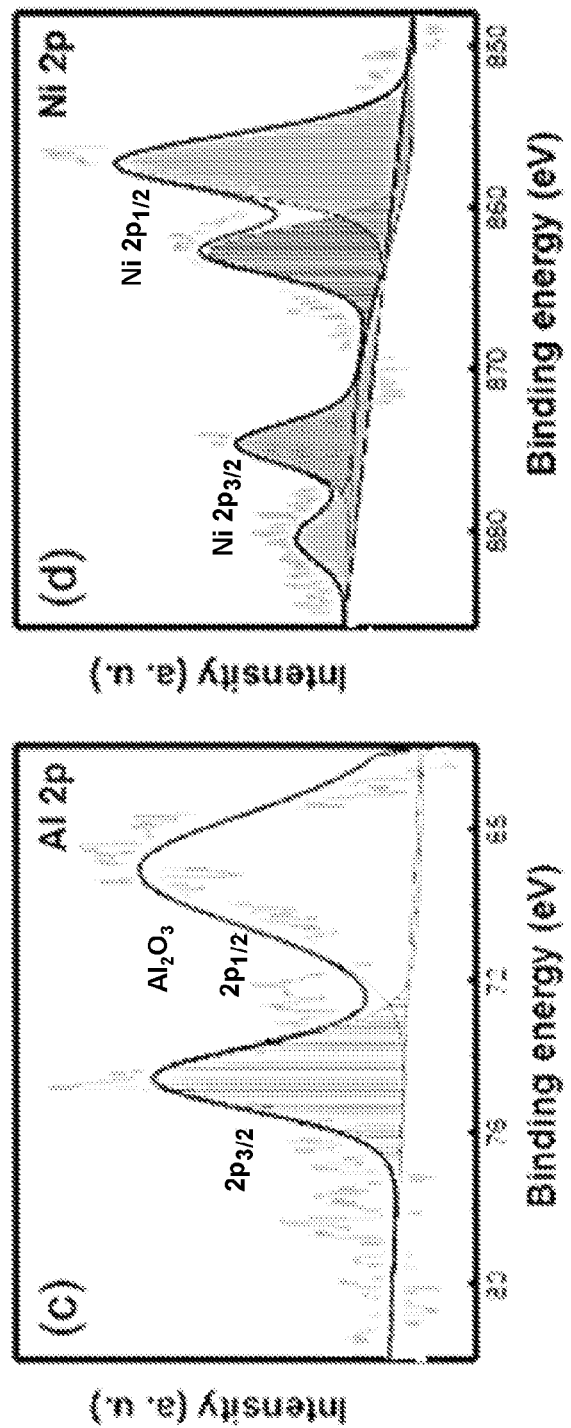
Figure 30:
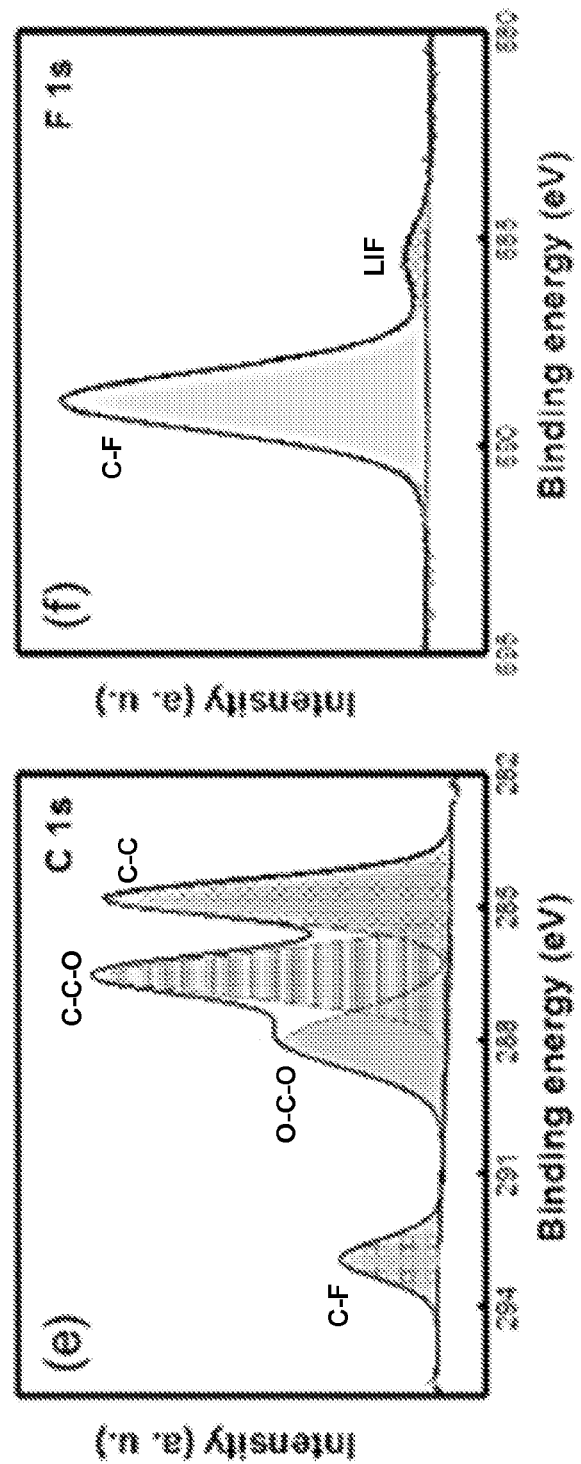
Figure 30:
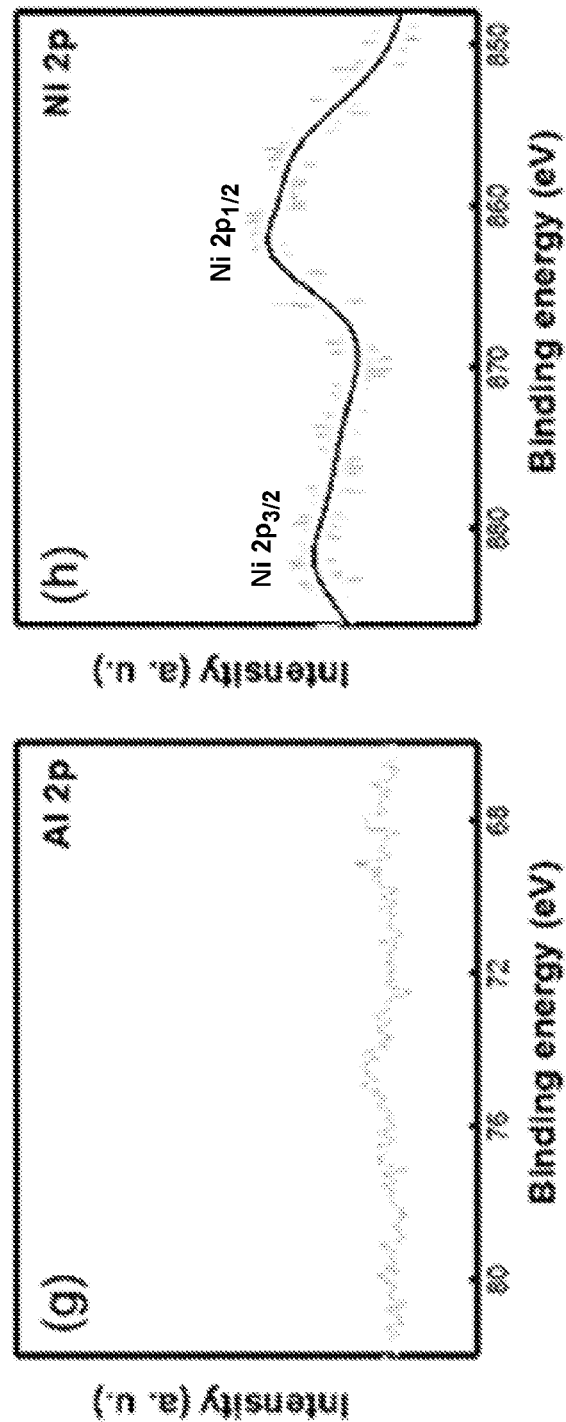

Analysis of the F 1s spectra indicates additional $AlF_3$ contributes to the generation of LiF in the CEI layer (FIG. 30*b, f*). EDS results confirm the introduction of fluoride on NCM cathode after cycling in $AlF_3$-Poly-DOL electrolytes (FIG. 44, Table 3). Lithium fluoride is known for its ability to protect Li metal anodes and its presence at interphases formed in solvent-in-salt type electrolytes has been speculated to enhance oxidative stability of electrolyte solvents. To explore these effects in greater detail, LiF salts were directly introduced as additives in the DOL precursor and polymerized in situ in the NCM622∥Li cells. The galvanostatic cycling properties of these cells are reported in FIG. 45. The results show that an extended cycle life is achieved, demonstrating that directly adding LiF can enhance cycling stability. However, a sudden capacity drop after 30 cycles is still observed probably due to the current collector corrosion or an in-complete protective layer formed by the LiF salt additive.

Although $AlF_3$ particles in poly-DOL electrolytes are beneficial for current collector protection and CEI construction, excess amount of $AlF_3$ results in decreased ionic conductivity (FIG. 46, Table 2) and significantly increased impedance both before and after cycling (FIG. 47), as $AlF_3$ itself exhibits a wide band gap (>10 eV) and is almost an ionic insulator. Consequently, there is a trade-off between cathode protection and ion transportation ability. The cycle life of the NCM622|$AlF_3$-Poly-DOL|Li solid-state batteries are nonetheless not yet at levels required for practical implementation. The gradual capacity fading observed in FIG. 28*a*, particularly after cycle 50, is attributed not only necessarily to the $AlF_3$-Poly-DOL electrolyte, but to other failure modes, including cathode phase transition, increased internal resistances, or Li metal consumption. Among these, the failure modes of changes in NCM structure have been reported previously as a prominent phenomenon after charge-discharge cycling at potentials in the range used in the study. XRD was used to analyze lattice distortion of $LiNi_{0.6}Co_{0.2}Mn_{0.2}O_2$ (FIG. 48). The presence of extra nickel ions in Li inter-slab space, primarily owing to the similar radius of $Ni^{2+}$ (0.69 Å) and $Li^+$ (0.76 Å), makes it difficult for lithium ions to intercalate into the structure during cell discharge. This cation disorder leads to changes in c/a axis and layered structure, which is verified through the decreased intensity ratio of plane (003) (104) and the split of plane (108) (110) in XRD spectra. Although $I_{(003)}/I_{(104)}$ for the NCM cathodes is lowered for both electrolytes (FIG. 48*b*), the introduction of $AlF_3$ inhibits the cation disorder. $Al^+$ in the transition layer increases c axis parameter and reduce a axis parameter, due to the shortened α-axis but extended c-axis parameters of α-$LiAlO_2$ compared with $LiNiO_2$, thus contributes to stabilizing the crystal structure. However, the position separation of (110) and (018) plane after cycling indicates the distortion of layered structure (FIG. 48*c*), which is also responsible for the capacity decay.

The finding that $AlF_3$ electrolyte salt additives improves cycling of NCM cathodes in poly-DOL electrolytes can be extended to other electrolyte systems for enhanced stability and compatibility with high-voltage cathodes. Results reported in FIG. 49 show that addition of $AlF_3$ to carbonate electrolytes prevents the sudden capacity fade (in this case at cycle 55) typically observed. An even more obvious benefit of $AlF_3$ is apparent in FIG. 50, where it is used as an additive in solid-state secondary batteries composed of poly(ethylene oxide) (PEO) electrolytes. PEO-based electrolytes are known for their extremely poor oxidative stability and cannot be cycled in an electrolyte without $AlF_3$.

These results show that $AlF_3$ improves the electrochemical stability of PEO, to at least 4.3 V, and facilitates cycling of NCM cathodes.

It is proposed that an in situ formed solid-state polymer electrolyte using ether-based liquid precursors and Lewis acid salts that initiate ring-opening polymerization. The addition of $AlF_3$ to the electrolytes is shown to enhance their anodic stability. The in-built solid ionic conductors are compatible with high-loading NCM cathodes, and the principal role of the $AlF_3$ salt is demonstrated to be in passivating the current collector surface under high-voltage conditions, where Al foil dissolution reaction is suppressed. $AlF_3$ also contributes other beneficial effects, including creation of high-quality CEI layer, resulting in extended cycle life of NCM||Li metal batteries in poly-DOL, carbonates and PEO-based electrolytes.

Experimental Section. Electrolyte preparation: The $AlF_3$-Poly-DOL electrolyte mentioned in this paper represents 0.3 M $AlF_3$-Poly-DOL electrolytes with 0.5 mM $Al(OTf)_3$ and 2 M LiTFSI unless otherwise specified. $AlF_3$ is partially soluble in DOL electrolyte; undissolved $AlF_3$ particles are clearly observed in the dispersion at concentrations higher than 0.1 M. Electrolytes used in the study were prepared in an argon-filled glove box. $AlF_3$ (Alfa Aesar), LiTFSI (Alfa Aesar; TCI America), and $Al(OTf)_3$ (Alfa Aesar) were used without further purification. DOL (Sigma-Aldrich) was treated for at least one day with fresh Li metal to remove any traces of water remaining in the electrolytes. Polymerization was conducted by preparing 5 mM $Al(OTf)_3$ DOL solution firstly, then diluting the solution to 0.5 mM $Al(OTf)_3$ DOL with the DOL-LiTFSI-$AlF_3$ electrolyte. The DOL-LiTFSI-$AlF_3$ diluent was prepared by adding $AlF_3$ and 2 M LiTFSI salt to DOL solution successively. For free-standing PEO electrolytes, PEO 600K (Sigma Aldrich) was employed. Halloysite nanoclay (HNC, Sigma Aldrich), $AlF_3$ (Alfa Aesar), LiTFSI (Alfa Aesar; TCI America) and $LiNO_3$ (Sigma Aldrich) were used to improve mechanical properties and suppress PEO crystallinity. The EO/LiTFSI mole ratio is maintained at 10. The mass ratios of $LiNO_3$ and $AlF_3$ are both 10%. PEO, HNC, $AlF_3$, LiTFSI and $LiNO_3$ are mixed in acetonitrile (Sigma Aldrich) to form a homogeneous slurry. The slurry was casted into a polytetrafluoroethylene (PTFE) mold.

Battery assembly and test: Batteries were assembled in an argon glove box. The NCM cathodes were commercial and with areal capacity loading of 3.0 $mAh/cm^2$. Both punched NCM cathodes and Li metal anodes were stored in the glove box. Coin 2032-type cells were used. The cells were assembled by adding 5 mM $Al(OTf)_3$ DOL to cathode side firstly, then DOL-LiTFSI-$AlF_3$ diluent electrolytes to obtain a poly-DOL electrolyte with 0.5 mM $Al(OTf)_3$, 2 M LiTFSI and $AlF_3$ particles. DOL-LiTFSI-$AlF_3$ electrolytes were added on both sides of Celgard 3501 separator for a uniform $AlF_3$ dispersion. The DOL-LiTFSI-$AlF_3$ electrolytes are mixed well before battery assembly. The Celgard separator was used to avoid short circuit in the liquid state. All the batteries with poly-DOL electrolytes were tested after polymerization process. Galvanostatic discharge/charge tests were performed using a Neware battery tester at room temperature. NCM batteries with poly-DOL electrolytes are charge-discharged within 3.0 V-4.2 V at 0.1 C. NCM||Li metal batteries utilizing EC/DMC electrolytes are assembled with/without 0.1 M $AlF_3$ in 2 M LiTFSI EC/DMC (v/v 1:1) electrolytes. The added $AlF_3$ is also practically dissoluble in EC/DMC electrolytes. Electrolytes were also added on both sides of Celgard 3501 separator for a uniform $AlF_3$ dispersion. NCM batteries with EC/DMC electrolytes are charge-discharged within 3.0 V-4.2 V at 0.2 C, where the first formation cycle is operated at 0.1 C. Batteries with PEO electrolytes were assembled with free-standing PEO electrolytes and no other separators are employed. The cathode utilized for PEO-based electrolytes is $LiNi_{1/3}Co_{1/3}Mn_{1/3}O_2$ (NCM111), and the active material loading is around 2-3 $mg/cm^2$. Assembled batteries were pre-treated at 80° C. overnight and tested at 60° C. NCM batteries with PEO electrolytes are charge-discharged within 3.0 V-4.2 V at 0.1 C. The Coulombic efficiency (CE) of Li metal anodes is measured in Li||Cu cells. Firstly, a certain amount of lithium (5.0 $mAh/cm^2$) is plated and stripped as a stabilization process to form a passivation layer on electrodes. Then, a given amount of lithium ($Q_T$, 5.0 $mAh/cm^2$, 1.0 $mA/cm^2$) is firstly deposited on Cu substrate as Li reservoir. Afterwards, a smaller amount of this charge ($Q_C$, 1.0 $mAh/cm^2$, 1.0 $mA/cm^2$) is plated and stripped for n (n=10) cycles. Finally, the remaining Li reservoir ($Q_S$) are stripped until the cut-off voltage of 1.0 V. The average CE is calculated based on $$CE_{avg} = \frac{nQ_C + Q_S}{nQ_C + Q_T}$$

A CH 600E electrochemical workstation was used for the cyclic voltammetry measurements. The electrochemical floating experiments were conducted in NCM||Li metal cells, which were charged to 4.2 V first, then held at progressively higher voltages, each for a period of 10 h (h=hour(s)).

Material characterizations: Oscillatory shear rheology was conducted with a strain-controlled ARES-LS rheometer (Rheometric Scientific) outfitted with cone and plate geometry (4° cone angle, 10 mm diameter) for monitoring the polymerization reaction. DSC test was performed utilizing Q1000 Modulated Differential Scanning Calorimeter (TA Instruments). GPC measurements were conducted by first dissolving the synthesized poly-DOL electrolytes in tetrahydrofuran (THF), then eluting it in a Waters ambient temperature GPC. Polystyrene standards were used for the calibration. For NMR analysis, the electrolytes are dissolved in dimethyl sulfoxide-$d_6$. SEM images were obtained by Gemini 500 Field-emission Scanning Electron Microscope equipped with energy dispersive spectroscopy. XRD tests were conducted by Bruker D8 Discover Powder Diffractometer using Cu K-α radiation with a wavelength of approximately λ=1.54 Å.

TABLE 2

Fitting parameters of conductivity of the electrolytes versus temperature.

| | Arrhenius $\sigma = A \exp(-E_a/RT)$ | | VFT $\sigma = A' \exp(-B/R(T-T_o))$ | | |
|---|---|---|---|---|---|
| | A (for σ in mS/cm) | $E_a$ (kJ/mol) | A' | B (kJ/mol) | $T_o$ (K) |
| $AlF_3$ Poly-DOL (0.3M) | 178 | 11.4 | 36.9 | 4.58 | 117 |
| $AlF_3$ Poly-DOL (1.0M) | 3192 | 20.7 | 466 | 11.7 | 80.1 |

TABLE 3

Atomic ratio of different elements on NCM surface before and after cycling obtained by EDS analysis.

| NCM surface | Atomic (%) | | | | | | | |
|---|---|---|---|---|---|---|---|---|
| | C | O | F | Al | S | Mn | Co | Ni |
| Before cycling | 34.90 | 43.99 | / | 0.29 | / | 4.14 | 4.04 | 12.65 |
| After cycling in AlF$_3$ Poly-DOL | 40.26 | 35.12 | 3.40 | 0.15 | 0.28 | 4.15 | 4.03 | 12.62 |

TABLE 4

The molecular weights and dispersity of the polymer electrolyte with different AlF$_3$ concentrations.

| AlF$_3$ concentration | Mw (Dalton) | Dispersity |
|---|---|---|
| 0.05M | 27k | 2.17 |
| 0.3M | 18k | 1.59 |
| 1.0M | 17k | 2.05 |

The molecular weight of Poly-DOL electrolyte without AlF$_3$ is 37 kDa with dispersity of 2.51.
Reference: *Nat. Energy* 2019, 4, 365-373.

Example 3

The present example describes the transport, thermal properties, and stability of solid-state polymer electrolytes (SPEs) created by in-situ polymerization of DOL/ethylene carbonate (EC) mixtures using PF$_5$ as a Lewis acid initiator.

It was shown that by adjusting the concentration of EC, it is possible to create electrolytes with exceptional oxidative stability and with consistencies ranging from solid-like to gel-like. Significantly, the PF$_5$ initiator is obtained through spontaneous decomposition of LiPF$_6$, a readily-available battery salt. Here it is reported that while polymerization of pure DOL occurs rapidly and inhomogeneously over a broad range (0.1 M to 1 M) of LiPF$_6$/PF$_5$ concentrations, introduction of EC homogenizes the formed SPE and yields greater control of its distribution in an electrochemical cell. A key finding is that the thermodynamic and transport properties of the EC/DOL/LiPF$_6$ electrolyte exhibit a discontinuity at DOL concentrations between 30-50 vol %. This critical transition is attributed to an onset of entanglements between poly-DOL chains. Electrolytes bracketing the transition exhibit consistencies ranging from liquid-like solutions (≤30% DOL) with high ionic room-temperature conductivity to highly viscous gels (>30% DOL) with increased electrochemical stability and good conductivity.

Ethylene carbonate possesses attractive electrochemical and thermodynamic properties that make it an excellent complement for DOL in a poly-DOL-based electrolyte. Firstly, EC is a low volatility solvent with both a high boiling point (243-244° C.) and high melting point (34-37° C.). In contrast, DOL is a high volatility solvent with a relatively low boiling point (75-76° C.) and an extremely low melting point (<−90° C.). It is hypothesized that even prior to polymerization of DOL, strong molecular interactions with EC in a DOL/EC mixed electrolyte would lower the overall vapor pressure and melting temperature of the electrolyte, facilitating liquid-state properties over a wider temperature range than possible with the constituents as stand-alone materials. Secondly, EC is known to form good cathode electrolyte interphases. EC and its fluorinated analog (FEC) have as a result, emerged as key ingredient in electrolyte formulations designed for preserving high levels of reversibility in lithium ion batteries that utilize state-of-the art cathodes, including LiNi$_{0.8}$Co$_{0.1}$Mn$_{0.1}$O$_2$ (NCM-811). Finally, EC has an exceptionally high dielectric constant and an oxidation potential exceeding 5 V, while DOL is known to oxidize at roughly 4.3 V. In short, EC was chosen because it offers a hedge against multiple weaknesses of DOL. This makes it a good complement for DOL, which has been reported to form a good anodic interface with metallic lithium. Thus, the combinations of properties achieved in an EC/DOL mixed electrolyte is promising for creating lithium batteries with high anode reversibility and enhanced safety. Ultimately, the EC/DOL/LiPF$_6$ system is of interest due to its distinctive physicochemical properties at different EC/DOL ratios, where different combinations of EC, DOL monomer and DOL polymer can exist in equilibrium. This example is motivated, further, by the hypothesis that polymerization of the DOL would allow one to achieve unique combinations of electrochemical stability, thermal stability, ionic conductivity, and viscoelastic liquid properties that would enable poly-DOL-based electrolytes to be optimized by exploring compositions that optimize these different physiochemical characteristics.

First considered was the simple case of an electrolyte composed of pure DOL and LiPF$_6$. Upon addition of LiPF$_6$ to DOL, a qualitatively large heat of dissolution is observed. The polymerization is rapid and inhomogeneous; a product identified to be poly-DOL immediately forms at the interface between LiPF$_6$ and DOL, which creates a resistance to initiator diffusion between the salt and unpolymerized DOL. Thus, the salt cannot dissolve completely, and the entire solution polymerizes only after one to two days. The polymerization was analytically confirmed by Fourier-transform infrared spectroscopy (FTIR), nuclear magnetic resonance (NMR), and gel permeation chromatography (GPC). Results obtained from these techniques were found to be consistent with what has been reported in the literature, with an observed shift in the carbon and hydrogen NMR peaks and the appearance of additional carbon-hydrogen FTIR stretches (see FIG. 51B and FIGS. 55-63).

Poly-DOL formed in this manner is a soft, white, and opaque solid, indicating a high percent crystallinity. This is also consistent with what has been reported in the literature. The polymer is found to decompose at around 60° C., as indicated by an irreversible endothermic peak obtained via differential scanning calorimetry (DSC, see FIG. 52). This degradation is also confirmed by FTIR, where multiple carbon-hydrogen peaks appear after decomposition (see FIG. 58). Poly-DOL formed by LiPF$_6$ shows differences compared to the analogous material produced via other initiators such as LiAsF$_6$ or Al(OTf)$_3$. For example, in previous studies, 2.5 M LiAsF$_6$ with trace amounts of dichlorodicyano benzoquinone in DOL formed an optically clear, rubbery material, indicative of low levels or even no crystallinity. The molecular weights revealed by GPC (<100 kDa) are nonetheless consistent with poly-DOL formed using other salts to initiate polymerization DOL.

Although it is accepted that DOL polymerization by a Lewis-acid initiator proceeds via a cationic ring-opening mechanism, the details remain uncertain with regards to initiation by PF$_5$. The polymerization mechanism depicted in FIG. 51A was constructed by analogy to mechanisms reported for DOL polymerization via other Lewis acid initiators, such as Al(OTf)$_3$ and SbF$_6^-$. An alternative mechanism proposed by Liu, et al. suggests that PF$_5$ and H$_2$O combine to form H$^+$(PF$_5$OH)$^-$. This new chemical species then functions as the Lewis acid, binding to the oxygen in DOL in a manner analogous to FIG. 51A. The growing chain then propagates via an $S_N1$ mechanism with a primary carbocation, unlike the $S_N2$ mechanism shown here. Alternatively, others have discussed a mechanism in which polymerization of tetrahydrofuran (THF) is initiated by $PF_5$. In their mechanism chain propagation proceeds from both ends, with the chain end group being F instead of $PF_5^-$. This is accomplished by a multi-step process wherein fluorine leaves the chain end to form $PF_6^-$, resulting in a $PF_4$ end group, which is followed by the removal of $F_3PO$, resulting in a F end group.

It is also understood that DOL polymerization is an equilibrium process, where equilibrium concentrations of monomer, cyclic oligomers, and polymer co-exist at a given temperature. The equilibrium constant then sets the apparent rates of polymerization and depolymerization. The presence of cyclic oligomers in equilibrium with polymerized DOL has been confirmed by NMR spectroscopy. The concentration of cyclic oligomers is found however to be independent of the initial monomer concentration; thus, for poly-DOL to form, the concentration of DOL must exceed a threshold value, typically on the order of 1-10% DOL by volume. The monomer equilibrium concentration also increases with temperature, terminating at the ceiling temperature, beyond which polymerization is impossible. The parameters that govern these relationships are highly dependent on reaction medium.

Next, we consider polymerization of DOL in the $EC/DOL/LiPF_6$ mixtures of interest in the present example. EC and DOL were first mixed at varying volume ratios (vol % DOL=0, 5, 10, 20, 30, 50, 70). Before the addition of $LiPF_6$, samples with vol % DOL ranging from 5 to 30 displayed two-phase solid-liquid behavior. Beyond 30% DOL, the mixture is visually homogenous. Our observations are characteristic of a binary mixture. Upon the addition of 1 M $LiPF_6$, this simple binary mixture behavior disappears. All samples are colorless liquids, indicating that the melting-point of EC is depressed by the combination of $LiPF_6$ and DOL. The clear mixture slowly polymerizes, as confirmed by differential scanning calorimetry (DSC) and FTIR. The resultant electrolytes were left to rest for at least 5 days to allow the polymerization to come to equilibrium. For DOL concentrations above 70%, the polymerization reaction is faster, inhomogeneous and difficult to control. This produced large run-to-run variations in the physical and electrochemical properties of the resultant electrolytes. The present example therefore focuses on electrolytes containing a maximum of 70% DOL.

Dynamic shear rheological measurements revealed that electrolytes with DOL fractions ranging from 0% to 30% exhibit viscosities similar to that of pure DOL (see FIG. 53A). In contrast, electrolytes with DOL contents above 30% exhibited notably viscous and gel-like behaviors. The increase in viscosity indicates that $LiPF_6$ is either polymerizing the DOL, or creating some sort of ionic aggregate structure. The ionic aggregate hypothesis was discounted due to the emergence of additional carbon-hydrogen peaks in the FTIR spectrum (FIGS. 55-59 and 61). Additionally, comparison of the polymer molecular weight (82,000 Da, FIG. 51C) deduced from GPC with the entanglement $M_w$ of poly-DOL ~1,200 Da (calculated using the Fetters length packing model) indicates that the network is highly entangled at high concentrations of DOL.

The thermodynamic behavior of the $EC/DOL/LiPF_6$ electrolyte system was explored across temperatures and DOL fractions using DSC. Because thermodynamic stability is critical to the development of a good electrolyte, DSC thermograms provide important insights about phase changes and/or glass transitions. By compiling these thermograms, a crude phase diagram (see FIG. 52) was obtained. A critical transition occurs at 30% DOL volume fraction, where the appearance of a glass transition along with the disappearance of a well-defined solid-liquid transition was observed.

Below this transition, in the low DOL fraction regime (<30% DOL), two overlapping endothermic peaks appear slightly below room temperature, signifying a melting transition. These two overlapping peaks cannot be separated, even at low scan rates (0.2° C./min). This phenomenon is not completely understood in the literature; previous works have attributed it to an existence of two distinct crystalline phases, while others contend that it is the result of a constant melting-recrystallization-melting process.

In the high DOL fraction regime (>30% DOL), the two-peak melting behavior is replaced by an exothermic cold-crystallization peak followed by an endothermic melting peak, a feature that is commonly found among various polymers. These DSC profiles also mean that, in the high DOL fraction regime, the polymer solution does not crystallize when cooled, resulting in a wider temperature range compared to the low DOL-fraction electrolytes. It is likely that the long polymer chains present in these higher DOL fractions inhibit crystallizing of EC, a highly attractive feature in an electrolyte. Glass transitions are also present for these fractions, increasing in temperature with increasing DOL concentration.

For electrolytes composed of pure poly-DOL DSC analysis reveals an irreversible endothermic peak-that is, a corresponding exothermic peak is not found upon cooling. This observation is tentatively attributed either to the degradation of the polymer or the evaporation of DOL monomer generated through the equilibrium polymerization/depolymerization process discussed earlier. Careful inspection of the material shows that it changes color (from opaque to translucent) at the transition and FTIR analysis of the sample before and after the transition support the polymer degradation hypothesis (see FIG. 58).

In FIG. 53, the kinetic and transport properties of $EC/DOL/LiPF_6$ electrolytes were analyzed at selected concentrations that are representative of the two regimes. Viscosity (f) vs. shear rate (7) data were obtained, along with oscillatory-shear measurements for a similar range of DOL fractions (FIG. 53A). Note that while an increase in DOL monomer fraction from 10% to 30% roughly doubles the viscosity, an equivalent percent increase from 30% to 50% DOL causes viscosity to increase by almost 100 times. Beyond this point, another equivalent percent increase from 50% to 70% DOL only increases the viscosity by about 4 times. This indicates that either a large increase in $M_w$, a large increase in the polymer concentration, or some combination of the two is responsible for the viscosity jump. Furthermore, because the electrolytes are polymer solutions, also expected is some sort of shear-thinning behavior at higher rates. The results in FIG. 53A confirm this for the high DOL fraction electrolytes, where the electrolytes' viscosities are observed to become increasingly more dependent on shear rate. Additionally, high DOL fraction electrolytes are much more shear-thinning than low DOL fraction electrolytes (see FIG. 53B and FIG. 60). Also noted is that irrespective of the DOL content, the electrolytes exhibit liquid-like behavior, with G">>G' always.

Ionic conductivity of the electrolytes was obtained using electrochemical impedance spectroscopy (EIS, FIG. 53D). At low DOL concentrations, the electrolytes manifest excellent conductivity (>1 mS/cm at 25° C.) and their temperature dependence is Arrhenius and changes discontinuously at a critical temperature. The decrease correlates positively with the onset of crystallinity evident from the DSC measurements. On the other hand, in the high-DOL concentration regime, the electrolytes display uniform Vogel-Fulcher-Tammann-type (VFT) ion transport behavior and there is no change of slope. This behavior is again consistent with the absence of a crystallization process in these materials as evidenced by DSC.

Although the room-temperature ionic conductivity of the $EC/DOL/LiPF_6$ electrolytes peaks at 10% DOL, the conductivities for 50%, and 70% DOL are still quite high. This behavior is consistent with expectations for an entirely amorphous polymer (see FIG. 52), underscoring the important role EC plays in the electrolytes. The use of a VFT fit is thus well-justified, indicating that the polymer chains play a greater role in the ion transport properties of the electrolyte. Because VFT fits are observed with respect to a glass transition by definition, this model for DOL fractions below 30% was not used because they do not exhibit a glass transition.

Although it was observed that conductivity generally decreases monotonically with increasing DOL fraction, this is the opposite trend observed in a similar electrolyte studied by Gofer et al. where DOL/EC solutions were polymerized using 1.5 M $LiAsF_6$, where conductivity peaked at a relatively high DOL volume fraction of 75%. It is expected this deviation must be attributed to the difference in concentration and chemical species present within the electrolyte.

In FIG. 53C, within the low DOL regime, the electrolyte exhibits sub-ionic conductivity. That is, for a given viscosity, the electrolyte is less conductive than an ideal electrolyte (dilute, fully dissociating) of the same viscosity (represented by the dashed line). The opposite behavior is observed in the high DOL regime, where the electrolyte exhibits superionic conductivity. It has been observed that the transition from sub-ionic to superionic conductivity occurs when a polymer has reached its entangled molecular weight. Analogously, if it is hypothesized that the critical transition from the low DOL regime to the high DOL regime occurs at the transition from sub-ionic to superionic conductivity, this transition concentration can be crudely estimated to occur at roughly 40% DOL (see FIG. 59).

Ultimately, the transport properties of the electrolyte at varying DOL fraction indicate that, upon reaching a critical transition at ~40% DOL, the polymer chains become entangled. Thus, it be would expected the zero-shear viscosity to increase with increasing polymer volume fraction according to a 3.4 power law. Although, this is not observed here, this is readily explained by the fact that we are plotting DOL monomer volume fraction; the polymer volume fraction remains unknown and is difficult to estimate.

In FIG. 54, the electrochemical stability of the $EC/DOL/LiPF_6$ system was investigated. Pure DOL is typically a poor choice of solvent for lithium-metal battery applications with high-voltage cathodes due to its limited electrochemical stability window, being unstable at potentials above 4.2 V vs. $Li/Li^+$. In FIG. 54A, for a pure EC, 1 M $LiPF_6$ electrolyte, the electrochemical stability is limited to roughly 4.2 V. At low DOL concentrations, the electrochemical stability is similar to that of pure EC. By increasing the DOL fraction, electrochemical stability improves greatly, approaching even 5 V at 70% DOL. This is consistent with what has been reported in the literature, and shows that poly-DOL maintains a higher electrochemical stability even compared to that of EC.

It is possible that the improved stability could be due to an increase in viscosity, reducing the observed oxidation current. This hypothesis can be tested through a floating test, a more rigorous stability test in which the thermodynamics and kinetics of the electrolyte stability can be separated (FIG. 54B). 10% DOL appears to be stable up to 4.0 V, while higher DOL fractions are stable up to 4.7 V. The floating test thus confirms that the electrochemical stability continues to increase with DOL fraction, ultimately reaching a stability window higher than that of pure DOL.

It should also be noted that DOL is known to undergo electro-polymerization at potentials around 4.5 V vs. $Li/Li^+$. This polymerization mechanism might have some effect on the DOL monomer present from the equilibrium polymerization, shifting the concentration away from equilibrium and towards a higher concentration of poly-DOL. If this effect is significant, an increase in electrochemical stability might be observed. It is believed this presents an opportunity for future assessment of how applied potentials can affect the poly-DOL equilibrium polymerization.

In summary, this example shows that electrolytes created by polymerization of DOL with $LiPF_6$ in the presence of EC, exhibit multiple desirable physical and electrochemical properties traits. These electrolytes display high room-temperature ionic conductivity and enlarged electrochemical stability windows. Furthermore, there is a critical transition that occurs at approximately 40% DOL. Below this transition, the electrolyte is a liquid solution with excellent conductivity, very low viscosity and poor electrochemical stability, comparable to that of pure DOL. Above this transition, the electrolyte takes the form of a viscous gel, with an increased working temperature range, slightly improved electrochemical stability and good ionic conductivity. This transition is attributed to either an increase in polymer volume fraction or molecular weight, or some combination of the two. Finally, the information gained via rheological and impedance measurements is used to show that $EC/DOL/LiPF_6$ electrolytes exhibit sub-ionic conductivity below this transition, and superionic conductivity above this transition. It is hypothesized that this phenomenon is due to the entanglement of poly-DOL within the electrolyte.

Materials and methods. Electrolyte preparation: The $EC/DOL/1$ M $LiPF_6$ electrolytes were prepared in an argon gas-filled glovebox (Inert), where 02 and $H_2O$ concentrations were below 0.5 ppm. It was waited at least 5 days before cell assembly and testing to allow equilibrium to be established. Before any electrochemical tests were performed on the materials, pieces of sacrificial lithium metal were added to the electrolytes overnight to chemically "dry" the electrolyte and remove any trace $H_2O$. EC and DOL were mixed before the addition of $LiPF_6$ salt.

Materials characterization: NMR analysis of the pure poly-DOL was performed using samples in which poly-DOL was dissolved and sonicated in deuterated dimethyl sulfoxide. A Waters ambient temperature GPC equipped with triple detection capability was used to quantify the average molecular weight and polydispersity index of poly-DOL. For these measurements, poly-DOL was dissolved and sonicated in tetrahydrofuran at a concentration of ~1 mg/mL. FTIR spectra were obtained using a Thermo Scientific spectrometer in the attenuated total reflection mode. A Novocontrol broadband dielectric/impedance spectrometer was used to characterize the ionic transport properties of the electrolytes. Gold-plated copper electrodes used for the example were cleaned and polished with metal polish and isopropanol prior to testing. The temperature was ramped progressively from −5° C. to 100° C. at 15° C. increments and the frequency response measured over the range $10^7$ to $10^{-1}$ Hz. The DC ionic conductivity was obtained from the low frequency plateau value of the frequency-dependent conductivity. DSC was performed using a Q1000 Modulated Differential Scanning Calorimeter (TA Instruments). Viscosity vs. shear rate data for electrolyte containing 10% DOL was obtained using a strain-controlled ARES-LS (Rheometric Scientific) mechanical rheometer outfitted with a cone and plate geometry. Rheology data for all other concentrations were obtained using a MCR 301 (Anton Paar) rheometer with a cone and plate geometry. Oscillatory shear measurements were performed in the linear viscoelastic regime, verified by a strain sweep at fixed frequency ($\omega$=10 rad/s).

Electrochemical cell design and analysis: Coin cells composed of lithium metal as the anode (¼" in diameter) and stainless steel (⅜" in diameter) as the cathode were used for CV and electrochemical floating analysis. Symmetric Li‖Li cells (⅜" in electrode diameter) were used for EIS measurements. All cells were assembled in an argon gas-filled glovebox (Inert) using Celgard 3501 as the separator. Li plating/stripping experiments were conducted by galvanostatic discharge/charge tests utilizing Li‖Cu cells with EC/DOL/1 M LiPF$_6$ (50% DOL) electrolytes at a current density of 0.5 mA/cm$^2$ and the plating Li capacity is 0.5 mAh/cm$^2$ per cycle. Full-cell cycling of Li‖NCM622 cells features of the electrolytes were evaluated using 2032-type coin cells with Li foil as the anode, Celgard 3501 as the separator, NCM622 as the cathode, and EC/DOL/1 M LiPF$_6$ (50% DOL) as the electrolyte. All galvanostatic cycling tests were performed at room temperature with Neware battery testers. The Nickel cobalt manganese oxide (NCM622) cathodes were obtained from Electrodes and More. The areal capacity of the NCM cathode is 3 mAh/cm$^2$. The cells were cycled at 0.2 C. All the cells were tested after electrolyte polymerization.

Electrochemical Floating experiments: After resting for at least 1 minute, cells were charged to 3.0 V at a constant current of 0.18 mA. Current was then recorded while cells were held at 3.0 V for 10 hours, 3.1 V for 10 hours, etc., up to 4.9 V for 10 hours. Finally, the cells were rested for an extended period of time (~80 hours).

TABLE 5

Arrhenius fitting data for conductivity with 95% confidence bounds and $R^2$ values.

Arrhenius fit: $\sigma = Ae^{-\frac{E_a}{RT}}$

| % DOL | Ea (eV) | Ea min (eV) | Ea max (eV) | A | A min | A max | R^2 | Adj. R^2 |
|---|---|---|---|---|---|---|---|---|
| 10% | 0.168 | 0.186 | 0.150 | 0.985 | 0.520 | 1.868 | 0.994 | 0.992 |
| 30% | 0.172 | 0.183 | 0.161 | 0.897 | 0.611 | 1.315 | 0.998 | 0.997 |

TABLE 6

Vogel-Fulcher-Tammann (VFT) fitting data for conductivity with 95% confidence bounds and $R^2$ values.

VFT fit: $\sigma = Ae^{\frac{B}{(T-T_0)}}$

| % DOL | B (K) | B min (K) | B max (K) | A | A min | A max | T0 (=Tg from DSC, K) | R^2 | Adj. R^2 |
|---|---|---|---|---|---|---|---|---|---|
| 50% | −516.4 | −544.7 | −488 | 0.048 | 0.037 | 0.062 | 191.65 | 0.998 | 0.997 |
| 70% | −745.4 | −794.6 | −696.2 | 0.108 | 0.074 | 0.158 | 177.03 | 0.996 | 0.995 |

TABLE 7

Viscosity vs. shear rate power law fitting parameters selected DOL fractions with 95% confidence bounds.

| | n | nmin | nmax | K | Kmin | Kmax | R^2 | adj. R^2 |
|---|---|---|---|---|---|---|---|---|
| 10% | 0.992687 | 0.96729 | 1.01808 | 0.00859 | 0.007852 | 0.009376 | 0.01993 | −0.03452 |
| 30% | 0.98845 | 0.98741 | 0.9895 | 0.023768 | 0.023659 | 0.023933 | 0.9657 | 0.9639 |
| 50% | 0.92854 | 0.92769 | 0.92939 | 0.779292 | 0.776247 | 0.782348 | 0.9993 | 0.9992 |
| 70% | 0.90208 | 0.8985 | 0.90569 | 3.46657 | 3.411929 | 3.521275 | 0.9924 | 0.9921 |

Although the present disclosure has been described with respect to one or more particular embodiments and/or examples, it will be understood that other embodiments and/or examples of the present disclosure may be made without departing from the scope of the present disclosure.

The invention claimed is:

1. A method for forming a solid-state polymer electrolyte (SPE) comprising:
disposing a composition comprising a cyclic ether and a ring opening polymerization initiator between a cathode and an anode within an electrochemical cell, and
polymerizing the composition in-situ to form the solid-state polymer electrolyte between the cathode and anode, wherein at least 80% of the cyclic ether is polymerized and wherein a higher concentration of the initiator forms a lower overall polymer molecular weight.

2. The method of claim 1, wherein the composition further comprises a lithium salt, a sodium salt, or a combination thereof.

3. The method of claim 1, wherein the providing comprises:
wherein the polymeric material completely fills a space between and/or is in electrical contact with the anode and cathode.

4. The method of claim 1, wherein the method further comprises contacting a cathode material with the composition.

5. The method of claim 1, wherein the cyclic ether is chosen from 1,3-dioxolane, substituted 1,3-dioxolanes, 1,4-dioxane, substituted 1,4-dioxanes, 1,3-dioxane, substituted 1,3-dioxanes, 1,3,6-trioxocane, substituted 1,3,6-trioxocane, and combinations thereof.

6. The method of claim 2, wherein the lithium salt is chosen from lithium triflate (LiOTf), lithium difluoro(oxalato)borate (LiBF$_2$(C$_2$O$_4$), LiDFOB), LiPF$_6$, LiAsF$_6$, LiBF$_4$, LiBOB, LiF, LiCl, LiBr, LiI, LiNO$_3$, LiClO$_4$, and combinations thereof.

7. The method of claim 1, wherein the initiator is an aluminum salt.

8. The method of claim 7, wherein the aluminum salt is chosen from aluminum triflate (Al(CF$_3$SO$_3$)$_3$), bis(trifluoromethane)sulfonimide aluminum salt (AlTFSI), and combinations thereof.

9. The method of claim 2, wherein the lithium salt, the sodium salt, or the combination thereof is present at a concentration of 0.1 M to 5 M.

10. The method of claim 2, wherein the sodium salt is chosen from sodium triflate (NaOTf), NaPF$_6$, NaNO$_3$, NaClO$_4$, NaAsF$_6$, NaBF$_4$, sodium bis(oxalate)borate (NaBOB), sodium difluoro(oxalato)borate (NaBF$_2$(C$_2$O$_4$), NaDFOB), NaF, NaCl, NaBr, NaI, and combinations thereof.

11. The method of claim 2, wherein the lithium salt is a lithium ionic liquid.

12. The method of claim 11, wherein the lithium ionic liquid is a sulfonimide or an imide lithium ionic liquid and/or the sodium ionic liquid is a sulfonimide or an imide sodium ionic liquid.

13. The method of claim 1, wherein the composition is anhydrous.

14. The method of claim 1, wherein the ring opening polymerization initiator has a concentration of 50 μM to 50 mM.

15. The method of claim 1, wherein the composition does not form a gel electrolyte or a pseudo-solid electrolyte.

* * * * *